US008284866B2

(12) United States Patent
Murakami et al.

(10) Patent No.: US 8,284,866 B2
(45) Date of Patent: *Oct. 9, 2012

(54) OFDM TRANSMISSION SIGNAL GENERATION APPARATUS AND METHOD, AND OFDM RECEPTION DATA GENERATION APPARATUS AND METHOD

(75) Inventors: Yutaka Murakami, Osaka (JP);
Kiyotaka Kobayashi, Tokyo (JP);
Masayuki Orihashi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/171,121

(22) Filed: Jun. 28, 2011

(65) Prior Publication Data
US 2011/0255637 A1 Oct. 20, 2011

Related U.S. Application Data

(60) Continuation of application No. 12/840,024, filed on Jul. 20, 2010, now Pat. No. 8,005,165, which is a division of application No. 11/577,791, filed as application No. PCT/JP2006/316653 on Aug. 24, 2006, now Pat. No. 7,826,555.

(30) Foreign Application Priority Data

Aug. 24, 2005 (JP) .................................. 2005-243494
Aug. 24, 2006 (JP) .................................. 2006-228337

(51) Int. Cl.
*H04L 27/00* (2006.01)
*H04B 7/04* (2006.01)
*H04B 7/06* (2006.01)
*H04J 11/00* (2006.01)

(52) U.S. Cl. ......... 375/299; 375/347; 455/101; 370/208
(58) Field of Classification Search .................. 375/135, 375/141, 146, 260, 267, 295, 298, 299, 316, 375/347; 370/204, 208, 209, 302, 343, 464, 370/480, 482; 455/91, 103, 112, 101
See application file for complete search history.

(56) References Cited

U.S. PATENT DOCUMENTS

| 6,473,447 | B1 | 10/2002 | Strich | |
|---|---|---|---|---|
| 7,372,913 | B2 | 5/2008 | van Zelst | |
| 7,548,506 | B2 | 6/2009 | Ma | |
| 7,738,437 | B2 * | 6/2010 | Ma et al. ........................ | 370/342 |
| 7,826,555 | B2 * | 11/2010 | Murakami et al. ............ | 375/299 |

(Continued)

FOREIGN PATENT DOCUMENTS
JP    10-500807    1/1998
(Continued)

OTHER PUBLICATIONS
International Search Report dated Oct. 24, 2006.
(Continued)

*Primary Examiner* — Lawrence B Williams
(74) *Attorney, Agent, or Firm* — Dickinson Wright PLLC

(57) ABSTRACT

A MIMO-OFDM transmission and reception apparatus is provided which allows high accuracy estimation of frequency offset, high accuracy estimation of a transmission path fluctuation and high accuracy synchronization/signal detection. A mapping section generates a plurality of OFDM signals. In these OFDM signals, some pilot carriers are assigned to the same carrier position and orthogonal sequences are assigned to the same time slot in the same carrier position.

20 Claims, 50 Drawing Sheets

U.S. PATENT DOCUMENTS

| | | |
|---|---|---|
| 2004/0131007 A1 | 7/2004 | Smee |
| 2004/0179627 A1 | 9/2004 | Ketchum |
| 2004/0252629 A1 | 12/2004 | Hasegawa |
| 2005/0002468 A1* | 1/2005 | Walton et al. ............... 375/267 |
| 2005/0111599 A1 | 5/2005 | Walton |
| 2005/0249180 A1 | 11/2005 | Murakami |
| 2006/0030364 A1 | 2/2006 | Olesen |
| 2006/0104381 A1* | 5/2006 | Menon et al. ............... 375/267 |
| 2006/0164971 A1 | 7/2006 | Moorti |
| 2006/0209670 A1 | 9/2006 | Gorokhov |
| 2007/0121750 A1 | 5/2007 | Shirakata |
| 2007/0195906 A1 | 8/2007 | Kim |
| 2008/0008110 A1* | 1/2008 | Kishigami et al. ........... 370/310 |
| 2008/0182532 A1 | 7/2008 | Kobayashi |
| 2008/0253279 A1* | 10/2008 | Ma et al. ..................... 370/206 |
| 2009/0003466 A1* | 1/2009 | Taherzadehboroujeni et al. ............................ 375/260 |
| 2009/0060076 A1 | 3/2009 | Ma |
| 2009/0074086 A1 | 3/2009 | Murakami |
| 2009/0103650 A1 | 4/2009 | Murakami |
| 2009/0204023 A1 | 8/2009 | Goldenberg |
| 2009/0274195 A1 | 11/2009 | Chang |
| 2009/0296839 A1 | 12/2009 | Stadelmeier |

FOREIGN PATENT DOCUMENTS

| | | |
|---|---|---|
| JP | 2004-120730 | 4/2004 |
| JP | 2005-124125 | 5/2005 |
| WO | 01/71928 | 9/2001 |
| WO | 2004/030265 | 4/2004 |

OTHER PUBLICATIONS

C. Oberli, et al., "Maximum likelihood tracking algorithms for MIMO-OFDM," 2004 IEEE International Conference on Communications, vol. 4, Jun. 2004, pp. 2468-2472.

"High-Speed Physical Layer in the 5GHZ Band," IEEE Std 802 11a-1999 Wireless LAN Medium Access Control (MAC) and Physical Layer (PHY) specifications, Part 11, 1999, pp. 1-82.

Hong Yang, "A Road to Future Broadband Wireless Access: MIMO-OFDM-Based Air Interface," 2005, Communications Magazine, IEEE, vol. 43, Issue 1, pp. 53-60.

Japanese Office Action dated Feb. 7, 2012.

* cited by examiner

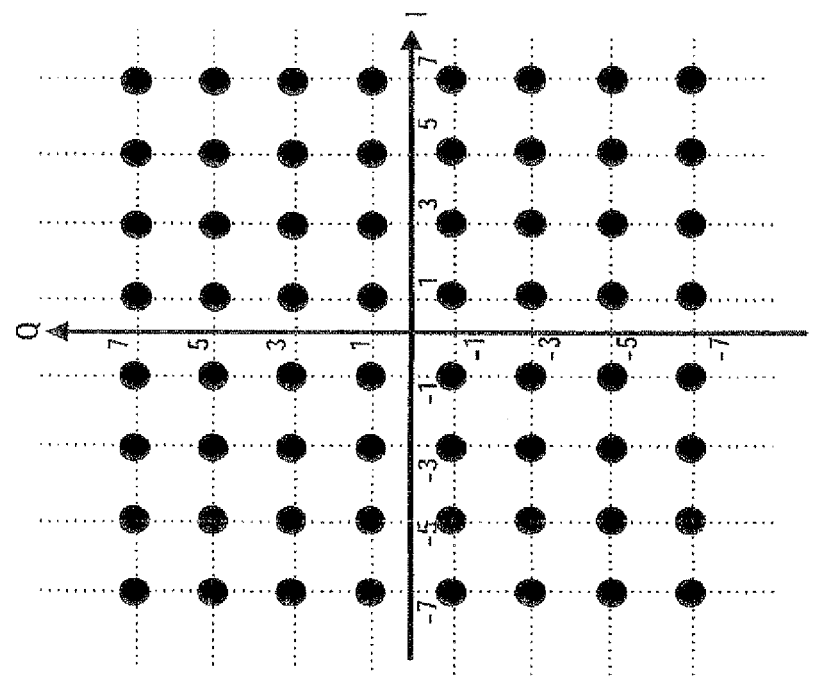
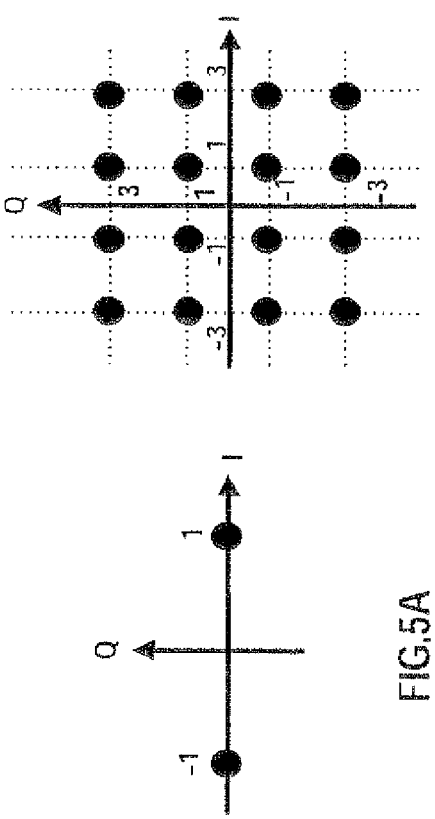
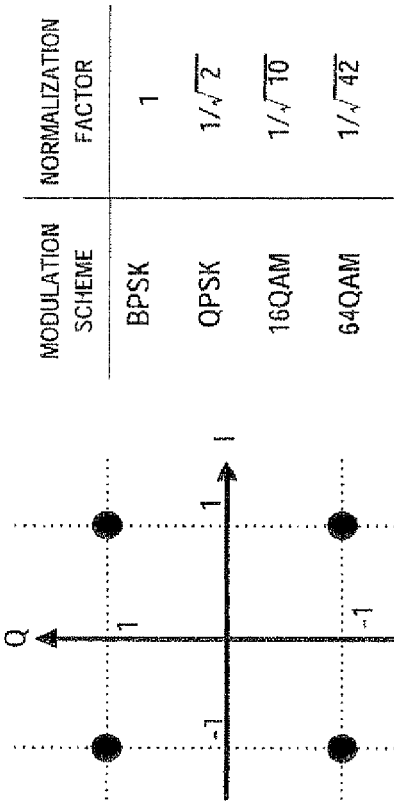
FIG.5D
FIG.5C
FIG.5A
FIG.5B
| MODULATION SCHEME | NORMALIZATION FACTOR |
|---|---|
| BPSK | 1 |
| QPSK | $1/\sqrt{2}$ |
| 16QAM | $1/\sqrt{10}$ |
| 64QAM | $1/\sqrt{42}$ |
FIG.5E

FIG.8

(a) CHANNEL A, TIME 1

| CARRIER | real part (I) | imaginary part (Q) |
|---|---|---|
| 1 | 0 | 0 |
| 2 | -1 | 0 |
| 3 | 0 | 0 |
| 4 | -1 | 0 |
| 5 | 0 | 0 |
| 6 | 1 | 0 |
| 7 | 0 | 0 |
| 8 | 1 | 0 |
| 9 | 0 | 0 |
| 10 | -1 | 0 |
| 11 | 0 | 0 |
| 12 | -1 | 0 |

(b) CHANNEL A, TIME 3

| CARRIER | real part (I) | imaginary part (Q) |
|---|---|---|
| 1 | 0 | 0 |
| 2 | -1 | 0 |
| 3 | 0 | 0 |
| 4 | 1 | 0 |
| 5 | 0 | 0 |
| 6 | -1 | 0 |
| 7 | 0 | 0 |
| 8 | -1 | 0 |
| 9 | 0 | 0 |
| 10 | 1 | 0 |
| 11 | 0 | 0 |
| 12 | 1 | 0 |

(c) CHANNEL A, TIME 5

| CARRIER | real part (I) | imaginary part (Q) |
|---|---|---|
| 1 | 0 | 0 |
| 2 | -1 | 0 |
| 3 | 0 | 0 |
| 4 | 1 | 0 |
| 5 | 0 | 0 |
| 6 | -1 | 0 |
| 7 | 0 | 0 |
| 8 | -1 | 0 |
| 9 | 0 | 0 |
| 10 | 1 | 0 |
| 11 | 0 | 0 |
| 12 | 1 | 0 |

(d) CHANNEL A, TIME 7

| CARRIER | real part (I) | imaginary part (Q) |
|---|---|---|
| 1 | 0 | 0 |
| 2 | 1 | 0 |
| 3 | 0 | 0 |
| 4 | -1 | 0 |
| 5 | 0 | 0 |
| 6 | 1 | 0 |
| 7 | 0 | 0 |
| 8 | 1 | 0 |
| 9 | 0 | 0 |
| 10 | -1 | 0 |
| 11 | 0 | 0 |
| 12 | -1 | 0 |

ALL SIGNALS FORMED OF 4 SYMBOLS IN TIME DOMAIN HAVE SAME PATTERN

FIG.10

(a) CHANNEL A, TIME 1

| CARRIER | real part (I) | imaginary part (Q) |
|---|---|---|
| 1 | 0 | 0 |
| 2 | -1.414 | 0 |
| 3 | 0 | 0 |
| 4 | -1.414 | 0 |
| 5 | 0 | 0 |
| 6 | 1.414 | 0 |
| 7 | 0 | 0 |
| 8 | 1.414 | 0 |
| 9 | 0 | 0 |
| 10 | -1.414 | 0 |
| 11 | 0 | 0 |
| 12 | -1.414 | 0 |

(b) CHANNEL A, TIME 3

| CARRIER | real part (I) | imaginary part (Q) |
|---|---|---|
| 1 | 0 | 0 |
| 2 | -1.414 | 0 |
| 3 | 0 | 0 |
| 4 | 1.414 | 0 |
| 5 | 0 | 0 |
| 6 | -1.414 | 0 |
| 7 | 0 | 0 |
| 8 | -1.414 | 0 |
| 9 | 0 | 0 |
| 10 | 1.414 | 0 |
| 11 | 0 | 0 |
| 12 | 1.414 | 0 |

(c) CHANNEL A, TIME 5

| CARRIER | real part (I) | imaginary part (Q) |
|---|---|---|
| 1 | 0 | 0 |
| 2 | -1.414 | 0 |
| 3 | 0 | 0 |
| 4 | 1.414 | 0 |
| 5 | 0 | 0 |
| 6 | -1.414 | 0 |
| 7 | 0 | 0 |
| 8 | -1.414 | 0 |
| 9 | 0 | 0 |
| 10 | 1.414 | 0 |
| 11 | 0 | 0 |
| 12 | 1.414 | 0 |

(d) CHANNEL A, TIME 7

| CARRIER | real part (I) | imaginary part (Q) |
|---|---|---|
| 1 | 0 | 0 |
| 2 | 1.414 | 0 |
| 3 | 0 | 0 |
| 4 | -1.414 | 0 |
| 5 | 0 | 0 |
| 6 | 1.414 | 0 |
| 7 | 0 | 0 |
| 8 | 1.414 | 0 |
| 9 | 0 | 0 |
| 10 | -1.414 | 0 |
| 11 | 0 | 0 |
| 12 | -1.414 | 0 |

ALL SIGNALS FORMED OF 4 SYMBOLS IN TIME DOMAIN HAVE SAME PATTERN

FIG.12

(a) CHANNEL A, TIME 1

| CARRIER | real part (I) | imaginary part (Q) |
|---|---|---|
| 1 | 0 | 0 |
| 2 | -1.0 | 1.0 |
| 3 | 0 | 0 |
| 4 | -1.0 | -1.0 |
| 5 | 0 | 0 |
| 6 | 1.0 | 1.0 |
| 7 | 0 | 0 |
| 8 | 1.0 | 1.0 |
| 9 | 0 | 0 |
| 10 | -1.0 | -1.0 |
| 11 | 0 | 0 |
| 12 | -1.0 | -1.0 |

(b) CHANNEL A, TIME 3

| CARRIER | real part (I) | imaginary part (Q) |
|---|---|---|
| 1 | 0 | 0 |
| 2 | -1.0 | -1.0 |
| 3 | 0 | 0 |
| 4 | 1.0 | 1.0 |
| 5 | 0 | 0 |
| 6 | -1.0 | -1.0 |
| 7 | 0 | 0 |
| 8 | 1.0 | 1.0 |
| 9 | 0 | 0 |
| 10 | 1.0 | 1.0 |
| 11 | 0 | 0 |
| 12 | 1.0 | 1.0 |

(c) CHANNEL A, TIME 5

| CARRIER | real part (I) | imaginary part (Q) |
|---|---|---|
| 1 | 0 | 0 |
| 2 | -1.0 | -1.0 |
| 3 | 0 | 0 |
| 4 | 1.0 | 1.0 |
| 5 | 0 | 0 |
| 6 | -1.0 | -1.0 |
| 7 | 0 | 0 |
| 8 | -1.0 | -1.0 |
| 9 | 0 | 0 |
| 10 | 1.0 | 1.0 |
| 11 | 0 | 0 |
| 12 | 1.0 | 1.0 |

(d) CHANNEL A, TIME 7

| CARRIER | real part (I) | imaginary part (Q) |
|---|---|---|
| 1 | 0 | 0 |
| 2 | 1.0 | 1.0 |
| 3 | 0 | 0 |
| 4 | -1.0 | -1.0 |
| 5 | 0 | 0 |
| 6 | 1.0 | 1.0 |
| 7 | 0 | 0 |
| 8 | 1.0 | 1.0 |
| 9 | 0 | 0 |
| 10 | -1.0 | -1.0 |
| 11 | 0 | 0 |
| 12 | -1.0 | -1.0 |

ALL SIGNALS FORMED OF 4 SYMBOLS IN TIME DOMAIN HAVE SAME PATTERN (a) CHANNEL A, TIME 1

| CARRIER | real part (I) | imaginary part (Q) |
|---|---|---|
| 1 | 1.732 | 0 |
| 2 | 0 | 0 |
| 3 | 0 | 0 |
| 4 | −1.732 | 0 |
| 5 | 0 | 0 |
| 6 | 0 | 0 |
| 7 | 1.732 | 0 |
| 8 | 0 | 0 |
| 9 | 0 | 0 |
| 10 | −1.732 | 0 |
| 11 | 0 | 0 |
| 12 | 0 | 0 |

(b) CHANNEL A, TIME 2

| CARRIER | real part (I) | imaginary part (Q) |
|---|---|---|
| 1 | 0 | 0 |
| 2 | 1.732 | 0 |
| 3 | 0 | 0 |
| 4 | 0 | 0 |
| 5 | −1.732 | 0 |
| 6 | 0 | 0 |
| 7 | 0 | 0 |
| 8 | 1.732 | 0 |
| 9 | 0 | 0 |
| 10 | 0 | 0 |
| 11 | −1.732 | 0 |
| 12 | 0 | 0 |

(c) CHANNEL A, TIME 3

| CARRIER | real part (I) | imaginary part (Q) |
|---|---|---|
| 1 | 0 | 0 |
| 2 | 0 | 0 |
| 3 | 1.732 | 0 |
| 4 | 0 | 0 |
| 5 | 0 | 0 |
| 6 | −1.732 | 0 |
| 7 | 0 | 0 |
| 8 | 0 | 0 |
| 9 | 1.732 | 0 |
| 10 | 0 | 0 |
| 11 | 0 | 0 |
| 12 | −1.732 | 0 |

FIG.18

(a) CHANNEL A, TIME 1

| CARRIER | real part (I) | imaginary part (Q) |
|---|---|---|
| 1 | 1.225 | 1.225 |
| 2 | 0 | 0 |
| 3 | 0 | 0 |
| 4 | -1.225 | -1.225 |
| 5 | 0 | 0 |
| 6 | 0 | 0 |
| 7 | 1.225 | 1.225 |
| 8 | 0 | 0 |
| 9 | 0 | 0 |
| 10 | -1.225 | -1.225 |
| 11 | 0 | 0 |
| 12 | 0 | 0 |

(b) CHANNEL A, TIME 2

| CARRIER | real part (I) | imaginary part (Q) |
|---|---|---|
| 1 | 0 | 0 |
| 2 | 1.225 | 1.225 |
| 3 | 0 | 0 |
| 4 | 0 | 0 |
| 5 | -1.225 | -1.225 |
| 6 | 0 | 0 |
| 7 | 0 | 0 |
| 8 | 1.225 | 1.225 |
| 9 | 0 | 0 |
| 10 | 0 | 0 |
| 11 | -1.225 | -1.225 |
| 12 | 0 | 0 |

(c) CHANNEL A, TIME 3

| CARRIER | real part (I) | imaginary part (Q) |
|---|---|---|
| 1 | 0 | 0 |
| 2 | 0 | 0 |
| 3 | 1.225 | 1.225 |
| 4 | 0 | 0 |
| 5 | 0 | 0 |
| 6 | -1.225 | -1.225 |
| 7 | 0 | 0 |
| 8 | 0 | 0 |
| 9 | 1.225 | 1.225 |
| 10 | 0 | 0 |
| 11 | 0 | 0 |
| 12 | -1.225 | -1.225 |

FIG.19

| MIMO SCHEME | MODULATION SCHEME | NORMALIZATION FACTOR |
|---|---|---|
| DOUBLE TRANSMISSION SPATIAL MULTIPLEXING MIMO | BPSK | 1 |
| | QPSK | $1/\sqrt{2}$ |
| | 16QAM | $1/\sqrt{10}$ |
| | 64QAM | $1/\sqrt{42}$ |
| TRIPLE TRANSMISSION SPATIAL MULTIPLEXING MIMO | BPSK | $\sqrt{2}/\sqrt{3}$ |
| | QPSK | $1/\sqrt{3}$ |
| | 16QAM | $1/\sqrt{15}$ |
| | 64QAM | $1/\sqrt{63}$ |

FIG.21

| CARRIER | CHANNEL A, TIME 1 real part (I) | imaginary part (Q) |
|---|---|---|
| 1 | 1.414 | 0 |
| 2 | 0 | 0 |
| 3 | 0 | 0 |
| 4 | -1.414 | 0 |
| 5 | 0 | 0 |
| 6 | 0 | 0 |
| 7 | 1.414 | 0 |
| 8 | 0 | 0 |
| 9 | 0 | 0 |
| 10 | -1.414 | 0 |
| 11 | 0 | 0 |
| 12 | 0 | 0 |

(a)

| CARRIER | CHANNEL A, TIME 2 real part (I) | imaginary part (Q) |
|---|---|---|
| 1 | 0 | 0 |
| 2 | 1.414 | 0 |
| 3 | 0 | 0 |
| 4 | 0 | 0 |
| 5 | -1.414 | 0 |
| 6 | 0 | 0 |
| 7 | 0 | 0 |
| 8 | 1.414 | 0 |
| 9 | 0 | 0 |
| 10 | 0 | 0 |
| 11 | -1.414 | 0 |
| 12 | 0 | 0 |

(b)

| CARRIER | CHANNEL A, TIME 3 real part (I) | imaginary part (Q) |
|---|---|---|
| 1 | 0 | 0 |
| 2 | 0 | 0 |
| 3 | 1.414 | 0 |
| 4 | 0 | 0 |
| 5 | 0 | 0 |
| 6 | -1.414 | 0 |
| 7 | 0 | 0 |
| 8 | 0 | 0 |
| 9 | 1.414 | 0 |
| 10 | 0 | 0 |
| 11 | 0 | 0 |
| 12 | -1.414 | 0 |

(a) CHANNEL A, TIME 1

| CARRIER | real part (I) | imaginary part (Q) |
|---|---|---|
| 1 | 1.0 | 1.0 |
| 2 | 0 | 0 |
| 3 | 0 | 0 |
| 4 | -1.0 | -1.0 |
| 5 | 0 | 0 |
| 6 | 0 | 0 |
| 7 | 1.0 | 1.0 |
| 8 | 0 | 0 |
| 9 | 0 | 0 |
| 10 | -1.0 | -1.0 |
| 11 | 0 | 0 |
| 12 | 0 | 0 |

(b) CHANNEL A, TIME 2

| CARRIER | real part (I) | imaginary part (Q) |
|---|---|---|
| 1 | 0 | 0 |
| 2 | 1.0 | 1.0 |
| 3 | 0 | 0 |
| 4 | 0 | 0 |
| 5 | -1.0 | -1.0 |
| 6 | 0 | 0 |
| 7 | 0 | 0 |
| 8 | 1.0 | 1.0 |
| 9 | 0 | 0 |
| 10 | 0 | 0 |
| 11 | -1.0 | -1.0 |
| 12 | 0 | 0 |

(c) CHANNEL A, TIME 3

| CARRIER | real part (I) | imaginary part (Q) |
|---|---|---|
| 1 | 0 | 0 |
| 2 | 0 | 0 |
| 3 | 1.0 | 1.0 |
| 4 | 0 | 0 |
| 5 | 0 | 0 |
| 6 | -1.0 | -1.0 |
| 7 | 0 | 0 |
| 8 | 0 | 0 |
| 9 | 1.0 | 1.0 |
| 10 | 0 | 0 |
| 11 | 0 | 0 |
| 12 | -1.0 | -1.0 |

| MIMO SCHEME | MODULATION SCHEME | NORMALIZATION FACTOR |
|---|---|---|
| SINGLE TRANSMISSION | BPSK | 1 |
| | QPSK | $1/\sqrt{2}$ |
| | 16QAM | $1/\sqrt{10}$ |
| | 64QAM | $1/\sqrt{42}$ |
| DOUBLE TRANSMISSION SPATIAL MULTIPLEXING MIMO | BPSK | $1/\sqrt{2}$ |
| | QPSK | $1/\sqrt{4}$ |
| | 16QAM | $1/\sqrt{20}$ |
| | 64QAM | $1/\sqrt{84}$ |
| TRIPLE TRANSMISSION SPATIAL MULTIPLEXING MIMO | BPSK | $1/\sqrt{3}$ |
| | QPSK | $1/\sqrt{6}$ |
| | 16QAM | $1/\sqrt{30}$ |
| | 64QAM | $1/\sqrt{126}$ |

FIG.26

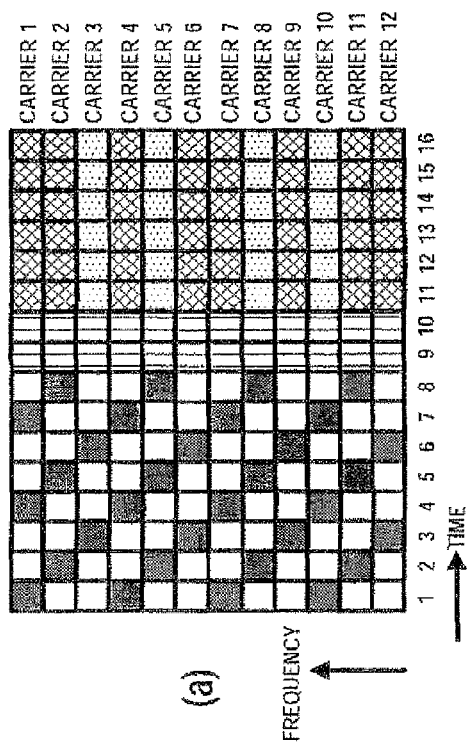
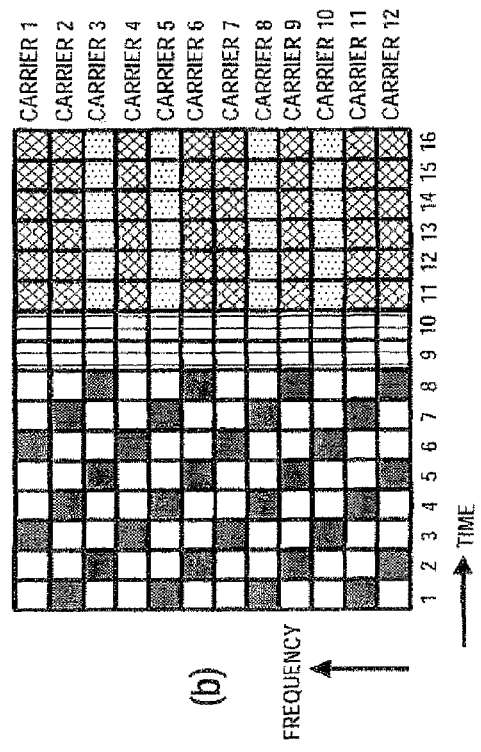
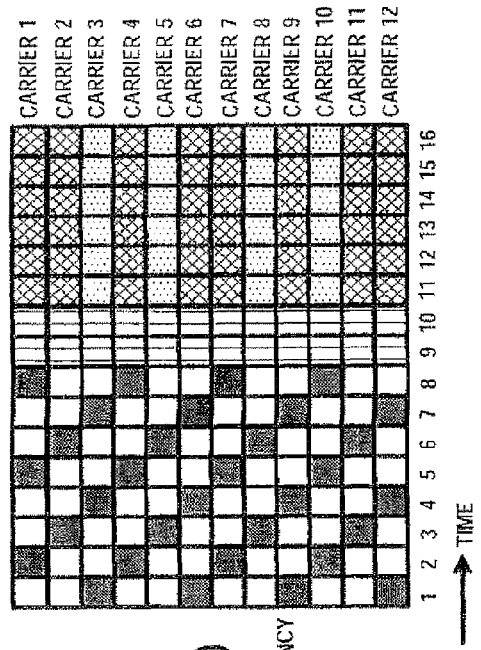
FIG.27

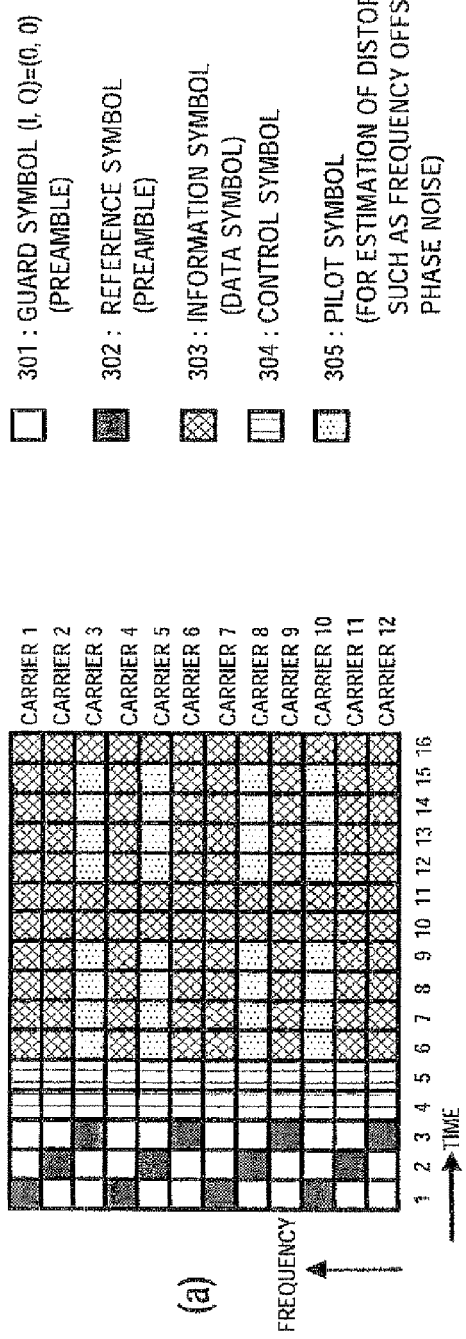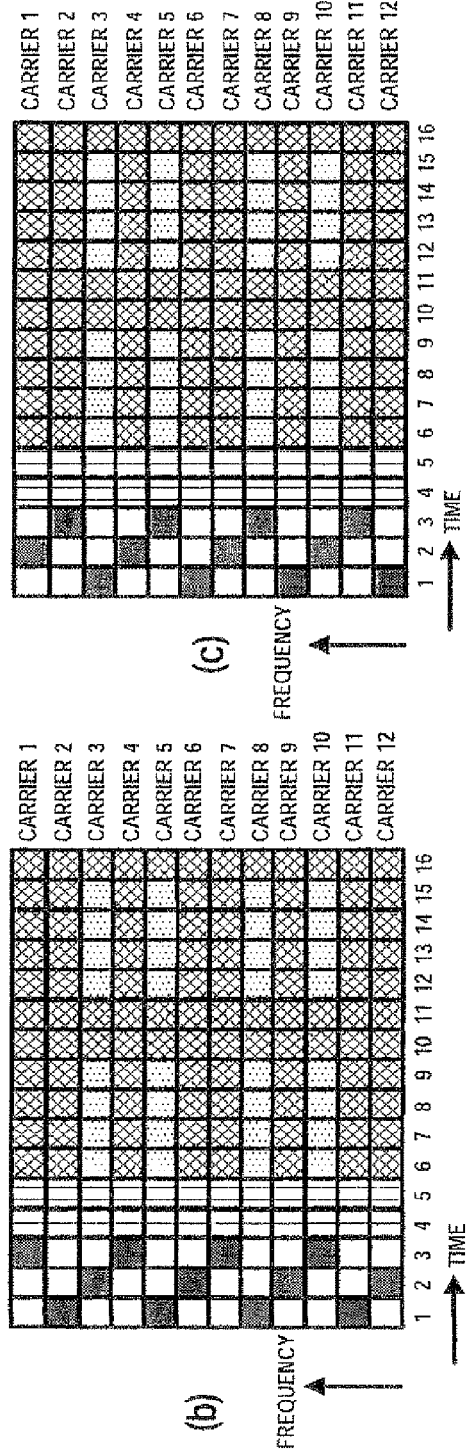
FIG. 34

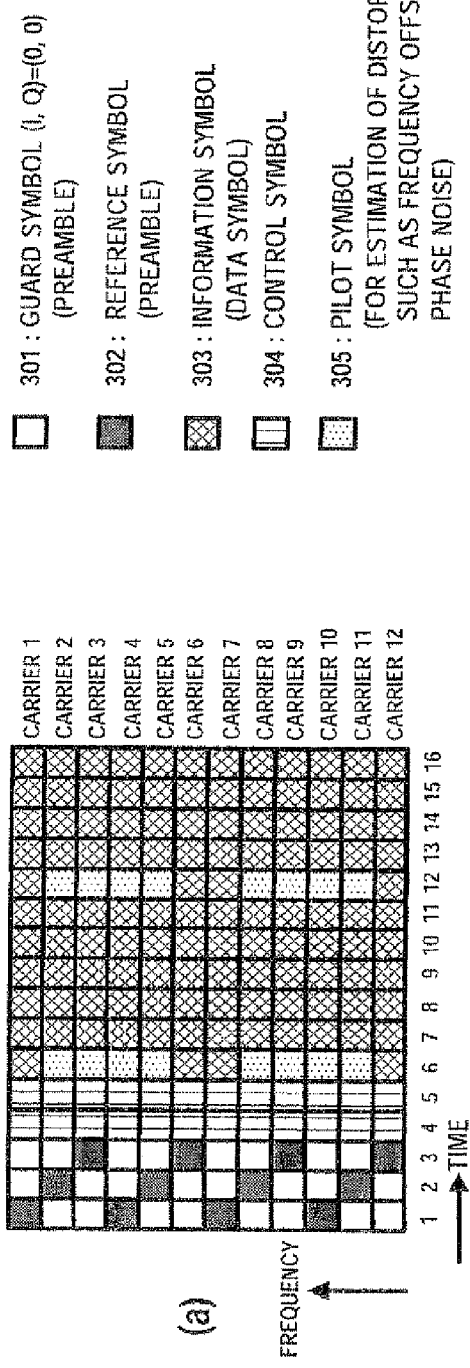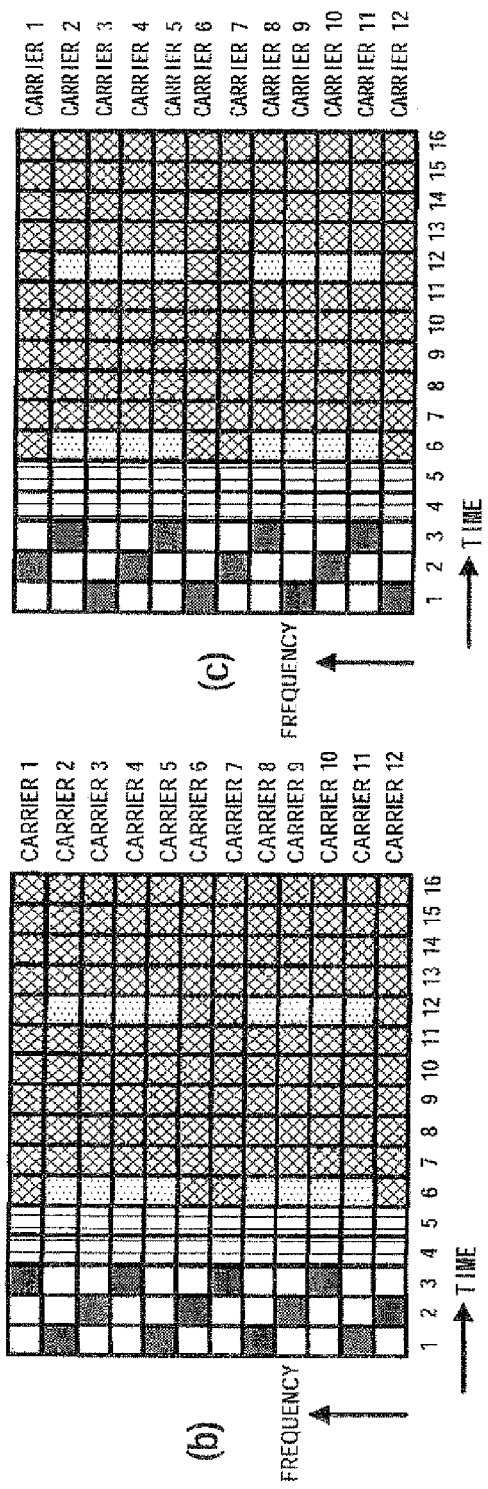
FIG.35

| MIMO SCHEME | MODULATION SCHEME | NORMALIZATION FACTOR |
|---|---|---|
| QUADRUPLE TRANSMISSION SPATIAL MULTIPLEXING MIMO | BPSK | $1/2$ |
| | QPSK | $1/2\sqrt{2}$ |
| | 16QAM | $1/2\sqrt{10}$ |
| | 64QAM | $1/2\sqrt{42}$ |

(a) CHANNEL B, TIME 3

| CARRIER | real part (I) | imaginary part (Q) |
|---|---|---|
| 1 | 2 | 0 |
| 2 | 0 | 0 |
| 3 | -2 | 0 |
| 4 | 0 | 0 |
| 5 | 2 | 0 |
| 6 | 2 | 0 |
| 7 | 0 | 0 |
| 8 | -2 | 0 |
| 9 | -2 | 0 |
| 10 | 0 | 0 |
| 11 | -2 | 0 |
| 12 | 0 | 0 |

(b) CHANNEL D, TIME 3

| CARRIER | real part (I) | imaginary part (Q) |
|---|---|---|
| 1 | 0 | 0 |
| 2 | -2 | 0 |
| 3 | 0 | 0 |
| 4 | 2 | 0 |
| 5 | 0 | 0 |
| 6 | -2 | 0 |
| 7 | 0 | 0 |
| 8 | -2 | 0 |
| 9 | 0 | 0 |
| 10 | 2 | 0 |
| 11 | 0 | 0 |
| 12 | 2 | 0 |

(c) CHANNEL B, TIME 4

| CARRIER | real part (I) | imaginary part (Q) |
|---|---|---|
| 1 | 0 | 0 |
| 2 | -2 | 0 |
| 3 | 0 | 0 |
| 4 | 2 | 0 |
| 5 | 0 | 0 |
| 6 | -2 | 0 |
| 7 | 0 | 0 |
| 8 | -2 | 0 |
| 9 | 0 | 0 |
| 10 | 2 | 0 |
| 11 | 0 | 0 |
| 12 | 2 | 0 |

(d) CHANNEL D, TIME 4

| CARRIER | real part (I) | imaginary part (Q) |
|---|---|---|
| 1 | 2 | 0 |
| 2 | 0 | 0 |
| 3 | -2 | 0 |
| 4 | 0 | 0 |
| 5 | 2 | 0 |
| 6 | 0 | 0 |
| 7 | 2 | 0 |
| 8 | 0 | 0 |
| 9 | -2 | 0 |
| 10 | 0 | 0 |
| 11 | -2 | 0 |
| 12 | 0 | 0 |

PHASE RELATION MAY BE DIFFERENT

OFDM TRANSMISSION SIGNAL GENERATION APPARATUS AND METHOD, AND OFDM RECEPTION DATA GENERATION APPARATUS AND METHOD

This is a continuation application of application Ser. No. 12/840,024 filed Jul. 20, 2010, which is a divisional application of application Ser. No. 11/577,791 filed Apr. 23, 2007, issued as U.S. Pat. No. 7,826,555 B2 on Nov. 2, 2010 and which is a national stage of PCT/JP2006/316653 filed Aug. 24, 2006, which is based on Japanese Application Nos. 2005-243494 filed Aug. 24, 2005, and 2006-228337 filed Aug. 24, 2006, the entire contents of each which are incorporated by reference herein.

TECHNICAL FIELD

The present invention relates to a MIMO-OFDM transmission apparatus and a MIMO-OFDM transmission method. More particularly, the present invention relates to a technology for realizing an ideal symbol configuration for frequency offset estimation, transmission path fluctuation (channel fluctuation) estimation and synchronization/signal detection, in MIMO-OFDM communication.

BACKGROUND ART

FIG. 1 shows the configuration of a transmission/reception apparatus of a wireless LAN (Local Area Network) which is an example of a radio communication system using OFDM (Orthogonal Frequency Division Multiplexing) which is currently being implemented, and the frame configuration thereof.

FIG. 1(a) shows an example of the configuration of a transmission apparatus and frame configuration signal generation section 10 receives control information 9 such as a modulation scheme as input, determines a frame configuration and outputs frame configuration signal 11. Serial/parallel conversion section (S/P) 2 receives frame configuration signal 11 and baseband signal 1 subjected to digital modulation as input, applies a serial/parallel conversion and outputs parallel signal 3 in accordance with the frame configuration. Inverse Fourier transform (ifft) section 4 receives parallel signal 3 as input, applies Inverse Fourier transform and outputs signal 5 after the Inverse Fourier transform. Radio section 6 receives signal 5 after the Inverse Fourier transform as input, applies a frequency conversion or the like and outputs transmission signal 7. Transmission signal 7 is transmitted as a radio wave from antenna 8.

FIG. 1(b) shows a configuration example of a reception apparatus and radio section 14 receives received signal 13 received at antenna 12 as input, applies processing such as a frequency conversion and outputs baseband signal 15. Synchronization section 16 receives baseband signal 15 as input, establishes time synchronization with a transmitter and outputs timing signal 17. Fourier transform (fft) section 18 receives baseband signal 15 and timing signal 17 as input, applies a Fourier transform to baseband signal 15 based on timing signal 17 and outputs signal 19 after the Fourier transform.

Transmission path fluctuation estimation section 20 receives signal 19 after the Fourier transform and timing signal 17 as input, detects a preamble in the signal after the Fourier transform, estimates a transmission path fluctuation and outputs transmission path fluctuation estimation signal 21. Frequency offset estimation section 22 receives signal 19 after the Fourier transform and timing signal 17 as input, detects preambles and pilot symbols in the signal after the Fourier transform, estimates frequency offset based on these symbols and outputs frequency offset estimation signal 23.

Demodulation section 24 receives signal 19 after the Fourier transform, timing signal 17, transmission path fluctuation estimation signal 21 and frequency offset estimation signal 23 as input, compensates for the transmission path fluctuation and frequency offset in signal 19 after the Fourier transform, demodulates signal 19 and outputs received digital signal 25.

FIG. 1(c) shows an image in a frame configuration of IEEE802.11a (not an exact frame configuration). The vertical axis shows frequency and the horizontal axis shows time, and preambles are inserted at the head to estimate (detect a signal in some cases) a transmission path fluctuation and frequency offset. Furthermore, pilot symbols are inserted in specific carriers such as carrier 2 and carrier 5 and used for the receiver to estimate frequency offset and/or phase noise. The preambles and pilot symbols are those whose signal point constellations on the in-phase I—quadrature Q plane are known. On the other hand, data is transmitted by means of data symbols.

The wireless LAN scheme is described in Non-Patent Document 1.

Non-Patent Document 1: "High speed physical layer (PHY) in 5 GHz band" IEEE802.11a, 1999

DISCLOSURE OF INVENTION

Problems to be Solved by the Invention

Non-Patent Document 1 shows the symbol configuration for frequency offset estimation, transmission path fluctuation (channel fluctuation) estimation and synchronization/signal detection in a case using OFDM.

By the way, since further improvement of transmission speed can be expected in the wireless LAN by combining the scheme disclosed in Non-Patent Document 1 with a MIMO system using spatial multiplexing or SDM: Spatial Division Multiplexing, it is possible to provide users a wide variety of services.

Obtaining high reception quality in this MIMO-OFDM system requires high accuracy frequency offset estimation, high accuracy transmission path fluctuation estimation and high accuracy synchronization/signal detection.

However, in the present circumstances, sufficient consideration has not been given to the method of transmitting symbols for transmission path estimation and symbols for frequency offset estimation to realize high accuracy frequency offset estimation, high accuracy transmission path fluctuation estimation and high accuracy synchronization/signal detection.

It is an object of the present invention to provide a MIMO-OFDM transmission apparatus and a MIMO-OFDM transmission method capable of high accuracy frequency offset estimation, high accuracy transmission path fluctuation estimation and high accuracy synchronization/signal detection.

Means for Solving the Problem

The MIMO-OFDM transmission apparatus according to the present invention transmits OFDM-modulated data symbols from a plurality of antennas in a data transmission period and transmits pilot symbols from specific carriers of the plurality of antennas in the data transmission period, and employs a configuration having: an OFDM signal forming section that forms OFDM signals transmitted from the antennas; and a pilot symbol mapping section that assigns orthogonal sequences to the same carriers in OFDM signals transmitted from the antennas at the same time, in the time domain, and forms pilot carriers.

According to this configuration, orthogonal sequences are assigned to corresponding subcarriers among OFDM signals transmitted at the same time from the respective antennas in the time domain to form pilot carriers, so that, even when pilot symbols are multiplexed among a plurality of channels (antennas), it is possible to estimate frequency offset/phase noise with high accuracy. Furthermore, since pilot symbols of each channel can be extracted without using a channel estimation value (transmission path fluctuation estimation value), it is possible to simplify the configuration of the section for compensating for the frequency offset/phase noise.

Furthermore, the MIMO-OFDM transmission apparatus of the present invention adopts a configuration where, when the OFDM signals are transmitted from two antennas, a pilot symbol mapping section forms pilot carriers such that: pilot signals of orthogonal sequences are used for the same carriers between a first antenna and a second antenna; pilot signals of different sequences are used for different carriers at the first antenna and the second antenna; and pilot signals of the same sequence are used at the first antenna and the second antenna.

According to this configuration, when MIMO-OFDM transmission is carried out using two transmission antennas, it is possible to realize a transmission apparatus capable of minimizing an increase of transmission peak power in a simple configuration without degrading estimation accuracy for frequency offset/phase noise.

Moreover, the MIMO-OFDM transmission apparatus of the present invention adopts a configuration, wherein, when the OFDM signals are transmitted from three antennas, a pilot symbol mapping section forms pilot carriers such that: pilot signals of orthogonal sequences are used for the same carriers among a first antenna, a second antenna and a third antenna; there is an antenna where pilot signals of different sequences are used for carriers assigned the pilot signals; and there are two or more antennas where pilot signals of the same sequence are used.

According to this configuration, when MIMO-OFDM transmission is carried out using three transmission antennas, it is possible to realize a transmission apparatus capable of minimizing an increase of transmission peak power in a simple configuration without degrading the estimation accuracy for frequency offset/phase noise.

ADVANTAGEOUS EFFECT OF THE INVENTION

According to the present invention, it is possible to realize a MIMO-OFDM transmission apparatus and a MIMO-OFDM transmission method capable of high accuracy frequency offset estimation, high accuracy transmission path fluctuation estimation and high accuracy synchronization/signal detection.

BRIEF DESCRIPTION OF DRAWINGS

FIG. 5 provides diagrams showing a signal point constellation of data symbols, where FIG. 5A shows a signal point constellation of BPSK, FIG. 5B shows a signal point constellation of QPSK, FIG. 5C shows a signal point constellation of 16QAM, FIG. 5D shows a signal point constellation of 64QAM and FIG. 5E shows normalization factors by which signals of the respective modulation schemes are multiplied;

FIG. 8 illustrates signal point constellations of preambles according to Embodiment 1;

FIG. 10 illustrates signal point constellations of preambles according to Embodiment 1;

FIG. 12 illustrates signal point constellations of preambles according to Embodiment 1;

FIG. 18 illustrates signal point constellations of preambles according to Embodiment 2;

FIG. 19 illustrates signal point constellations of preambles according to Embodiment 2;

FIG. 21 shows a relationship between a communication scheme and a normalization factor according to Embodiment 3;

FIG. 22 illustrates signal point constellations of preambles according to Embodiment 3;

FIG. 23 illustrates signal point constellations of preambles of according to Embodiment 3;

FIG. 26 shows another equation of a relationship between a communication scheme and a normalization factor;

FIG. 27 provides diagrams showing the frame configuration according to Embodiment 5, where (a) shows the frame configuration of channel A, (b) shows the frame configuration of channel B and (c) shows the frame configuration of channel. C;

FIG. 34 provides diagrams showing other examples of the frame configuration according to Embodiment 5, where (a) shows the frame configuration of channel A, (b) shows the frame configuration of channel B and (c) shows the frame configuration of channel C;

FIG. 35 provides diagrams showing further examples of the frame configuration according to Embodiment 5, where (a) shows the frame configuration of channel A, (b) shows the frame configuration of channel B and (c) shows the frame configuration of channel C;

FIG. 45 provides diagrams showing the frame configuration according to

Figure 47:
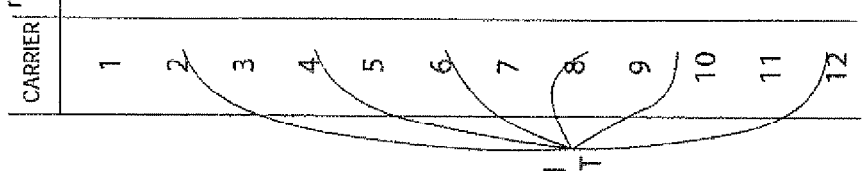
Figure 49:
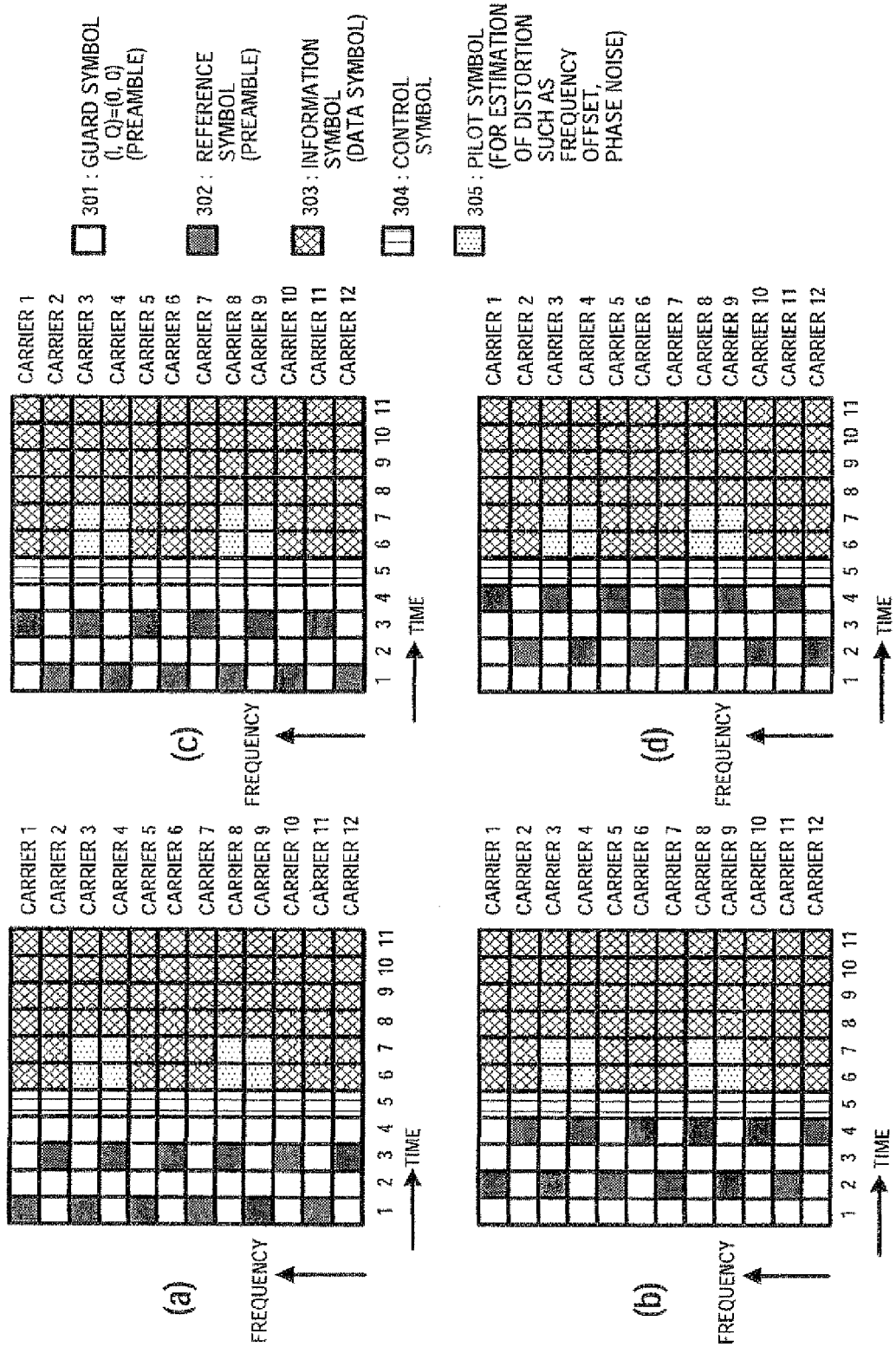

Embodiment 8, where (a) shows the frame configuration of channel A, (b) shows the frame configuration of channel B, (c) shows the frame configuration of channel C and (d) shows the frame configuration of channel D;

FIG. 46 shows a relationship between a reference symbol modulation scheme and a normalization factor when carrying out transmission based on a quadruple transmission spatial multiplexing MIMO scheme;

FIG. 47 shows mapping examples of reference symbols when carrying out transmission based on a quadruple transmission spatial multiplexing MIMO scheme;

FIG. 48 shows mapping examples of reference symbols when carrying out transmission based on a quadruple transmission spatial multiplexing MIMO scheme; and FIG. 49 provides diagrams showing other examples of the frame configuration according to Embodiment 8, where (a) shows the frame configuration of channel A, (b) shows the frame configuration of channel B, (c) shows the frame configuration of channel C and (d) shows the frame configuration of channel D.

BEST MODE FOR CARRYING OUT THE INVENTION

Hereinafter, embodiments of the present invention will be explained in detail with reference to the attached drawings.

Embodiment 1

This embodiment will explain the configuration of a MIMO system using spatial multiplexing and the configurations of a transmission apparatus and a reception apparatus in the system, and will also explain the configurations of pilot symbols, preambles and reference symbols which enables the improvement of estimation accuracy of frequency offset, transmission path fluctuation and synchronization, and the probability of signal detection.

Figure 1:
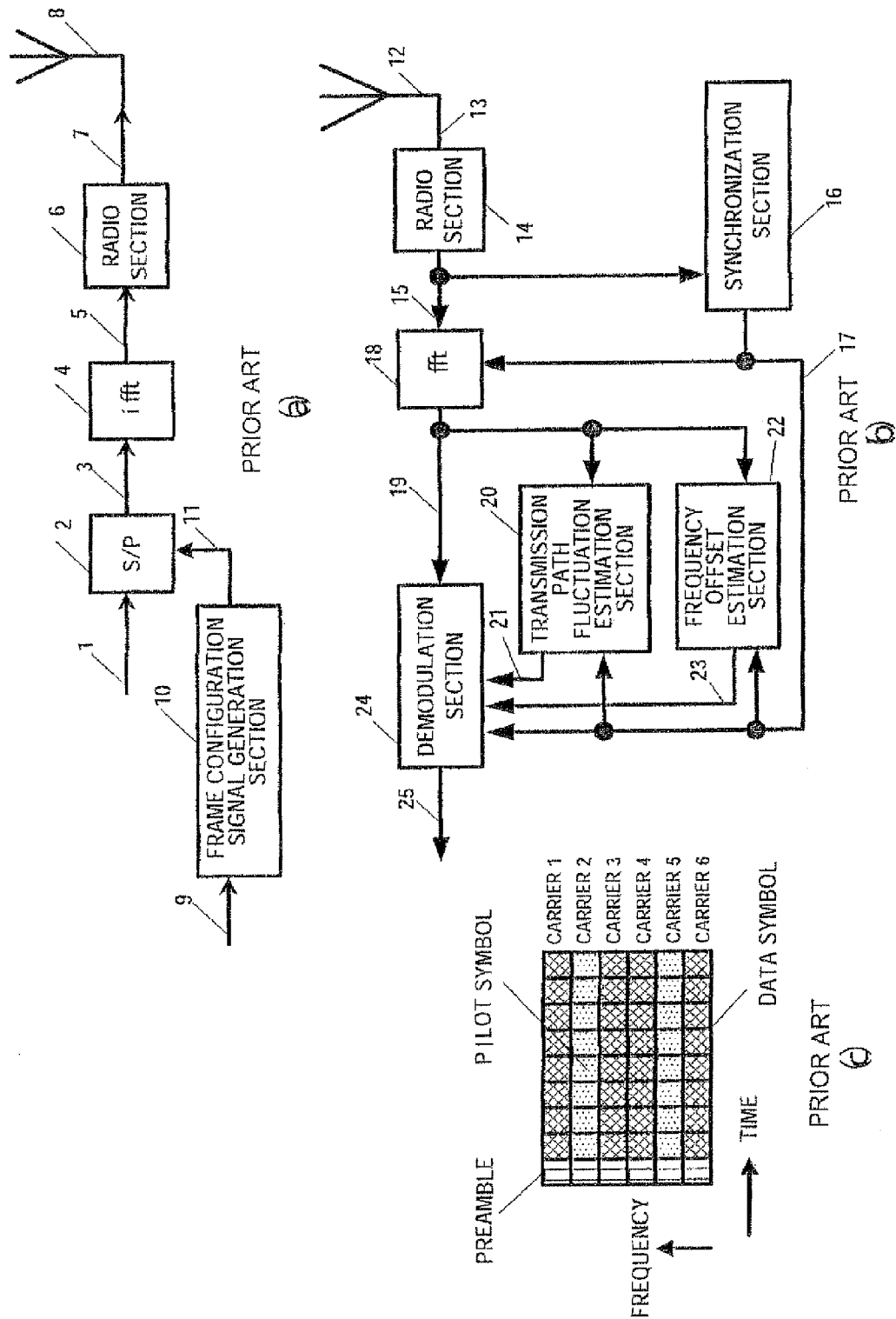
FIG. 1 provides block diagrams illustrating a conventional radio communication system, where (a) shows a configuration example of a transmission apparatus, (b) shows a configuration example of a reception apparatus and (c) shows a configuration example of transmission frame.
Figure 2:
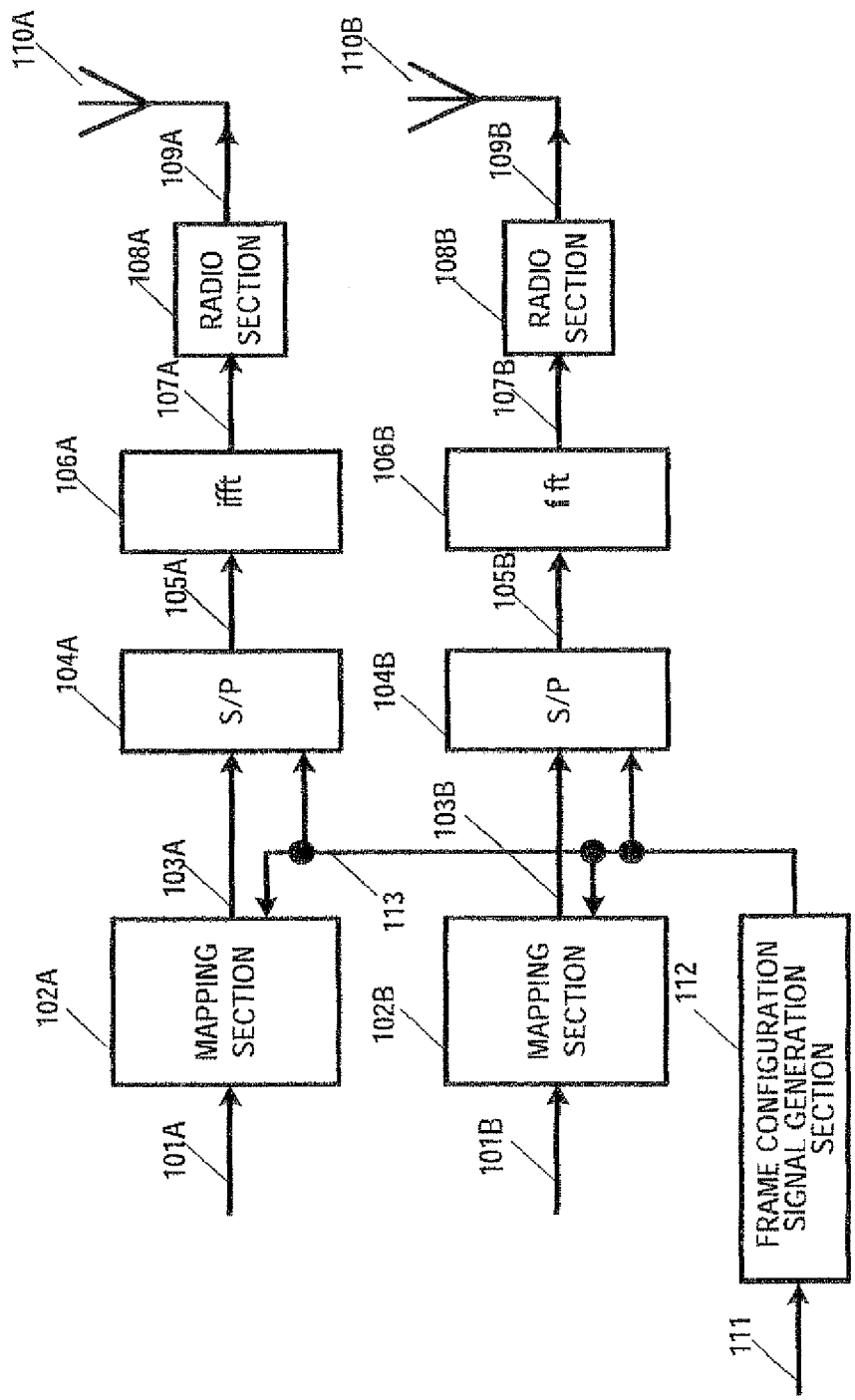
FIG. 2 is a block diagram showing the configuration of a MIMO-OFDM transmission apparatus according to Embodiment 1 of the present invention.

FIG. 2 shows the configuration of MIMO-OFDM transmission apparatus 100 according to this embodiment. However, FIG. 2 shows a case where the number of transmission antennas m=2 as an example.

Frame configuration signal generation section 112 receives control information 111 on a modulation scheme or the like as input, generates frame configuration signal 113 which includes information on the frame configuration and outputs this.

Mapping section 102A receives transmission digital signal 101A of channel. A and frame configuration signal 113 as input, generates baseband signal 103A based on the frame configuration and outputs this.

Serial/parallel conversion section 104A receives baseband signal 103A and frame configuration signal 113 as input, applies a serial/parallel conversion thereto based on frame configuration signal 113 and outputs parallel signal 105A.

Inverse Fourier transform section 106A receives parallel signal 105A as input, applies an inverse Fourier transform thereto and outputs signal 107A after the inverse Fourier transform.

Radio section 108A receives signal 107A after the inverse Fourier transform as input, applies processing such as a frequency conversion and outputs transmission signal 109A. Transmission signal 109A is output as a radio wave from antenna 110A.

MIMO-OFDM transmission apparatus 100 also generates transmission signal 109B of channel B by applying processing similar to that on channel A to channel B. The element indicated with "B" appended at the end of the reference numeral is a part related to channel B, which simply means that the target signal is not channel A but channel B and is basically subjected to processing similar to that on the above described part related to channel A indicated with "A" appended at the end of the reference numeral.

Figure 3A:
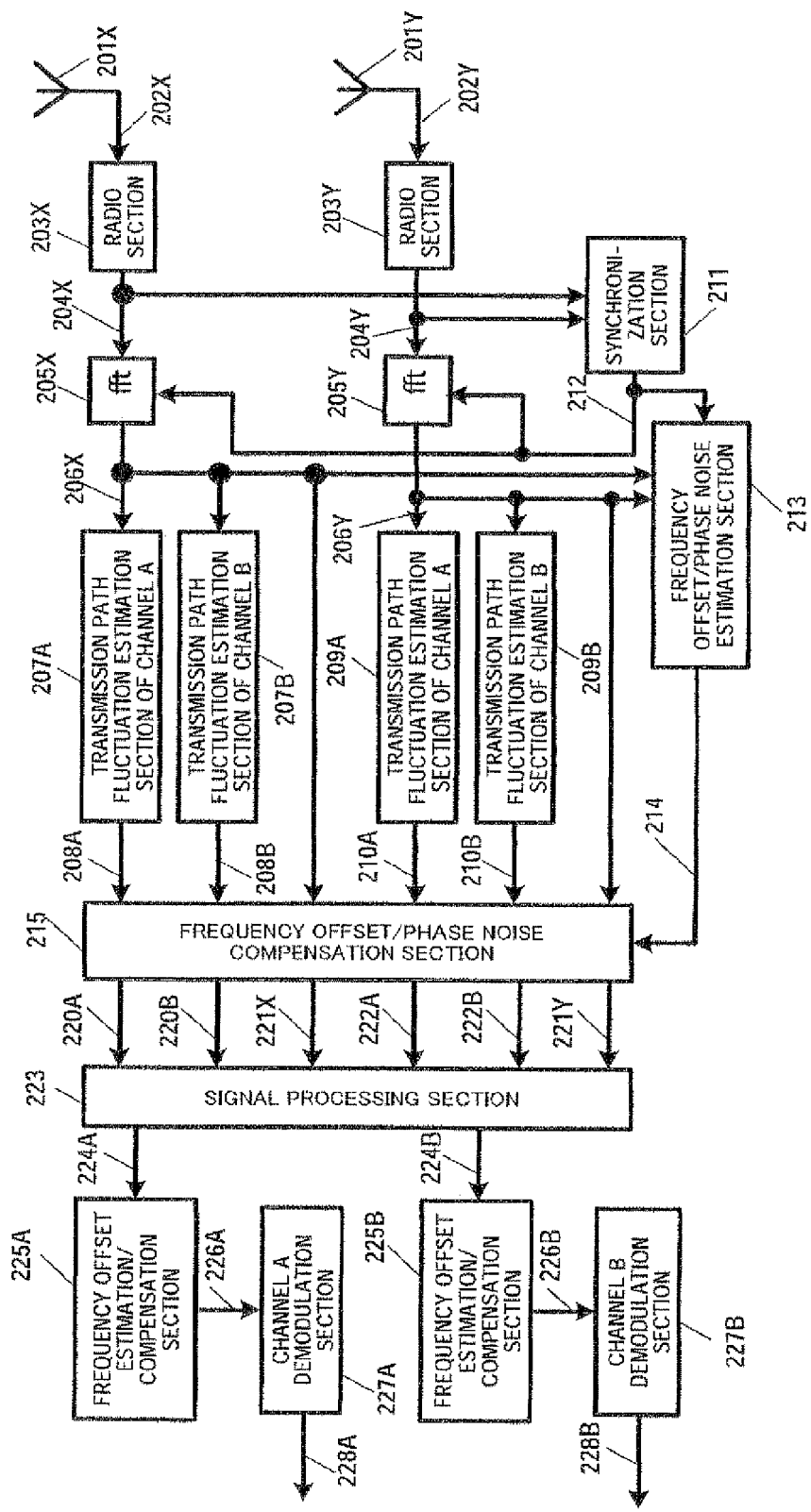
FIG. 3A is a block diagram showing the configuration of the MIMO-OFDM reception apparatus according to Embodiment 1 of the present invention.

FIG. 3A shows an example of the configuration of a reception apparatus according to this embodiment. However, FIG. 3A shows a case where the number of reception antennas n=2 as an example.

In reception apparatus 200, radio section 203X receives signal 202X received at reception antenna 201X as input, applies processing such as a frequency conversion thereto and outputs baseband signal 204X.

Fourier transform section 205X receives baseband signal 204X as input, applies a Fourier transform and outputs signal 206X after the Fourier transform.

A similar operation is also carried out on the reception antenna 201Y side and synchronization section 211 receives baseband signals 204X and 204Y as input, establishes time synchronization with a transmitter by detecting, for example, reference symbols and outputs timing signal 212. The configuration or the like of reference symbols will be explained in detail using FIG. 4 or the like.

Frequency offset/phase noise estimation section 213 receives signals 206X and 206Y after the Fourier transform as input, extracts pilot symbols and estimates frequency offset and/or phase noise from the pilot symbols and outputs phase distortion estimation signal 214 (phase distortion including frequency offset). The configuration or the like of pilot symbols will be explained in detail using FIG. 4 or the like.

Transmission path fluctuation estimation section 207A of channel A receives signal 206X after the Fourier transform as input, extracts reference symbols of channel A, estimates a transmission path fluctuation of channel A based on the reference symbols, for example, and outputs transmission path estimation signal 208A of channel A.

Transmission path fluctuation estimation section 207B of channel B receives signal 206X after the Fourier transform as input, extracts reference symbols of channel B, estimates a transmission path fluctuation of channel B based on the reference symbols, for example, and outputs transmission path estimation signal 208B of channel B.

Transmission path fluctuation estimation section 209A of channel A and transmission path fluctuation estimation section 209B of channel B receive a signal received at antenna 201Y as the target signal instead of a signal received at antenna 201X and basically carry out processing similar to that described above on transmission path fluctuation estimation section 207A of channel A and transmission path fluctuation estimation section 207B of channel B.

Frequency offset/phase noise compensation section 215 receives transmission path estimation signals 208A and 210A of channel A, transmission path estimation signals 208B and 210B of channel B, signals 206X and 206Y after the Fourier transform and phase distortion estimation signal 214 as input, removes the phase distortion of each signal and outputs transmission path estimation signals 220A and 222A of channel A after phase compensation, transmission path estimation signals 220B and 222B of channel B after phase compensation and signals 221X and 221Y after the Fourier transform and after phase compensation.

Figure 3B:
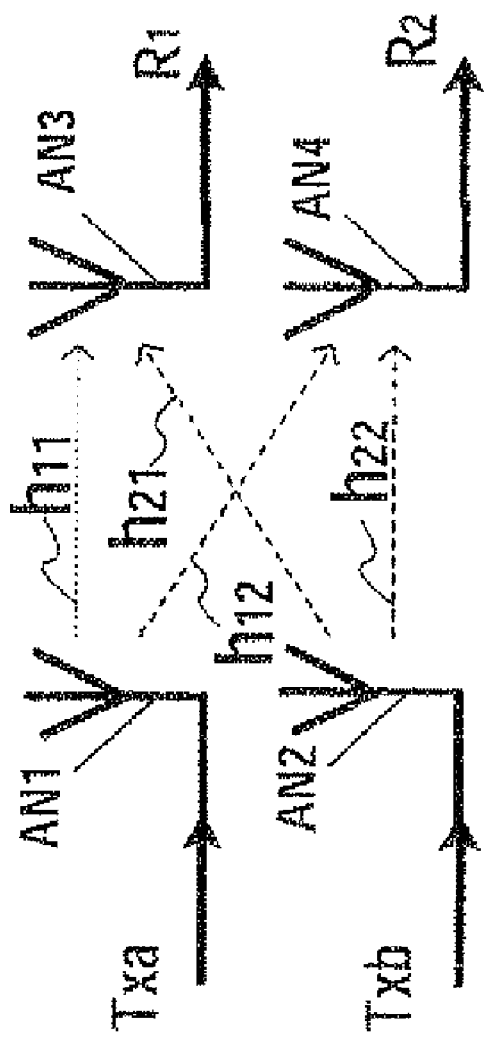
FIG. 3B shows a relationship between transmission and reception antennas according to Embodiment 1.

Signal processing section 223 carries out, for example, an inverse matrix operation and outputs baseband signal 224A of channel A and baseband signal 224B of channel B. More specifically, as shown in FIG. 3B, for example, assuming that for a certain subcarrier, a transmission signal from antenna AN1 is Txa(t), a transmission signal from antenna AN2 is Txb(t), a received signal of antenna AN3 is R1(t), a received signal of antenna AN4 is R2(t) and transmission path fluctuations are h11(t), h12(t), h21(t) and h22(t) respectively, the following relationship equation holds.

[Equation 1]

$$\begin{pmatrix} R1(t) \\ R2(t) \end{pmatrix} = \begin{pmatrix} h11(t) & h12(t) \\ h21(t) & h22(t) \end{pmatrix} \begin{pmatrix} Txa(t) \\ Txb(t) \end{pmatrix} + \begin{pmatrix} n1(t) \\ n2(t) \end{pmatrix} \quad (1)$$

where t is time, n1(t) and n2(t) is noise. Signal processing section 223 obtains a signal of channel A and a signal of channel B by carrying out, for example, an operation of an inverse matrix using Equation (1). Signal processing section 223 executes this operation on all subcarriers. h11(t), h12(t), h21(t) and h22(t) are estimated by transmission path fluctuation estimation sections 207A, 209A, 207B and 209B.

Frequency offset estimation/compensation section 225A receives baseband signal 224A of channel A as input, extracts pilot symbols, estimates and compensates for frequency offset of baseband signal 224A based on the pilot symbols and outputs baseband signal 226A after frequency offset compensation.

Channel A demodulation section 227A receives baseband signal 226A after the frequency offset compensation as input, demodulates data symbols and outputs received data 228A.

MIMO-OFDM reception apparatus 200 also applies similar processing to baseband signal 224B of channel B and obtains received data 228B.

Figure 4:
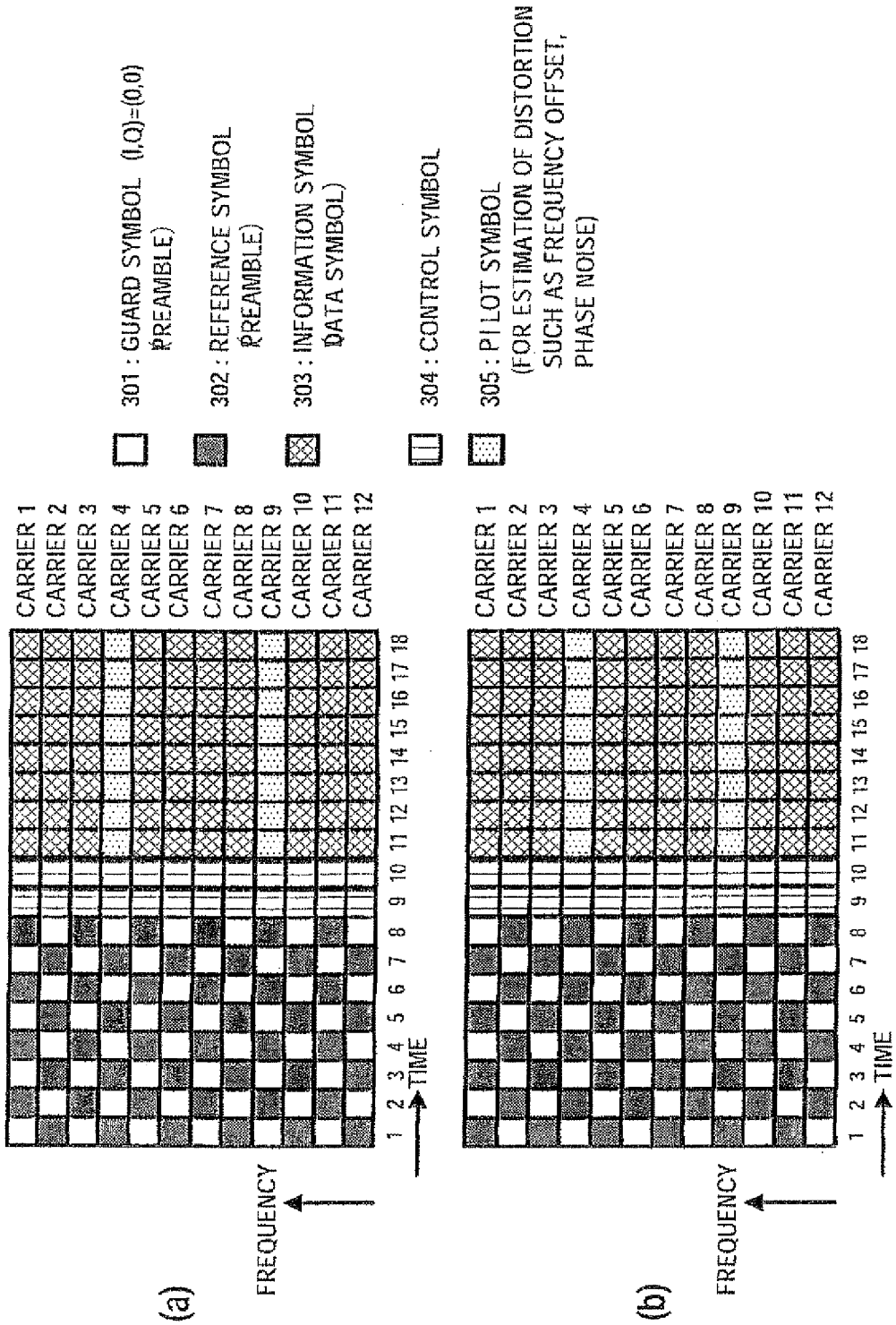
FIG. 4 provides diagrams showing frame a frame configuration of a signal transmitted from each antenna of Embodiment 1, where (a) shows the frame configuration of channel A and (b) shows the frame configuration of channel B.

FIG. 4 shows a time—frequency frame configuration of channel A (FIG. 4(*a*)) and channel B (FIG. 4(*b*)) of this embodiment. Signals at the same time on the same carriers in FIG. 4(*a*) and FIG. 4(*b*) are spatially multiplexed.

From time 1 to time 8, symbols for estimating transmission path fluctuations corresponding to h11(t), h12(t), h21(t) and h22(t) in Equation (1), for example, symbols called "preambles" are transmitted. This preamble is composed of guard symbol 301 and reference symbol 302. Guard symbol 301 is assumed to be (0, 0) on the in-phase I—quadrature Q plane. Reference symbol 302 is, for example, a symbol at known coordinates other than (0, 0) on the in-phase I—quadrature Q plane. Channel A and channel B are configured such that no interference occurs with each other. That is, when, for example, guard symbol 301 is placed on channel A on carrier 1 at time 1, reference symbol 302 is placed on channel B and when reference symbol 302 is placed on channel A on carrier 2 at time 1, guard symbol 301 is placed on channel B, and in this way different symbols are placed on channel A and channel B. By adopting such an arrangement, when, for example, attention is focused on channel A at time 1, it is possible to estimate a transmission path fluctuation of carrier 3 using reference symbols 302 of carrier 2 and carrier 4. Since carrier 2 and carrier 4 are reference symbols 302, the transmission path fluctuation can be estimated. Therefore, transmission path fluctuations of all carriers of channel A can be accurately estimated at time 1. In the same way, transmission path fluctuations of all carriers can be accurately estimated for channel B, too. From time 2 to time 8, transmission path fluctuations of all carriers of channel A and channel B can be estimated in the same way. Thus, since the frame configuration in FIG. 4 allows transmission path fluctuations of all carriers to be estimated at all times from time 1 to time 8, this can be said to be a preamble configuration capable of realizing quite high accuracy estimation of transmission path fluctuations.

In FIG. 4, information symbol (data symbol) 303 is a symbol for transmitting data. Here, suppose the modulation scheme is BPSK, QPSK, 16QAM or 64QAM. A signal point constellation on the in-phase I—quadrature Q plane or the like in this case will be explained in detail using FIG. 5.

Control symbol 304 is a symbol for transmitting control information on a modulation scheme, error correcting coding scheme, coding rate or the like.

Pilot symbol 305 is a symbol for estimating a phase fluctuation by frequency offset and/or phase noise. For example, a symbol having known coordinates on the in-phase I—quadrature Q plane is used as pilot symbol 305. Pilot symbols 305 are placed on carrier 4 and carrier 9 on both channel A and channel B. When a wireless LAN builds a system at the same frequency and in the same frequency band according to IEEE802.11a, IEEE802.11g and spatial multiplexing MIMO system, this allows the frame configuration to be shared, and therefore it is possible to simplify the reception apparatus.

FIG. 5 shows signal point constellations of BPSK, QPSK, 16QAM and 64QAM which are modulation schemes of information symbols 303 in FIG. 4 on the in-phase I—quadrature Q plane and normalization factors thereof.

FIG. 5A shows a signal point constellation of BPSK on the in-phase I—quadrature Q plane and their coordinates are as shown in FIG. 5A. FIG. 5B is a signal point constellation of QPSK on the in-phase I—quadrature Q plane and their coordinates are as shown in FIG. 5B. FIG. 5C is a signal point constellation of 16QAM on the in-phase I—quadrature Q plane and their coordinates are as shown in FIG. 5C. FIG. 5D is a signal point constellation of 64QAM on the in-phase I—quadrature Q plane and their coordinates are as shown in FIG. 5D. FIG. 5E shows a relationship between a modulation scheme and a multiplication factor (i.e., normalization factor) for correcting signal point constellations in FIG. 5A to FIG. 5D so that average transmit power is kept constant among different modulation schemes. For example, when transmission is carried out under the modulation scheme of QPSK in FIG. 5B, as is clear from FIG. 5E, it is necessary to multiply the coordinates in FIG. 5B by a value of 1/sqrt(2). Here, sqrt(x) refers to the square root of x.

Figure 6:
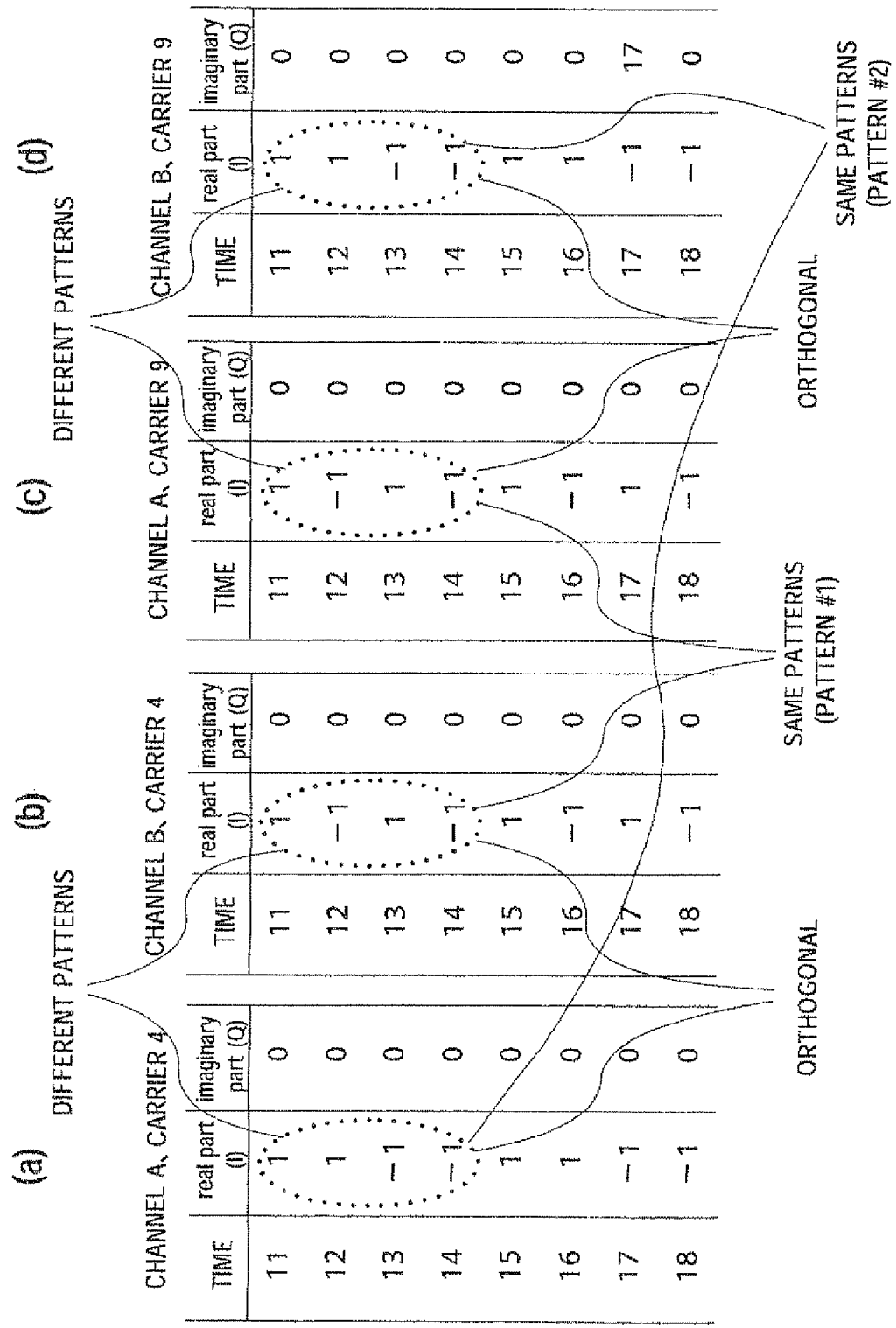
FIG. 6 illustrates signal point constellations of pilot symbols according to Embodiment 1.

FIG. 6 shows an arrangement of pilot symbols 305 in FIG. 4 on the in-phase I—quadrature Q plane according to this embodiment. FIG. 6(a) shows an example of signal point constellation of pilot symbols 305 from time 11 to time 18 on carrier 4 of channel A shown in FIG. 4(a). FIG. 6(b) shows an example of signal point constellation of pilot symbols 305 from time 11 to time 18 on carrier 4 of channel B shown in FIG. 4(b). FIG. 6(c) shows an example of signal point constellation of pilot symbols 305 from time 11 to time 18 on carrier 9 of channel A shown in FIG. 4(a). FIG. 6(d) shows an example of signal point constellation of pilot symbols 305 from time 11 to time 18 on carrier 9 of channel B shown in FIG. 4(b). Here, BPSK modulation is used for these arrangements but the modulation is not limited to this.

A feature of the signal point constellations of pilot symbols 305 in FIG. 6 is that the signal point constellations on the same carriers of channel A and channel B are orthogonal to each other (cross-correlation is zero).

For example, the signal point constellation from time 11 to time 14 of channel A on carrier 4 is orthogonal to the signal point constellation from time 11 to time 14 of channel B on carrier 4. Furthermore, the same applies to time 15 to time 18. The signal point constellation from time 11 to time 14 of channel A on carrier 9 is also orthogonal to the signal point constellation from time 11 to time 14 of channel B on carrier 9. Furthermore, the same applies to time 15 to time 18. At this time, using a Walsh-Hadamard conversion, orthogonal codes or the like is suitable because of the orthogonality of signals. FIG. 6 shows the case of BPSK, but if signals are orthogonal, QPSK modulation may also be used or it may not be necessary to follow the rule of the modulation scheme.

Furthermore, in the case of this embodiment, for simplicity of the receiver, suppose the signal point constellations are the same (same pattern) between carrier 4 of channel A and carrier 9 of channel B and between carrier 9 of channel A and carrier 4 of channel B (here, as shown in FIG. 6, they are named "pattern #1" and "pattern #2"). The reason will be explained in detail in FIG. 7. However, the same pattern does not mean to adopt completely the same signal point constellation. For example, a case where only the phase relationship is different on the in-phase I—quadrature Q plane can also be regarded as the same pattern.

Furthermore, the signal point constellation of pilot symbols 305 is made to differ between carriers 4 and 9 of channel A (or channel B) and this is because using the same signal point constellation may lead to an increase of transmission peak power. However, the pattern defined above may be the same. In other words, it is important that the signal point constellations are different.

Here, an advantage of orthogonality will be explained in detail using FIG. 3A and FIG. 7 first.

Figure 7:
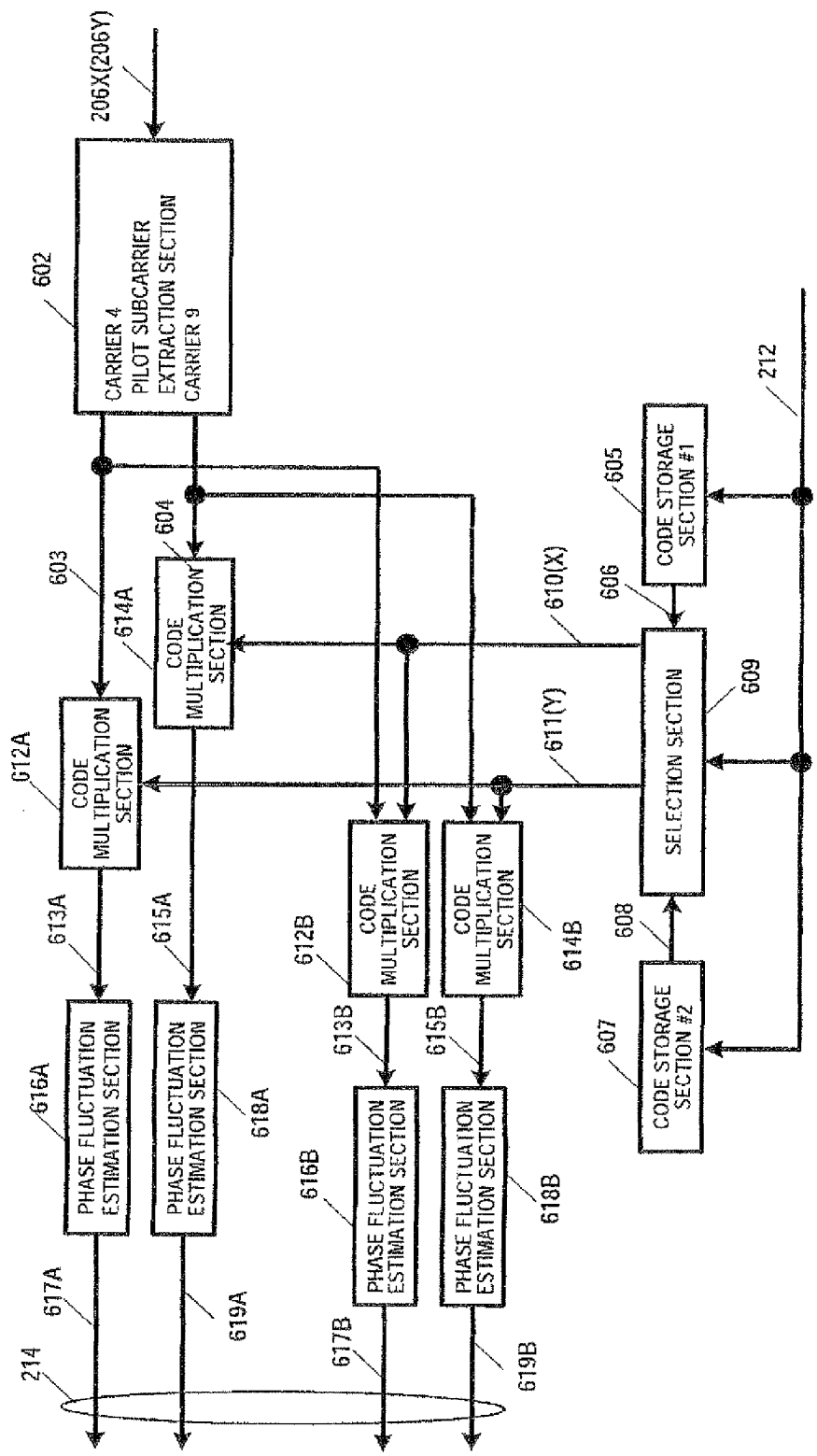
FIG. 7 is a block diagram showing the configuration of frequency offset/phase noise compensation section.

FIG. 7 is an example of the configuration of frequency offset/phase noise estimation section 213 in FIG. 3A. Pilot carrier extraction section 602 receives signal 206X (or 206Y) after a Fourier transform as input and extracts subcarrier which are pilot symbols 305. More specifically, it extracts signals of carrier 4 and carrier 9. Therefore, pilot carrier extraction section 602 outputs baseband signal 603 of carrier 4 and baseband signal 604 of carrier 9.

Code storage section 605 stores, for example, pattern #1 in FIG. 6 and outputs signal 606 of pattern #1 according to timing signal 212.

Code storage section 607 stores, for example, pattern #2 in FIG. 6 and outputs signal 608 of pattern #2 according to timing signal 212.

Selection section 609 receives timing signal 212, signal 606 of pattern #1 and signal 608 of pattern #2 as input, outputs the signal of pattern #2 as selection signal 610(X) and outputs the signal of pattern #1 as selection signal 611(Y).

Code multiplication section 612A receives baseband signal 603 of carrier 4 and selection signal 611(Y) as input, multiplies baseband signal 603 of carrier 4 by selection signal 611(Y), generates baseband signal 613A of channel A of carrier 4 and outputs this. The reason is as follows.

Baseband signal 603 of carrier 4 is a signal in which the baseband signal of channel A and the baseband signal of channel B are multiplexed. On the other hand, when this is multiplied by selection signal 611(Y), that is, the signal of pattern #1, the component of the baseband signal of channel B whose cross-correlation is zero is removed and only the component of the baseband signal of channel A can be extracted.

In the same way, code multiplication section 614A receives baseband signal 604 of carrier 9 and selection signal 610(X) as input, multiplies baseband signal 604 of carrier 9 by selection signal 610(X), generates baseband signal 615A of channel A of carrier 9 and outputs this.

Code multiplication section 612B receives baseband signal 603 of carrier 4 and selection signal 610(X) as input, multiplies baseband signal 603 of carrier 4 by selection signal 610(X), generates baseband signal 613B of channel B of carrier 4 and outputs this.

Code multiplication section 614B receives baseband signal 604 of carrier 9 and selection signal 611(Y) as input, multiplies baseband signal 604 of carrier 9 by selection signal 611(Y), generates baseband signal 615B of channel B of carrier 9 and outputs this.

As described above, by making signal point constellations of channel A and channel B on the same carriers orthogonal to each other, even when pilot symbols 305 are multiplexed on channel A and channel B, it is possible to estimate frequency offset and/or phase noise with high accuracy. Another important advantage is that since no channel estimation value (transmission path fluctuation estimation value) is required, it is possible to simplify the configuration of the part for compensating for the frequency offset and/or phase noise. If signal point constellations of pilot symbols 305 of channel A and channel B are not orthogonal to each other, signal processing of MIMO demultiplexing, for example, ZF (Zero Forcing), MMSE (Minimum Mean Square Error) or MLD (Maximum. Likelihood Detection) is carried out, frequency offset and/or phase noise are then estimated. On the other hand, according to the configuration of this embodiment, it is possible to compensate for frequency offset and/or phase noise before demultiplexing a signal (signal processing section 223) as shown in FIG. 3A. In addition, the frequency offset and/or phase noise can be removed using pilot symbols 305 even after demultiplexing the signal of channel A from the signal of channel B by signal processing section 223, thereby making it possible to compensate for the frequency offset and/or phase noise with higher accuracy.

By the way, when the signal point constellations of channel A and channel B of the same carriers are not orthogonal to each other, the estimation accuracy for frequency offset and/or phase noise by frequency offset/phase noise estimation section 213 in FIG. 3A decreases (signals become components of interference with each other), and therefore it is difficult to add the frequency offset/phase noise compensation section 215 in FIG. 3A and it is not possible to realize high accuracy frequency offset/phase noise compensation.

Furthermore, this embodiment assumes the same signal point constellation (same pattern) for carrier 4 of channel A and carrier 9 of channel B, and carrier 9 of channel A and carrier 4 of channel B, thereby providing commonality between code storage sections 605 and 607 in FIG. 7 and leading to simplification of the reception apparatus.

However, while it is essential in this embodiment that signal point constellations of channel A and channel B on the same carriers be orthogonal to each other, it is not necessarily essential that they have the same pattern.

This embodiment has been explained using an example where pilot symbols 305, which are orthogonal to each other in four-symbol units, from time 11 to time 14, but the present invention is not limited to four-symbol units. However, when considering an influence on the orthogonality due to a fluctuation of fading in the time direction, if an orthogonal pattern is formed in 2 to 8-symbol units, it may be possible to secure the estimation accuracy for frequency offset/phase noise. When the period of an orthogonal pattern is too long, the possibility that the orthogonality may not be secured increases and the estimation accuracy for frequency offset/phase noise degrades. Furthermore, the case where the number of transmission antennas is 2 and two modulated signals are transmitted has been explained, but the present invention is not limited to this and even in a case where the number of transmission antennas is 3 or more and three or more modulated signals are transmitted, it is possible to obtain effects similar to those described above by making pilot symbols 305 existing on the same carriers orthogonal to each other in several-symbol units.

Next, the configuration of reference symbols 302 in preambles of FIG. 4 which makes it possible to simplify the reception apparatus and suppress the degradation of the accuracy of transmission path estimation due to quantization errors which occur at the reception apparatus will be explained in detail.

FIG. 8 shows signal point constellations of preambles on the in-phase I—quadrature Q plane according to this embodiment, especially signal point constellations at times 1, 3, 5, 7 at which reference symbols 302 are arranged on carriers 2, 4, 6, 8, 10, 12.

Here, signals formed at times 1, 3, 5, 7 of carrier 2, signals formed at times 1, 3, 5, 7 of carrier 4, signals formed at times 1, 3, 5, 7 of carrier 6, signals formed at times 1, 3, 5, 7 of carrier 8, signals formed at times 1, 3, 5, 7 of carrier 10 and signals formed at times 1, 3, 5, 7 of carrier 12 have the same pattern on the in-phase I—quadrature Q plane though their phase relationships are different. This can simplify the reception apparatus.

Likewise adopting the same pattern for carriers 1, 3, 5, 7, 9, 11, too leads to simplification of the reception apparatus though their phase relationships are different. Here, making the pattern of even numbered carriers and the pattern of the odd numbered carrier same can further simplify the reception apparatus. However, even when they are different, there is an advantage to a certain degree in the aspect of simplification of the reception apparatus. This is because only one necessary pattern signal is added. Similarly, adopting the same pattern for channel A and channel B leads to further simplification of the reception apparatus, but adopting different patterns also has an advantage to a certain degree.

Hereinafter, the point related to the simplification of the configuration of the reception apparatus will be explained. However, a case where the pattern of even numbered carriers and the pattern of odd numbered carriers are the same will be explained as an example.

Figure 9:
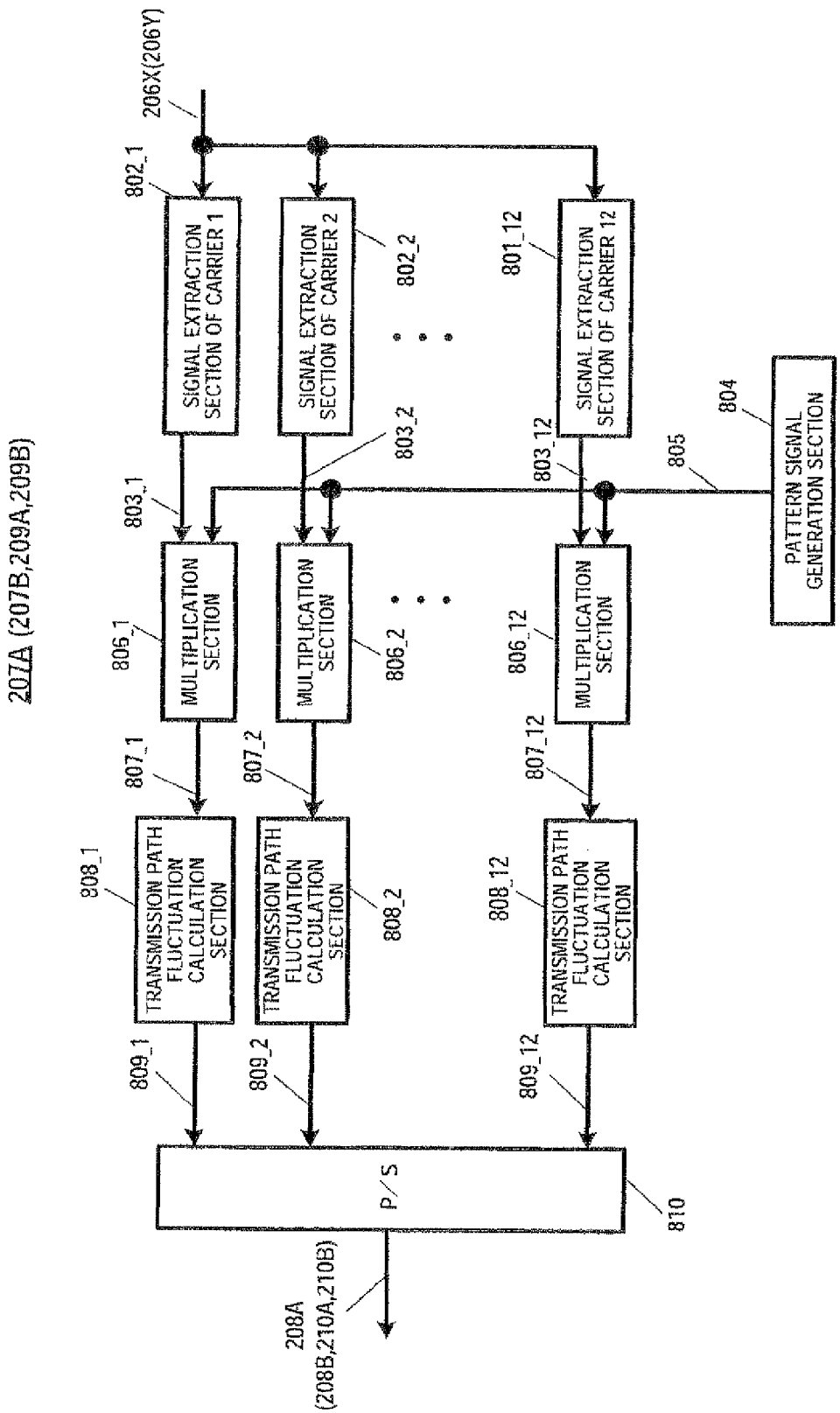
FIG. 9 is a block diagram showing the configuration of a transmission path fluctuation estimation section.

FIG. 9 shows the configuration of the details of transmission path fluctuation estimation sections 207 and 209 of the reception apparatus in FIG. 3A. Here, estimation of the transmission path fluctuation of channel A will be explained as an example.

Signal extraction section 802_1 of carrier 1 receives signal 206X (206Y) after a Fourier transform as input, extracts signals corresponding to reference symbols 302 (times 2, 4, 6, 8) of carrier 1 in the preambles of channel A shown in FIG. 4(*a*) and outputs reference signal 803_1 of carrier 1.

Signal extraction section 802_2 of carrier 2 receives signal 206X (206Y) after a Fourier transform as input, extracts signal corresponding to reference symbols 302 (times 1, 3, 5, 7) of carrier 2 in the preambles of channel A shown in FIG. 4(*a*) and outputs reference signal 803_2 of carrier 2.

Similar operations are also performed at signal extraction sections of carrier 3 to carrier 12.

Pattern signal generation section 804 outputs pattern signal 805 of (1, 0), (−1, 0), (−1, 0), (1, 0) on the in-phase I—quadrature Q plane (see the pattern in FIG. 8).

Multiplication section 806_1 receives reference signal 803_1 of carrier 1 and pattern signal 805 as input, multiplies reference signal 803_1 of carrier 1 by pattern signal 805 and applies signal processing of averaging or the like and outputs transmission path fluctuation estimation signal 8071 of carrier 1.

Multiplication section 806_2, to multiplication section 806_12 also operate in the same way and output transmission path fluctuation estimation signal 807_2 of carrier 2 to transmission path fluctuation estimation signal 807_12 of carrier 12.

Parallel/serial conversion section 810 receives transmission path fluctuation estimation signal 807_1 to transmission path fluctuation estimation signal 807_12 of carrier 1 to carrier 12 as input, applies a parallel/serial conversion and outputs transmission path fluctuation estimation signal 208A (208B, 210A, 210B).

In this way, pattern signal generation section 804 can be shared among carrier 1 to carrier 12, and therefore it is possible to reduce the storage capacity of pattern signals of pattern signal generation section 804 and standardize the signal processing and simplify the reception apparatus accordingly.

By the way, what is shown in FIG. 8 are signal point constellations on the in-phase I—quadrature Q plane when reference symbols 302 are modulated in BPSK and they are similar to the signal point constellations when data symbols 303 are modulated in BPSK and the normalization factors to be multiplied are also similar to those when data symbols 303 are modulated in BPSK. However, by so doing, if an analog/digital converter is mounted to carry out digital signal processing at the reception apparatus, the influence of quantization errors increases. An example of signal point constellation on the in-phase I—quadrature Q plane to solve this problem will be explained.

FIG. 10 shows an example of signal point constellation on the in-phase I—quadrature Q plane for solving this problem. As an example, BPSK modulation is used. At this time, suppose that the normalization factor is 1.0 and the signal point constellation of reference symbols 302 is (1.414≈sqrt(2), 0) or (−1.414≈sqrt(2), 0). In other words, a signal point constellation is assumed to be obtained by multiplying the signal point constellation when data symbols 303 are modulated in BPSK by coefficient 1.414.

Time fluctuation in the intensity of the received signal in such a case will be explained using FIG. 11.

Figure 11:
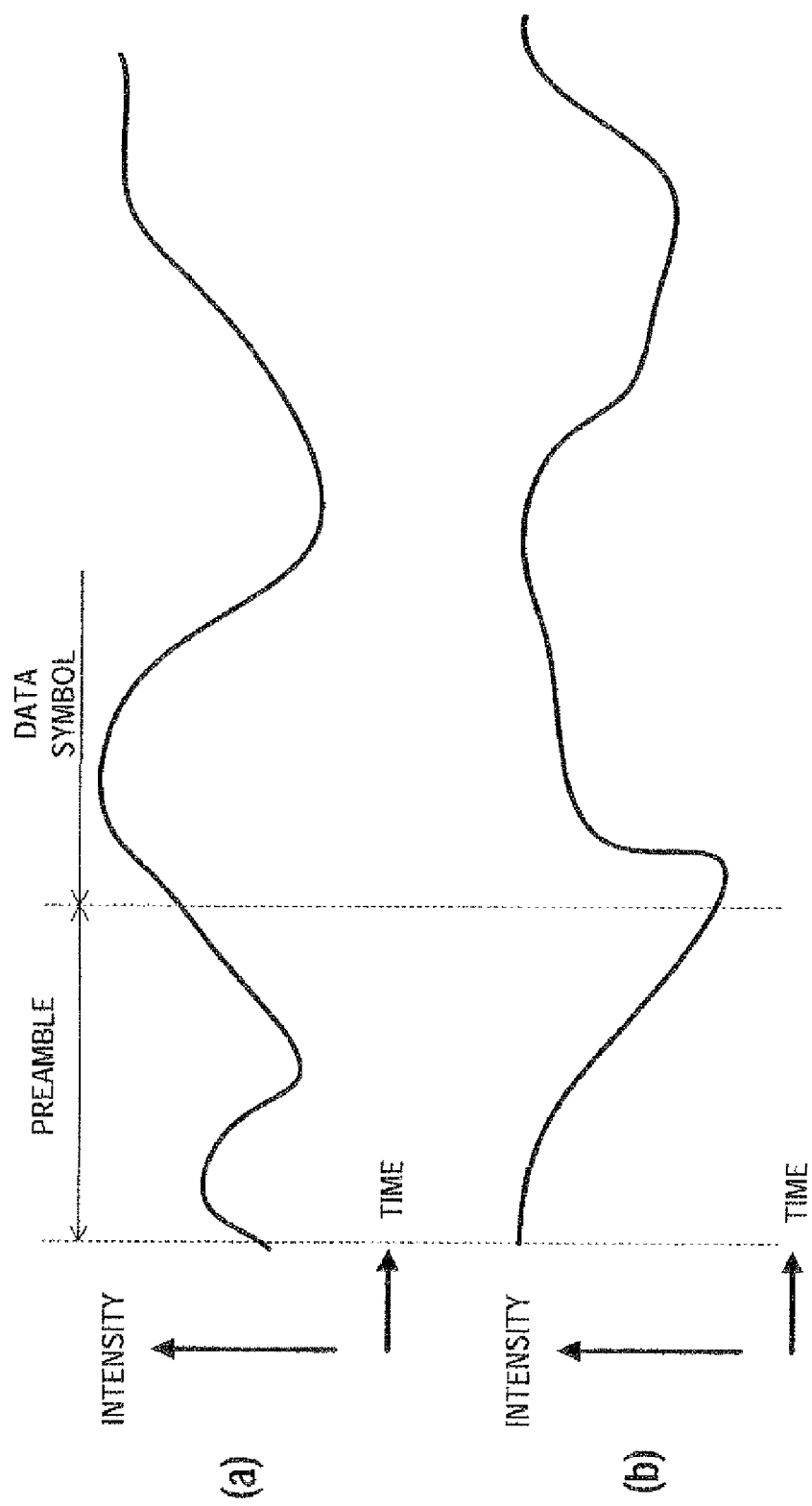
FIG. 11 shows time fluctuation of reception intensity of preambles and data symbols.

In FIG. 11, FIG. 11(*a*) shows time fluctuation of the waveform of the received signal when the signal point constellation of preambles in FIG. 8 is adopted and FIG. 11(*b*) shows time fluctuation of the waveform of the received signal when the signal point constellation of preambles in FIG. 10 is adopted. When the signal point constellation of preambles as shown in FIG. 8 is adopted, average reception power of preambles is smaller than average reception power of data symbols 303. This phenomenon is caused by the existence of guard symbols 301 when the same signal point constellation as that of data symbols 303 is carried out for reference symbols 302 of preambles. As a result, especially when a received signal is converted to a digital signal using an analog/digital converter, the quality of the received signals of preambles degrades due to the influence of quantization errors.

On the other hand, when the signal point constellation of preambles as shown in FIG. 10 is carried out, as shown in FIG. 11(*b*), the average reception power of preambles becomes equivalent to the average reception power of data symbols 303. Therefore, even if a received signal is converted to a digital signal using an analog/digital converter, the influence of quantization errors on the received signals of preambles is reduced and the quality is secured.

Based on a concept similar to that described above, FIG. 12 shows a method of signal point constellation when QPSK is adopted as the signal point constellation of reference symbols 302.

FIG. 12 shows an example of signal point constellation on the in-phase I—quadrature Q plane when QPSK modulation is applied to reference symbols 302 assuming that a normalization factor is 1. In this way, as shown in FIG. 11(*b*), the average reception power of preambles is equivalent to the average reception power of data symbols 303 and even if a signal is converted to a digital signal using an analog/digital converter, the influence of quantization errors on the received signals of preambles is reduced and the quality is secured.

As described above, when the modulation scheme called #X of data symbols 303 is used for reference symbols 302, it is important to use the signal point constellation which becomes 1.414≈sqrt(2) times the signal point constellation of data symbols 303 on the in-phase I—quadrature Q plane after multiplication by a normalization factor as the signal point constellation of reference symbols 302 on the in-phase I—quadrature Q plane after multiplication by a normalization factor. The factor 1.414≈sqrt(2) is a value determined because reference symbols 302 are arranged for every symbol on the frequency axis.

For example, when #X is QPSK, the signal point constellation on the in-phase I—quadrature Q plane after multiplication by a normalization factor is (±1/sqrt(2), ±1/sqrt(2)) and the signal point constellation of reference symbols 302 on the in-phase I—quadrature Q plane after multiplication by a normalization factor becomes (±1, ±1) according to the above described rule (see FIG. 12).

Figure 13:
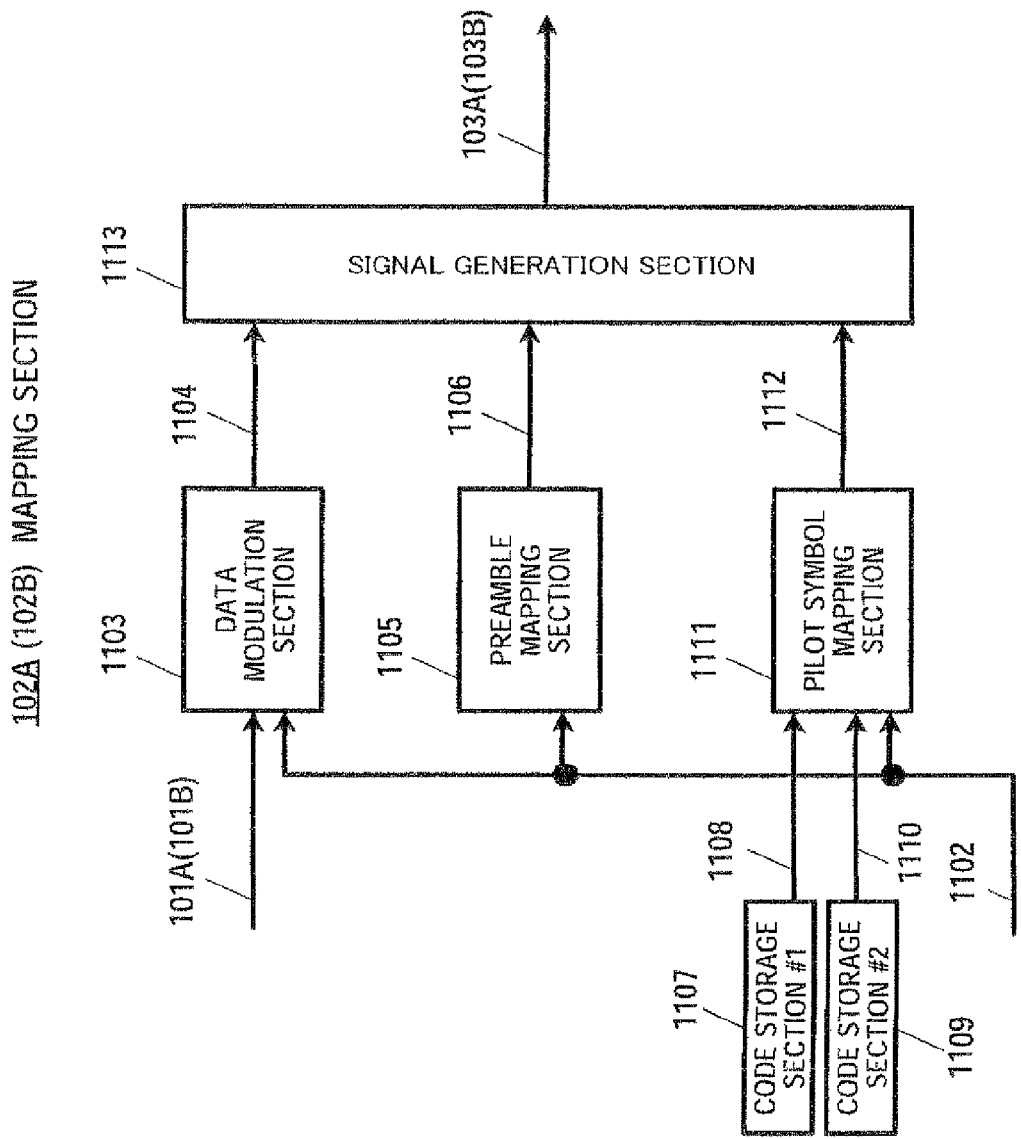
FIG. 13 is a block diagram showing the configuration of a mapping section according to an embodiment of the present invention.

FIG. 13 shows an example of the configuration of mapping section 102A (1028) of the transmission apparatus of this embodiment in FIG. 2. Data modulation section 1103 receives transmission digital signal 101A (101B) and frame configuration signal 1102 as input, applies modulation to transmission digital signal 101A (101B) based on the information on the modulation scheme and timing included in frame configuration signal 1102 and outputs modulated signal 1104 of data symbols 303.

Preamble mapping section 1105 receives frame configuration signal 1102 as input and outputs modulated signal 1106 of preambles based on the frame configuration.

Code storage section #1(1107) outputs signal 1108 of pattern #1. In the same way, code storage section #2 (1109) outputs signal 1110 of pattern #2.

Pilot symbol mapping section 1111 receives signal 1108 of pattern #1, signal 1110 of pattern #2 and frame configuration signal 1102 as input, generates modulated signal 1112 of pilot symbol 305 and outputs this.

Signal generation section 1113 receives modulated signal 1104 of data symbols 303, modulated signal 1106 of preambles and modulated signal 1112 of pilot symbols 305 as input, generates baseband signal 103A (103B) in accordance with the frame configuration and outputs this.

The above described explanation shows that adopting the configuration of pilot symbols 305 as shown in FIG. 4 and FIG. 6 can simplify the reception apparatus. Similarly, adopting the pilot symbol configuration as shown in FIG. 4 and FIG. 6 also allows the transmission apparatus to standardize code storage sections 1107 and 1109 as shown in FIG. 13 and also leads to the simplification of the transmission apparatus.

As shown above, the method of generating preambles and pilot signals (pilot symbols) of this embodiment, the detailed configuration and operation of the transmission apparatus which generates them and the reception apparatus which receives the modulated signal of this embodiment have been explained. According to this embodiment, it is possible to improve the estimation accuracy of frequency offset, transmission path fluctuation and synchronization, thereby improving the probability of detection of signals and simplifying the transmission apparatus and the reception apparatus.

In other words, an important feature of the above described embodiment is a MIMO-OFDM transmission apparatus that transmits OFDM-modulated data symbols 303 from a plurality of antennas for a data transmission period and transmits OFDM-modulated symbols for transmission path estimation from the above described plurality of antennas for a period different from the above described data transmission period including a data mapping section (data modulation section 1103) that forms data symbols 303, a symbol mapping section for transmission path estimation (preamble mapping section 1105) that forms symbols for transmission path estimation for which, when assuming that the number of subcarriers is m, the signal point amplitude of n subcarriers is 0, α=m/(m−n), the signal point amplitude of the remaining m−n subcarriers becomes √α times the signal point amplitude based on the same modulation scheme among the modulation schemes of data symbols 303 and an OFDM modulation section that OFDM-modulates above described data symbols 303 and the above described symbols for transmission path estimation. This makes it possible to reduce quantization errors of symbols for transmission path estimation on the receiving side, thereby realizing transmission path fluctuation estimation with high accuracy.

This embodiment has been explained with an example using an OFDM scheme, but the present invention is not limited to this and can also be implemented in the same way when using a single-carrier scheme, other multicarrier schemes or a spread spectrum communication scheme. Furthermore, this embodiment has been explained with an example where two antennas are used for transmission and reception respectively, but the present invention is not limited to this and even when the number of reception antennas is three or more, this embodiment will not be influenced and can be implemented in the same way. Furthermore, the frame configuration is not limited to this embodiment and especially, pilot symbols 305 for estimating distortion such as frequency offset and/or phase noise are only required to be arranged on specific subcarriers and transmitted from a plurality of antennas and the number of subcarriers which transmit pilot symbols 305 is not limited to two in this embodiment. Embodiments with other numbers of antennas or using other transmission methods will be explained in detail later. In addition, this embodiment has been explained using naming such as "pilot symbol 305", "reference symbol 302", "guard symbol 301", "preamble", but using other names will by no means influence this embodiment. This will be the same in other embodiments.

Embodiment 2

This embodiment will explain in detail a case where the number of transmission/reception antennas in Embodiment 1 is assumed to be three.

Figure 14:
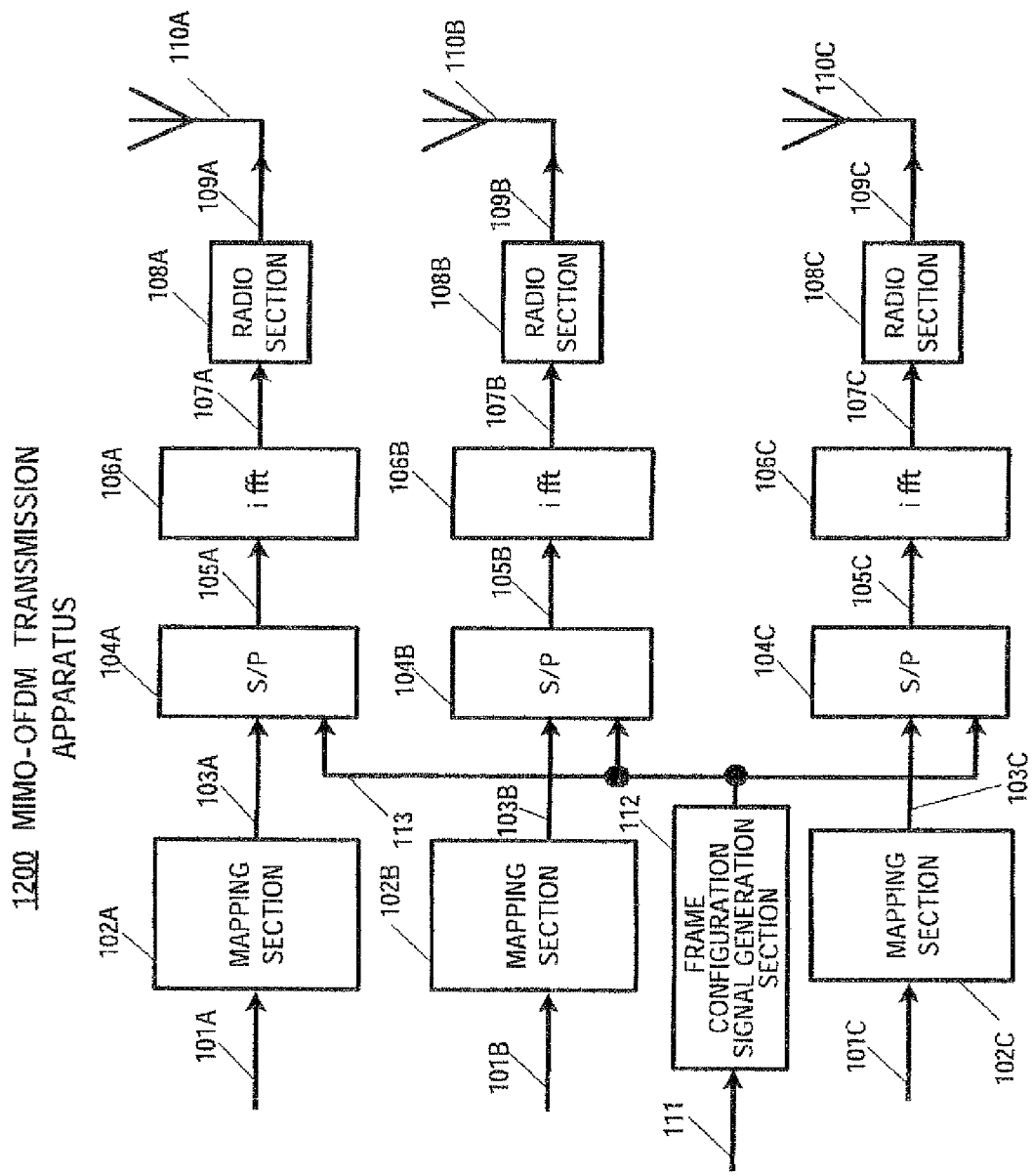
FIG. 14 is a block diagram showing the configuration of a MIMO-OFDM transmission apparatus according to Embodiment 2.

FIG. 14 shows an example of the configuration of a transmission apparatus according to this embodiment. In FIG. 14, components which operate in the same way as those in FIG. 2 are assigned the same reference numerals as those in FIG. 2. MIMO-OFDM transmission apparatus 1200 in FIG. 14 is different from FIG. 2 in that a transmission section of channel C is added thereto.

Figure 15:
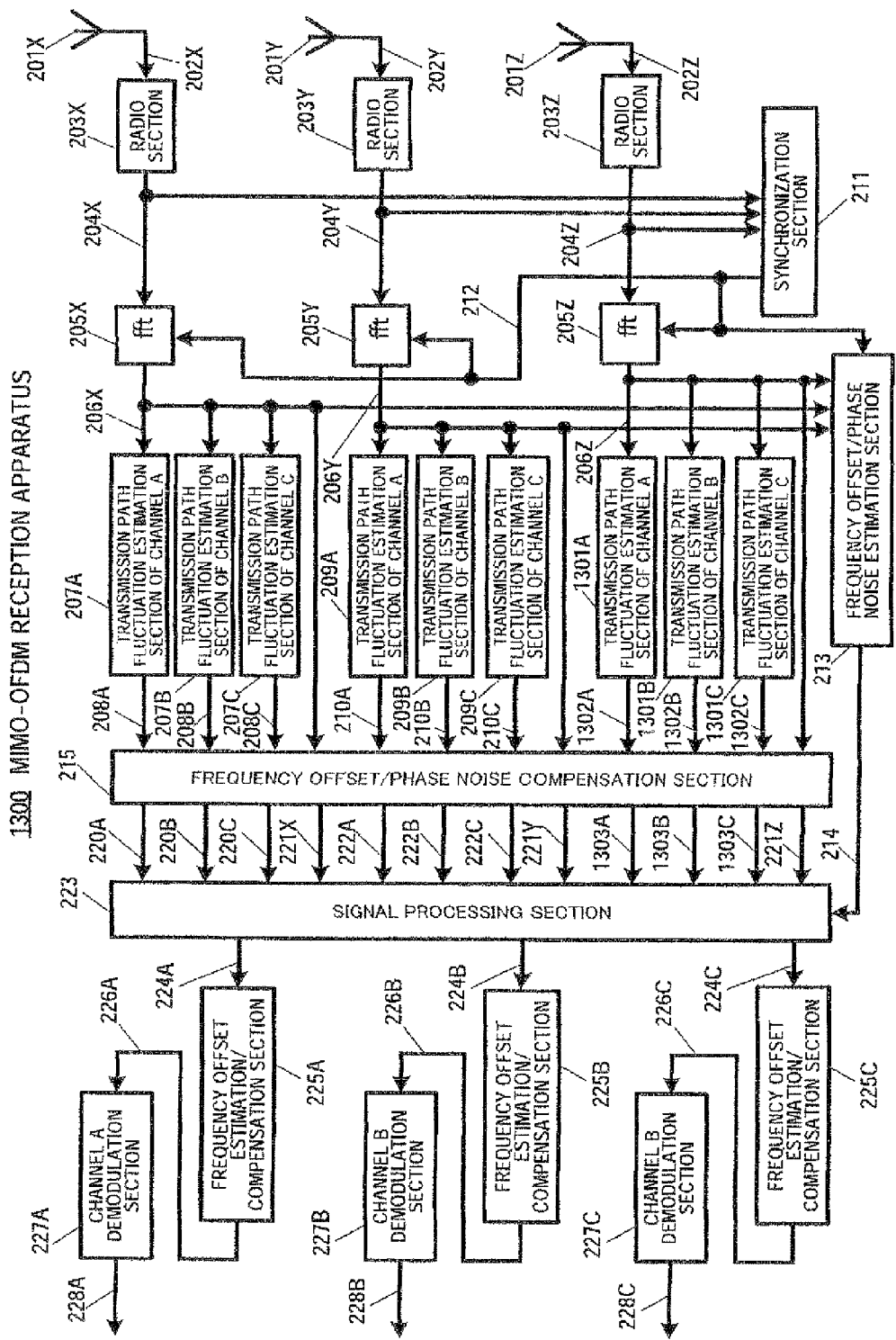
FIG. 15 is a block diagram showing the configuration of a MIMO-OFDM reception apparatus according to Embodiment 2.

FIG. 15 shows an example of the configuration of a reception apparatus according to this embodiment. In FIG. 15, components which operate in the same way as those in FIG. 3 are assigned the same reference numerals. In FIG. 15, since modulated signals of three channels are transmitted from the transmission apparatus, transmission path fluctuation estimation sections 207C and 209C of channel C are added and one antenna is added compared to the configuration in FIG. 3A and necessary configurations corresponding thereto are added.

Figure 16:
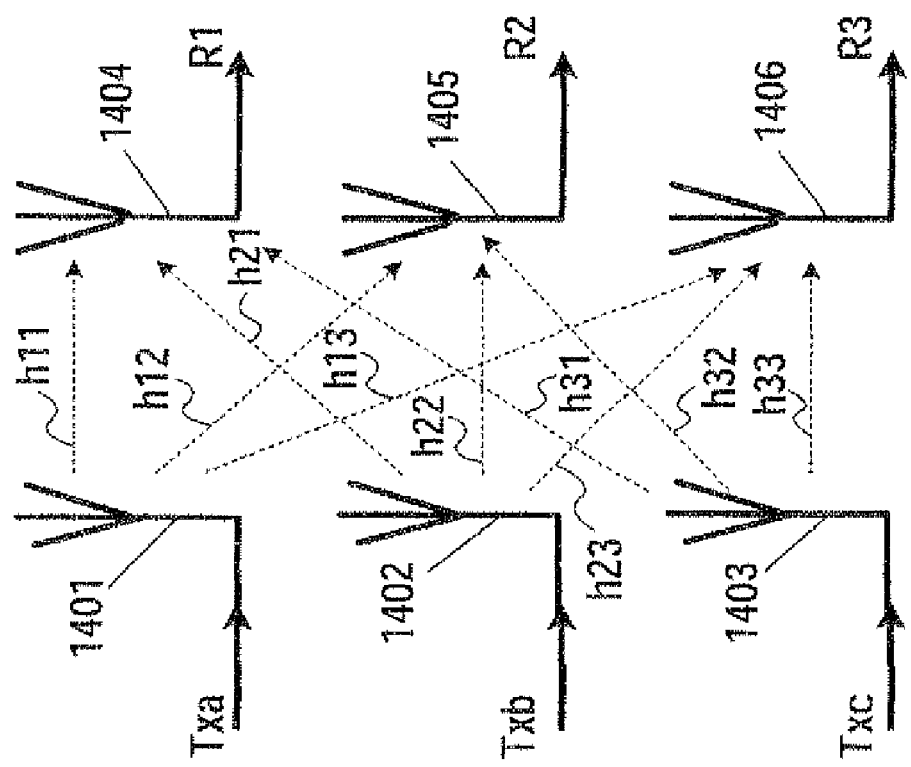
FIG. 16 shows a relationship between transmission and reception antennas according to Embodiment 2.

FIG. 16 shows a relationship between transmission and reception antennas in this embodiment. For example, the following relationship equation holds if it is assumed in a certain subcarrier that a transmission signal from antenna 1401 is Txa(t), transmission signal from antenna 1402 is Txb(t), transmission signal from antenna 1403 is Txc(t), received signal of antenna 1404 is R1(t), received signal of antenna 1405 is R2(t), received signal of antenna 1406 is R3(t) and their respective transmission path fluctuations are h11(t), h12(t), h13(t), h21(t), h22(t), h23(t), h31(t), h32(t) and h33(t).

[Equation 2]

$$\begin{pmatrix} R1(t) \\ R2(t) \\ R3(t) \end{pmatrix} = \begin{pmatrix} h11(t) & h12(t) & h13(t) \\ h21(t) & h22(t) & h23(t) \\ h31(t) & h32(t) & h33(t) \end{pmatrix} \begin{pmatrix} Txa(t) \\ Txb(t) \\ Txc(t) \end{pmatrix} + \begin{pmatrix} n1(t) \\ n2(t) \\ n3(t) \end{pmatrix} \quad (2)$$

where t is time and n1(t), n2(t) and n3(t) are noise. Signal processing section 223 in FIG. 15 carries out, for example, an operation of an inverse matrix using Equation (2) to thereby obtain a signal of channel A, a signal of channel B and a signal of channel C. Signal processing section 223 carries out this operation on all subcarriers. h11(t), h12(t), h13(t), h21(t), h22(1), h23(t), h31(t), h32(t) and h33(t) are estimated by transmission path fluctuation estimation sections 207A, 209A, 1301A, 207B, 209B, 1301B, 207C, 209C and 1301C.

Figure 17:
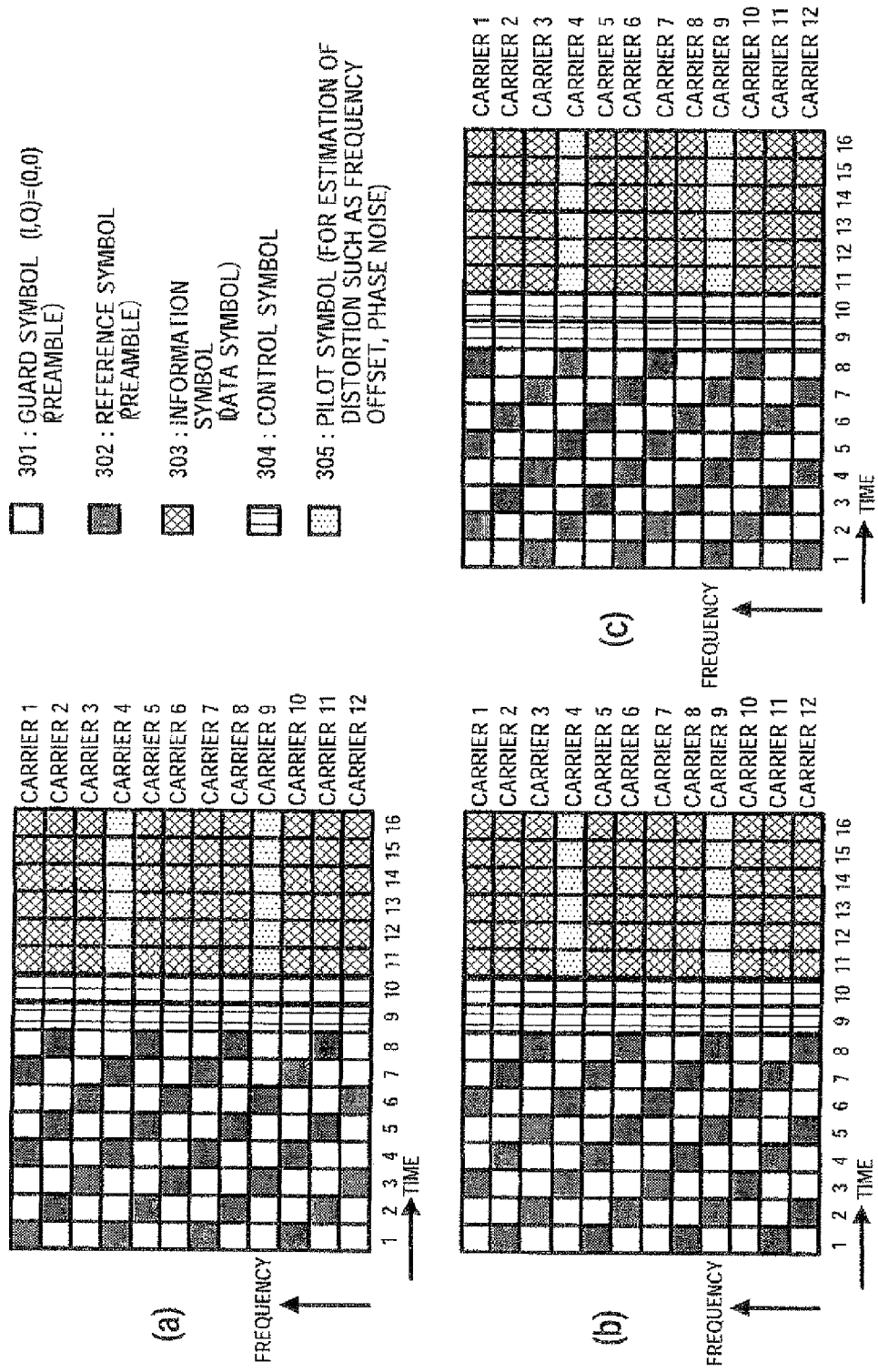
FIG. 17 provides diagrams showing a frame configuration of a signal transmitted from each antenna according to Embodiment 2, where (a) shows the frame configuration of channel A, (b) shows the frame configuration of channel B and (c) shows the frame configuration of channel C.

FIG. 17 shows an example of the frame configuration according to this embodiment and parts corresponding to those in FIG. 4 are assigned the same reference numerals. FIG. 17(a) shows the time—frequency frame configuration of channel A, FIG. 17(b) shows the time—frequency frame configuration of channel B and FIG. 17(c) shows an example of the time—frequency frame configuration of channel C. Signals at the same time and on the same carrier of channels A, B and C in FIG. 17(a), FIG. 17(b) and FIG. 17(c) are spatially multiplexed.

From time 1 to time 8, symbols for estimating transmission path fluctuations corresponding to h11(t), h12(t), h13(t), h21(t), h22(t), h23(t), h31(t), h32(t) and h33(t) in Equation (2) are transmitted. This symbol is composed of guard symbol 301 and reference symbol 302. Suppose guard symbol 301 is (0, 0) on the in-phase I—quadrature Q plane. Reference symbol 302 is, for example, a symbol at known coordinates other than (0, 0) on the in-phase I—quadrature Q plane. Channel A, channel B and channel C are configured in such a way that no interference occurs with each other. That is, when, for example, reference symbol 302 is placed on channel A on carrier 1 at time 1, guard symbol 301 is placed on channel B and channel C, when reference symbol 302 is placed on channel B on carrier 2 at time 1, guard symbol 301 is placed on channel A and channel C, and when reference symbol 302 is placed on channel C on carrier 3 at time 1, guard symbol 301 is placed on channel A and channel B. In this way, reference symbol 302 is placed on only one channel on a certain carrier at a certain time and guard symbols 301 are placed on other channels. By adopting such placement, when, for example, attention is focused of channel A at time 1, transmission path fluctuations of carriers 2 and 3 can be estimated using reference symbols 302 on carrier 1 and carrier 4. Since carrier 1 and carrier 4 are reference symbols 302, transmission path fluctuations can be estimated. Therefore, transmission path fluctuations of all carriers of channels A can be accurately estimated at time 1. In the same way, transmission path fluctuations of all carriers of channel B and channel C can be accurately estimated, too. From time 2 to time 8, the transmission path fluctuations of all carriers of channel A, channel B and channel C can be estimated in the same way. Thus, since the transmission path fluctuations of all carriers can be estimated at all times from time 1 to time 8, the frame configuration in FIG. 17 can be said to be a preamble configuration capable of realizing estimation of transmission path fluctuations with quite high accuracy.

Next, when an analog/digital converter is mounted for the reception apparatus to perform digital signal processing, a signal point constellation of preambles (especially reference symbols 302) on the in-phase I—quadrature Q plane for reducing the influence of quantization errors will be explained. As a precondition, suppose that the signal point constellations of data symbols 303 in FIG. 17 are adopted and the normalization factors according to FIG. 5 are adopted.

FIG. 8 shows an example (constellation examples at times 1, 2, 3 of channel A) of signal point constellation of preambles on the in-phase I—quadrature Q plane. Here, suppose the modulation scheme of reference symbols 302 is BPSK. At this time, a case where a normalization factor is 1 and the signal point constellations in FIG. 5A are adopted is assumed, the reception intensity of preambles decreases compared to data symbols 303 as shown in (a) of FIG. 11, and therefore the influence of quantization errors increases on only preambles due to the analog/digital converter mounted on the reception apparatus, causing deterioration of the reception quality. On the other hand, in FIG. 18, the signal point constellation of reference symbol 302 on the in-phase I—quadrature Q plane is assumed to be (1.732≈sqrt(3), 0) or (−1.732≈sqrt(3), 0). That is, the signal point constellation corresponds to a signal point constellation of data symbols based on a BPSK modulation multiplied by factor 1.732.

The image of intensity of the received signals of preambles and data symbols 303 on the time axis is as shown in FIG. 11(b). This allows the influence of quantization errors on preambles by the analog/digital converter mounted on the reception apparatus to be reduced, and therefore the reception quality improves.

Based on the above described concept, FIG. 19 shows the method of signal point constellation when QPSK is assumed to be the signal point constellation of reference symbols 302.

FIG. 19 shows an example of signal point constellation on the in-phase I—quadrature Q plane when QPSK modulation is applied to reference symbols 302 assuming that a normalization factor is 1. In this way, as shown in FIG. 11(b), the average reception power of preambles is equivalent to the average reception power of data symbols 303 and even if a signal is converted to a digital signal using an analog/digital converter, the influence of quantization errors on the received signals of preambles is reduced and the quality is secured. Here, 1.225 in FIG. 19 is calculated from 1.255≈sqrt(3)/sqrt(2).

As described above, when the modulation scheme called #X of data symbols 303 is used for reference symbols 302, it is important to use the signal point constellation which becomes 1.732≈sqrt(3) times the signal point constellation of data symbol 303 on the in-phase I—quadrature Q plane after multiplication by a normalization factor as the signal point constellation of reference symbols 302 on the in-phase I—quadrature Q plane after multiplication by a normalization factor. The factor 1.732≈qrt(3) is a value determined because reference symbols 302 are arranged for every two symbols on the frequency axis.

For example, when #X is QPSK, the signal point constellation on the in-phase I—quadrature Q plane after multiplication by a normalization factor is (±1/sqrt(2), ±1/sqrt(2)) and the signal point constellation of reference symbols 302 on the in-phase I—quadrature Q plane after multiplication by a normalization factor becomes (±sqrt(3)/sqrt(2), ±sqrt(3)/sqrt(2)) according to the above described rule (see FIG. 19).

As shown above, the method of generating preambles and pilot signals of this embodiment, the detailed configuration and operation of the transmission apparatus which generates them and the reception apparatus which receives a modulated signal of this embodiment, especially in the case where the number of the transmission/reception antennas is three, have been explained. According to this embodiment, it is possible to improve the accuracy of estimation of frequency offset, transmission path fluctuation and synchronization, thereby improving the probability of detection of signals and simplifying the transmission apparatus and the reception apparatus.

This embodiment has been explained with an example using an OFDM scheme, but the present invention is not limited to this and can also be implemented in the same way when using single-carrier schemes, other multicarrier schemes or spread spectrum communication schemes. Furthermore, even when the number of reception antennas is four or more, this embodiment will not be influenced and can be implemented in the same way.

Embodiment 3

This embodiment will explain details of the configuration of preambles in a communication scheme whereby a spatial multiplexing MIMO system in which the number of transmission antennas is two and the number of transmission modulated signals is two (double transmission spatial multiplexing MIMO) and a spatial multiplexing MIMO system in which the number of transmission antennas is three and the number of transmission modulated signals is three (triple transmission spatial multiplexing MIMO) are switched round according to a communication environment (e.g., reception quality or the like).

Figure 20:
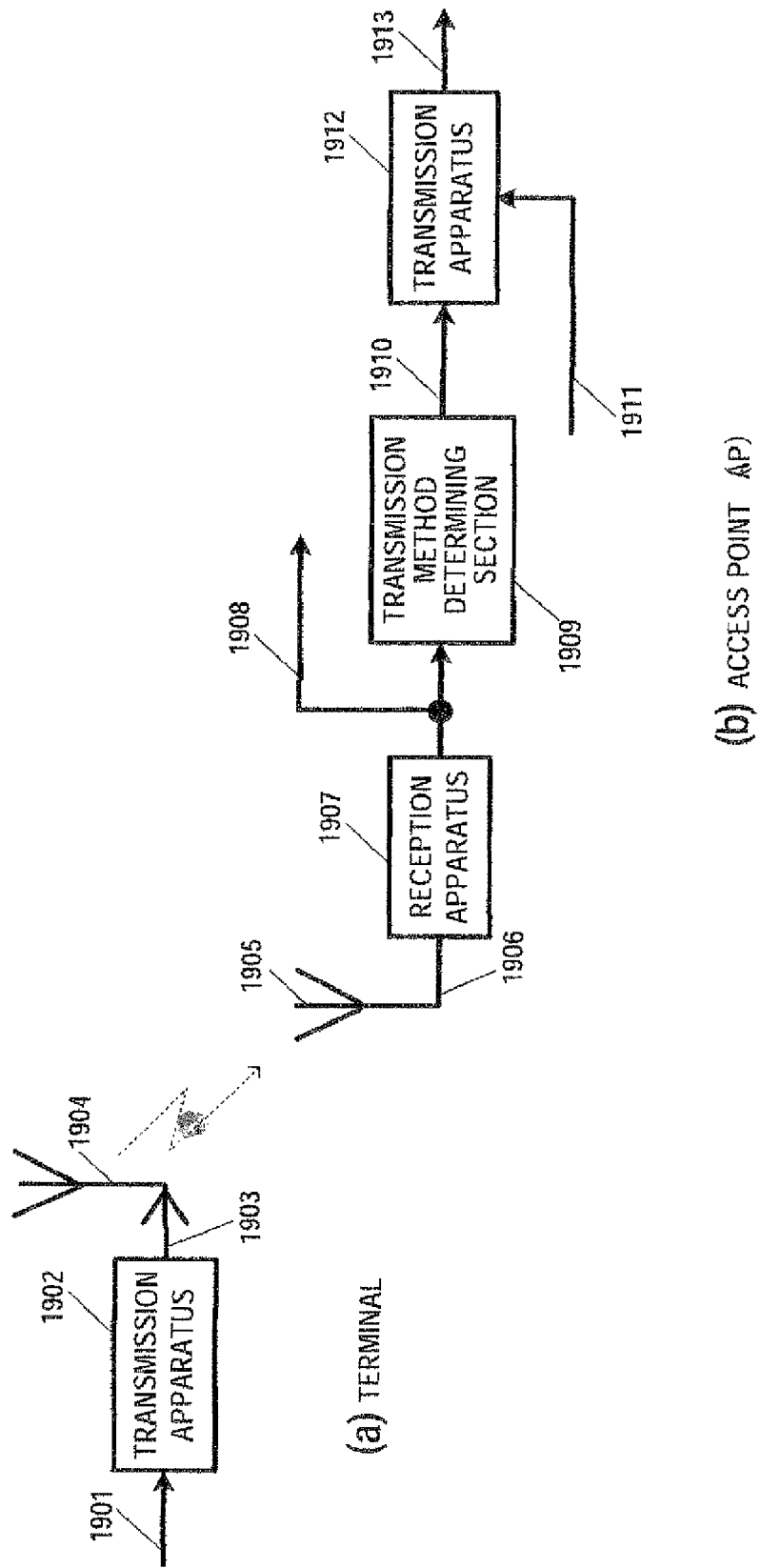
FIG. 20 provides block diagrams showing the configuration of Embodiment 3, where (a) shows the configuration of a terminal and (b) shows a block diagram of the configuration of an access point.

FIG. 20 shows a communication mode of this embodiment. FIG. 20(a) shows a terminal and FIG. 20(b) shows an access point (AP). At this time, a case where the AP changes a MIMO scheme and a modulation method will be explained as an example.

In the terminal in FIG. 20(a), transmission apparatus 1902 receives transmission digital signal 1901 as input, outputs modulated signal 1903 and modulated signal 1903 is output as a radio wave from antenna 1904. At this time, suppose that transmission digital signal 1901 includes information on a communication situation for the AP to change a communication scheme, for example, a bit error rate, packet error rate, reception field intensity or the like.

In the AP of FIG. 20(b), reception apparatus 1907 receives signal 1906 received at antenna 1905 as input and outputs received digital signal 1908.

Transmission method determining section 1909 receives received digital signal 1908 as input, determines a communication method (that is, a MIMO scheme and a modulation scheme) based on information on a communication situation included in received digital signal 1908 and outputs control information 1910 including this information.

Transmission apparatus 1912 receives control information 1910 and transmission digital signal 1911 as input, modulates transmission digital signal 1911 based on the determined communication method, outputs modulated signal 1913 and this modulated signal 1913 is transmitted from the antenna.

FIG. 14 shows an example of the detailed configuration of transmission apparatus 1912 in FIG. 20(b). Frame configuration signal generation section 112 in FIG. 14 receives control information 111—that is, control information 1910 in FIG. 20—as input, determines a modulation scheme and a MIMO scheme based on this and outputs frame configuration signal 113 including this information. For example, the transmission section of channel C does not operate when frame configuration signal 113 indicates a double transmission spatial multiplexing MIMO scheme. This allows the double transmission spatial multiplexing MIMO scheme and the triple transmission spatial multiplexing MIMO scheme to be switched round.

Here, the frame configuration when a double transmission spatial multiplexing MIMO scheme is selected becomes as shown in FIG. 4 explained in Embodiment 1 and the frame configuration when a triple transmission spatial multiplexing MIMO scheme is selected becomes as shown in FIG. 17 explained in Embodiment 2.

As for the signal point constellation on the in-phase I—quadrature Q plane of data symbols 303, those shown in FIG. 5A, FIG. 5B, FIG. 5C and FIG. 5D are adopted. However, as for the normalization factors, those shown in FIG. 21 are adopted.

FIG. 21 shows a normalization factor to be adopted in each MIMO scheme and each modulation scheme when a normalization factor is assumed to be 1 in the case of a double transmission spatial multiplexing MIMO and BPSK. The reason that normalization factors are set in this way is to equalize total transmit power of modulated signals transmitted by the AP regardless of the modulation scheme and regardless of the number of modulated signals to be transmitted. Therefore, if the normalization factor based on the double transmission spatial multiplexing MIMO scheme is assumed to be X when the same Modulation scheme is used, the normalization factor of the triple transmission spatial multiplexing MIMO scheme becomes sqrt(2)/sqrt(3) times X.

Next, a signal point constellation of preambles on the in-phase I—quadrature Q plane at this time will be explained.

In the case of the double transmission spatial multiplexing MIMO scheme, suppose that the signal point constellation of reference symbols 302 of preambles on the in-phase I—quadrature Q plane is as shown in FIG. 10 or FIG. 12 explained in Embodiment 1 in order to reduce the influence of quantization errors produced in the analog/digital converter of the reception apparatus.

Considering the normalization factors in FIG. 21 and the explanations of Embodiment 2 at this time, it is necessary to adopt signal point constellations as shown in FIG. 22 and FIG. 23 to reduce the influence of quantization errors produced in the analog/digital converter of the reception apparatus. By so doing, even when the AP switches between the double transmission spatial multiplexing MIMO scheme and the triple transmission spatial multiplexing MIMO scheme, the reception apparatus can reduce the influence of quantization errors on preambles.

What is important in the above described explanation, when the total transmit power of modulated signals to be transmitted is equalized regardless of the modulation scheme and the number of modulated signals to be transmitted as shown in FIG. 21 is that when using a modulation scheme called "#X" of data symbols 303 for reference symbols 302, the same signal point constellation of reference symbols 302 on the in-phase I—quadrature Q plane after multiplication by a normalization factor be used for the double transmission spatial multiplexing MIMO scheme and the triple transmission spatial multiplexing MIMO scheme.

Adopting such a configuration can reduce the influence of quantization errors in preambles, thereby suppressing degradation of reception quality.

The case where the average reception power of data symbols 303 is equalized to that of the preambles has been explained above as an example, but it is often the case that reception quality is secured by using greater average reception power of preambles than the average reception power of data symbols 303. The above-described concept can also be applied to this ease, too. In short, when using the modulation scheme called #X of data symbols 303 for reference symbols 302, it is only necessary to observe the rule that the same signal point constellation of reference symbols 302 on the in-phase quadrature Q plane after multiplication by a normalization factor is used for the double transmission spatial multiplexing MIMO scheme and the triple transmission spatial multiplexing MIMO scheme.

That is, in an n-transmission spatial multiplexing MIMO scheme having n transmission antennas and n transmission modulated signals, when reference symbol 302 is inserted for every n-1 symbols at the preamble, if a modulation scheme called #X of data symbols 303 is used for reference symbols 302, the operation would be the same as that described above if the same signal point constellation of reference symbols 302 on the in-phase I—quadrature Q plane after multiplication by a normalization factor is used regardless of n.

This embodiment has been explained with an example using an OFDM scheme, but the present invention is not limited to this and can also be implemented in the same way when using a single-carrier scheme, other multicarrier schemes or spread spectrum communication schemes. Furthermore, even when the number of reception antennas is three or more, this embodiment will not be thereby influenced and can be implemented in the same way.

Embodiment 4

Embodiment 2 has explained the configuration of preambles of a triple transmission spatial multiplexing MIMO system. When using preamble configurations like Embodiments 1 and 2, the interval at which reference symbols 302 exist increases as the number of antennas increases, and therefore the possibility that the estimation accuracy of transmission path fluctuations at the reception apparatus may degrade increases. This embodiment proposes a method for preamble configuration to diminish this problem.

Figure 24:
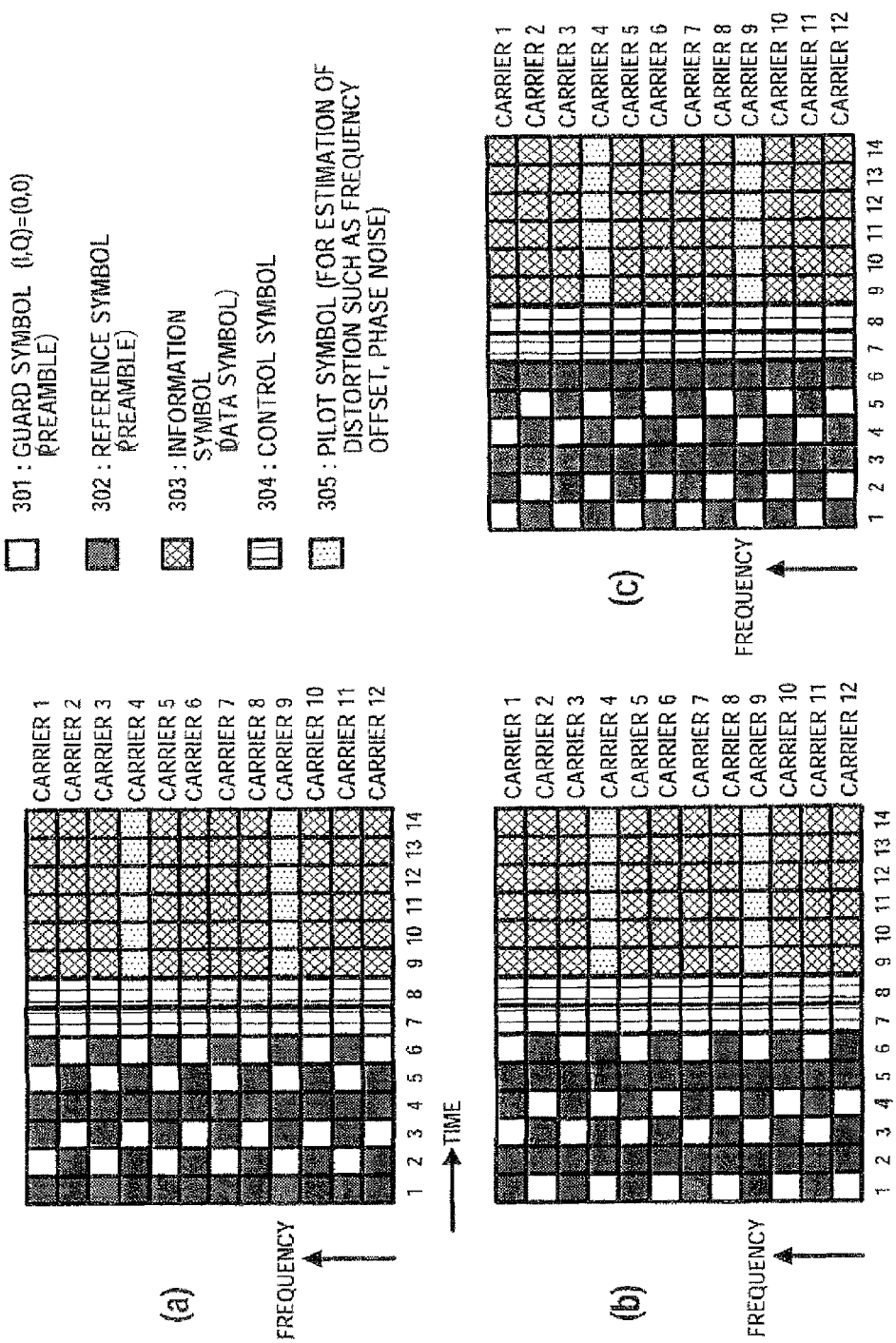
FIG. 24 provides diagrams showing the frame configuration according to Embodiment 4, where (a) shows the frame configuration of channel A, (b) shows the frame configuration of channel B and (c) shows the frame configuration of channel C.

FIG. 24 shows an example of frame configuration according to this embodiment. A characteristic part in FIG. 24 is the configuration of preambles. The basic operation when transmitting the frame signal in FIG. 24 is the same as that in the case of transmitting the frame signal in FIG. 17 explained in Embodiment 2 and signals of channel A, channel B and channel C on the same carrier at the same time are transmitted from different antennas and spatially multiplexed.

In FIG. 24, at time 1, all carriers 1 to 12 of channel A are composed of reference symbols 302. Then, at time 2, all carriers 1 to 12 of channel B are composed of reference symbols 302. At time 3, all carriers 1 to 12 of channel C are composed of reference symbol 302.

Figure 25:
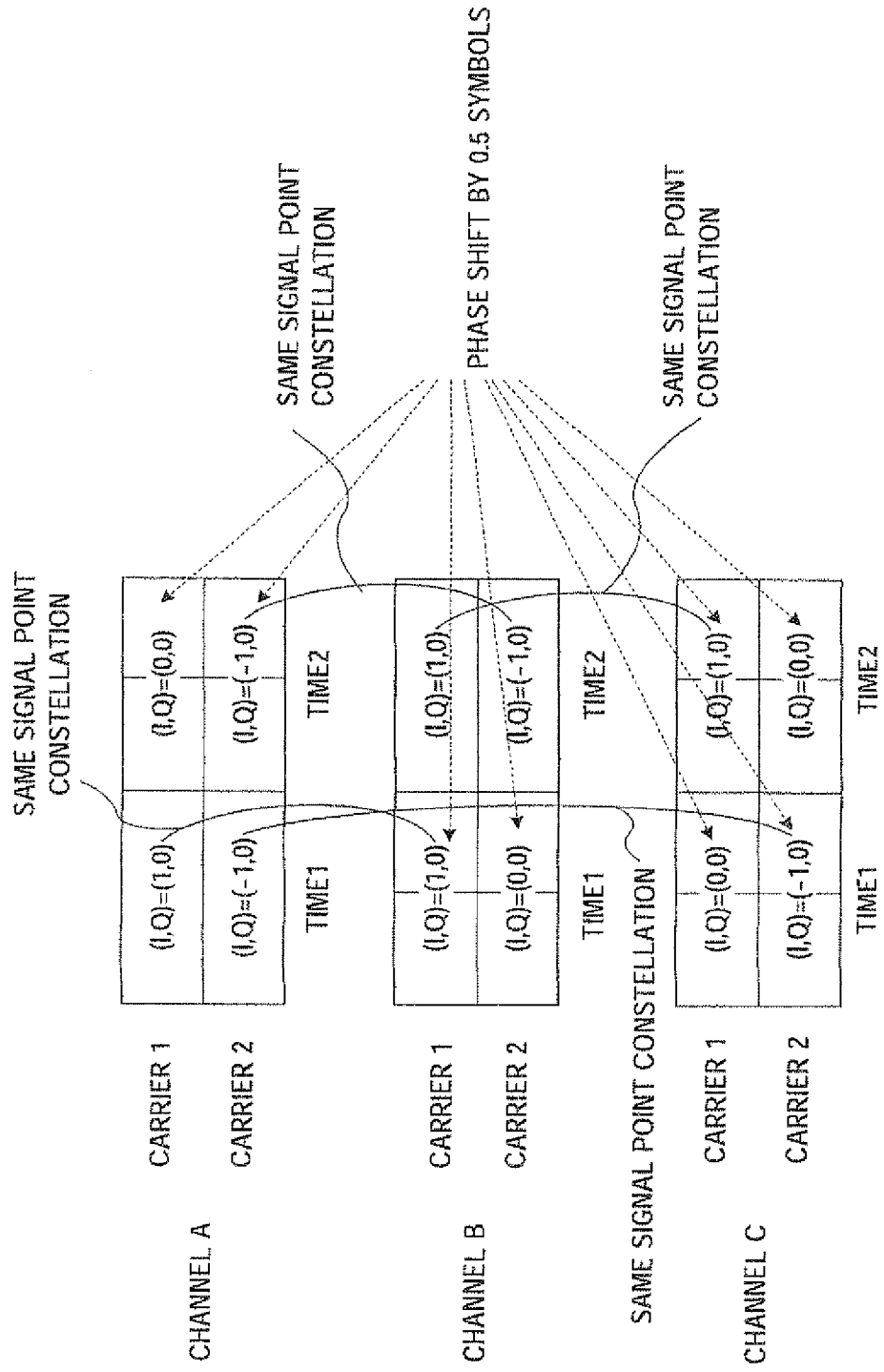
FIG. 25 shows an example of the configuration of preambles according to Embodiment 4.

FIG. 25 shows a detailed configuration of preambles of carrier 1 and carrier 2 at time 1 and time 2 in particular. At time 1, a general OFDM-based modulated signal is generated on channel A whose all carriers 1 to 12 are reference symbols 302. Channel B and channel C on which reference symbols 302 and guard symbols 301 exist in carriers 1 to 12 are subjected to special signal processing after Inverse Fourier transformer 106 in FIG. 14. In the same way, general OFDM-based modulated signals are generated on channel B at time 2, on channel C at time 3, on channel A at time 4, . . . , and so on. Special signal processing is applied after Inverse Fourier transformer 106 in FIG. 14 to channel A and channel C at time 2, channel A and channel B at time 3, channel B and channel C at time 4, . . . , and so on.

In FIG. 25, suppose a signal point constellation of (I, Q)= (1, 0) on the in-phase I—quadrature Q plane is performed on channel A at time 1 on carrier 1. Interference with other channels is prevented by setting the signal point constellation of channel C to (I, Q)=(0, 0) at this time. Then, suppose that the same signal point constellation as that for channel A is used for channel B. The above described special signal processing is then applied thereto. This special signal processing is the processing on channel B for shifting the phase of a modulated signal obtained after a Fourier transform, for example, by 0.5 symbols with respect to the time axis. However, signals which stick out of channel A without overlapping channel A are placed (turned down) one by one from top to bottom. This operation is disclosed in the document "Channel estimation for OFDM systems with transmission diversity in mobile wireless channels," IEEE Journal on Selected Areas in Communications, vol. 17, no. 3, pp-461-471, March 1999 and "Simplified channel estimation for OFDM systems with multiple transmit antennas," IEEE Transaction on wireless communications, vol. 1, no. 1, pp. 67-75, 2002, and Cyclic delay diversity is applied to channel A and channel B at time 1 on carrier 1.

In the same way, suppose that a signal point constellation of (I, Q)=(−1, 0) is performed on channel A at time 1 on carrier 2 on the in-phase I—quadrature Q plane. Interference with other channels is prevented by setting the signal point constellation of channel B to (I, Q)=(0, 0) at this time. Then, suppose that channel C is subjected to the same signal point constellation as that for channel A. The above described special signal processing is then applied thereto. This special signal processing is the processing on channel C for shifting the phase of a modulated signal obtained after a Fourier transform, for example, by 0.5 symbols with respect to the time axis. However, signals which stick out of channel A without overlapping channel A are placed (turned down) one by one from top to bottom. Therefore, cyclic delay diversity is applied to channel A and channel C at time 1 on carrier 2.

Therefore, at time 1, there is a situation in which cyclic delay diversity is applied to channel A and channel B, and channel A and channel C alternately with respect to the frequency axis. At this time, the transmission path fluctuation estimation section of the reception apparatus can estimate transmission paths of channels to which cyclic delay diversity is applied by realizing equalization processing. Therefore, it is possible to estimate transmission path fluctuations of channel A and channel B at the same time on carrier 1 at time 1 and estimate transmission path fluctuations of channel A and channel C on carrier 2 at time 1. Unlike the case of Embodiment 2, this allows transmission path fluctuations corresponding to two channels to be estimated at the same time, and therefore the number of preamble symbols can be reduced. This leads to improvement of the data transmission speed.

However, while cyclic delay diversity capable of estimating transmission path fluctuations corresponding to three channels is theoretically possible, there is a disadvantage that the diversity gain decreases and the circuit scale of the reception apparatus increases, and therefore the configuration whereby transmission path fluctuations corresponding to two channels are estimated at the same time like this embodiment is preferable. For this purpose, it is important to always insert guard symbol ((1, Q)=(0, 0)) in any one of channels.

When attention is focused on time 1, the phases of channel B and channel C are shifted, and it is very important to match the amount of phase shifted (may also be expressed by the amount of symbols or time), for example, 0.5 symbols. This is because the reception apparatus can thereby standardize the circuit of simultaneous estimation of transmission path fluctuations of channel A and channel B and simultaneous estimation of transmission path fluctuations of channel A and channel C.

As shown above, arranging preambles of triple transmission spatial multiplexing MIMO system so that cyclic delay diversity of two channels is executed on a channel which differs from one carrier to another makes it possible to estimate transmission path fluctuations with high accuracy and also reduce the number of preambles and improve the data transmission speed.

This embodiment has explained the case of triple transmission, but can also be applied to a case with four or more antennas. This embodiment has been explained with an example using an OFDM scheme, but the present invention is not limited to this and can also be implemented in the same way when using a single-carrier scheme, other multicarrier schemes or a spread spectrum communication scheme.

Embodiment 3 above has explained switching between double transmission spatial multiplexing MIMO and triple transmission spatial multiplexing MIMO, but the present invention is not limited to this. The present invention can be likewise implemented even when, for example, switching involves single transmission (when MIMO is not executed). The relationship between a communication scheme and a normalization factor in that case becomes as shown in FIG. 26.

Embodiment 5

While Embodiment 1 has explained the case with two transmission antennas, this embodiment will explain a pilot carrier configuration when the number of the transmission antennas is three.

FIG. 27 shows an example of the frame configuration of a transmission signal which is formed by a transmission apparatus of this embodiment and components corresponding to those in FIG. 4 are assigned the same reference numerals. FIG. 27(a) shows the frame configuration of channel A, FIG. 27(b) shows the frame configuration of channel B and FIG. 27(c) shows the frame configuration of channel C. As is clear from FIG. 27, pilot symbols (pilot carriers) 305 are arranged on carrier 3, carrier 5, carrier 8, carrier 10 except for times at which reference symbols 302 and control symbols 304 are transmitted.

Figure 28:
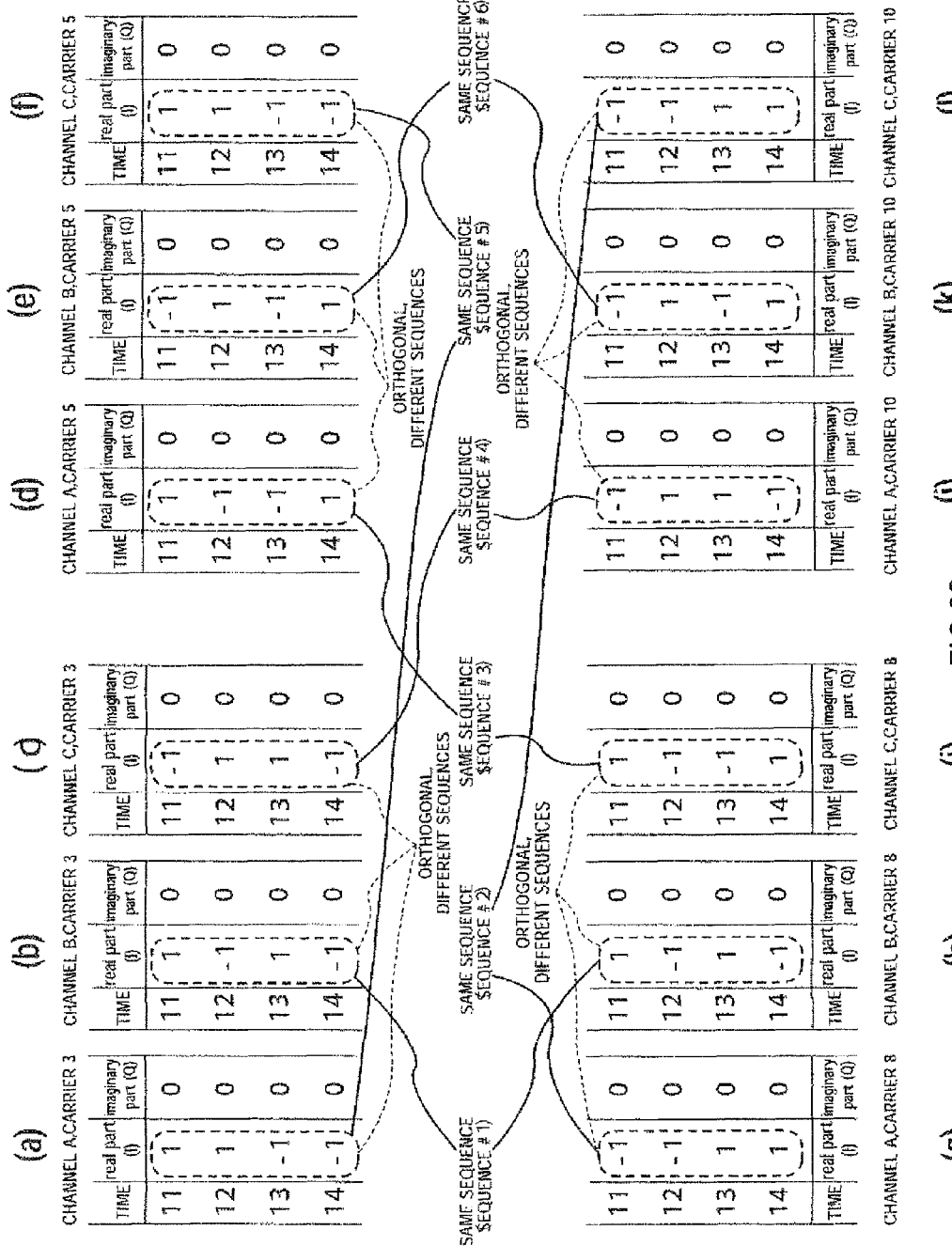
FIG. 28 illustrates signal point constellations of pilot symbols according to Embodiment 5.

FIG. 28 shows signal point constellations of pilot symbols 305 of channel A, channel B and channel C, and a feature thereof. The feature in this case is that signal point constellations of channel A, channel B and channel C on the same carriers are orthogonal to each other (cross-correlation is zero) as in the case of Embodiment 1.

For example, the signal point constellation (FIG. 28(a)) from time 11 to time 14 of channel A on carrier 3, the signal point constellation (FIG. 28(b)) from time 11 to time 14 of channel B on carrier 3 and the signal point constellation (FIG. 28(c)) from time 11 to time 14 of channel C on carrier 3 are orthogonal to each other. Signal point constellations are performed so that such orthogonality is also maintained from time 15 onward. Using Walsh-Hadamard conversion, orthogonal codes or the like is suitable because of the orthogonality of signals at this time. FIG. 28 shows a ease of BPSK, but if signals are orthogonal, QPSK modulation may also be used or it may be possible not to follow the rule of the modulation scheme.

Furthermore, for simplicity of a transmission apparatus and a reception apparatus in the case of this embodiment, the same signal point constellation (same sequence) is used between carrier 3 of channel A (FIG. 28(a)) and carrier 5 of channel C (FIG. 28(f)), between carrier 3 of channel B (FIG. 28(b)) and carrier 8 of channel B (FIG. 28(h)), between carrier 3 of channel C (FIG. 28(c)) and carrier 10 of channel A (FIG. 28(j)), between carrier 5 of channel A (FIG. 28(d)) and carrier 8 of channel C (FIG. 28(i)), between carrier 5 of channel B (FIG. 28(e)) and carrier 10 of channel B (FIG. 28(k)), and between carrier 8 of channel A (FIG. 28(g)) and carrier 10 of channel C (FIG. 28(1)). The reason will be explained in detail using FIG. 30, FIG. 31, FIG. 32 and FIG. 33. Here, the "same sequence" means completely the same signal point constellation. Here, the respective sequences are named sequence #1, sequence #2, sequence #3, sequence #4, sequence #5, sequence #6 as shown in FIG. 28.

Furthermore, different signal point constellations (different sequences) of pilot symbols 305 are used for carriers 3, 5, 8, 10 of channel A (or channel C) and this is because there is a possibility that using the same signal point constellation (same sequence) may lead to an increase of transmission peak power. However, channel B in this embodiment is an example of not meeting this condition.

Here, the simplification of the transmission apparatus and the reception apparatus and the necessity for orthogonality will be explained in detail using FIG. 29, FIG. 30, FIG. 31, FIG. 32 and FIG. 33.

Figure 29:
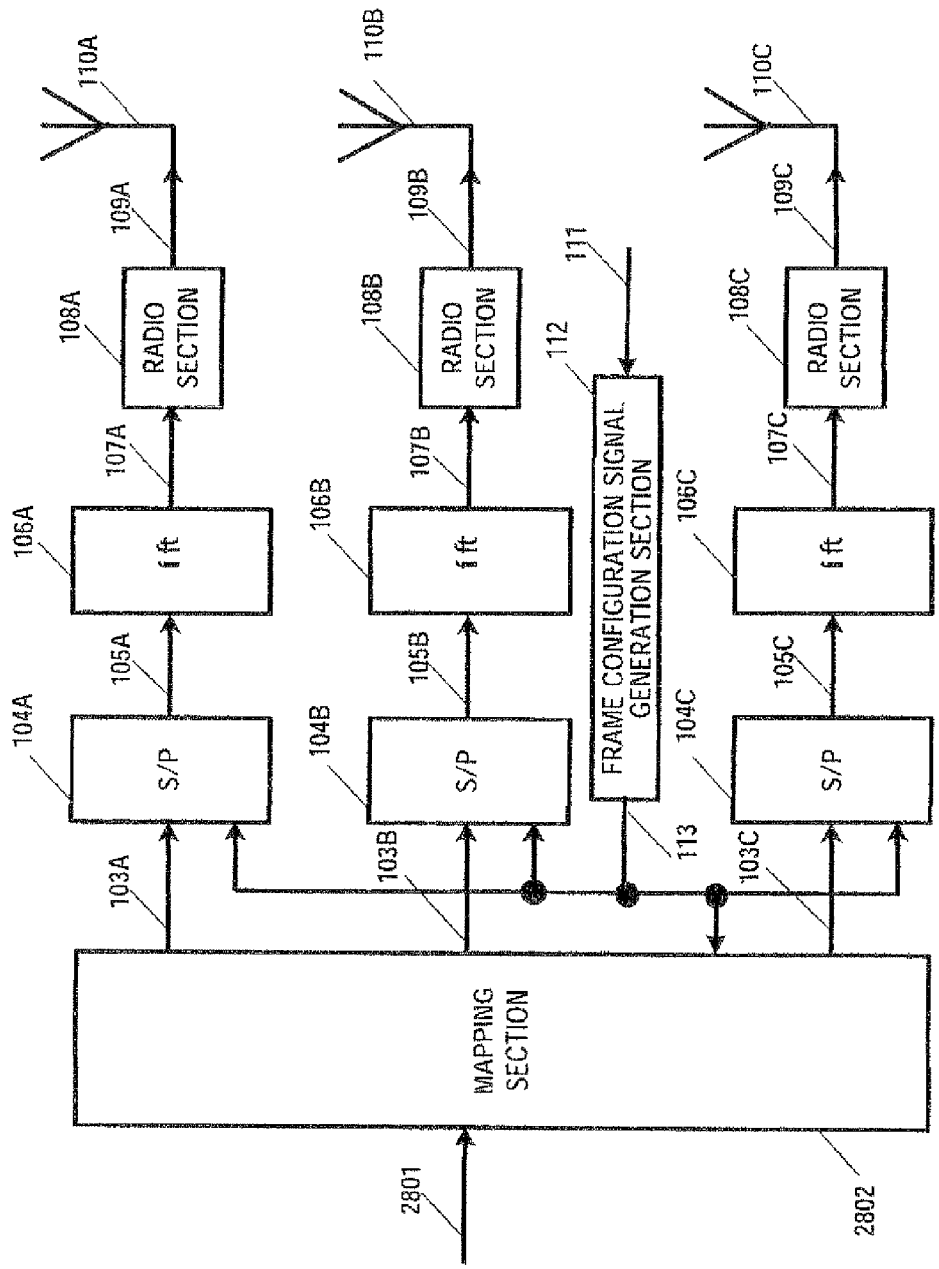
FIG. 29 is a block diagram showing the configuration of a MIMO-OFDM transmission apparatus according to Embodiment 5.

FIG. 29 shows an example of the configuration of a MIMO-OFDM transmission apparatus according to this embodiment. In FIG. 29, parts that operate in the same way as those in FIG. 14 are assigned the same reference numerals as those in FIG. 14. In MIMO-OFDM transmission apparatus 2800, mapping section 2802 receives transmission data 2801 and frame configuration signal 113 as input and outputs baseband signal 103A of channel A, baseband signal 103B of channel B and baseband signal 103C of channel C. The other parts operate in a manner similar to that explained in Embodiment 1 or Embodiment 2, and therefore explanations thereof will be omitted.

Figure 30:
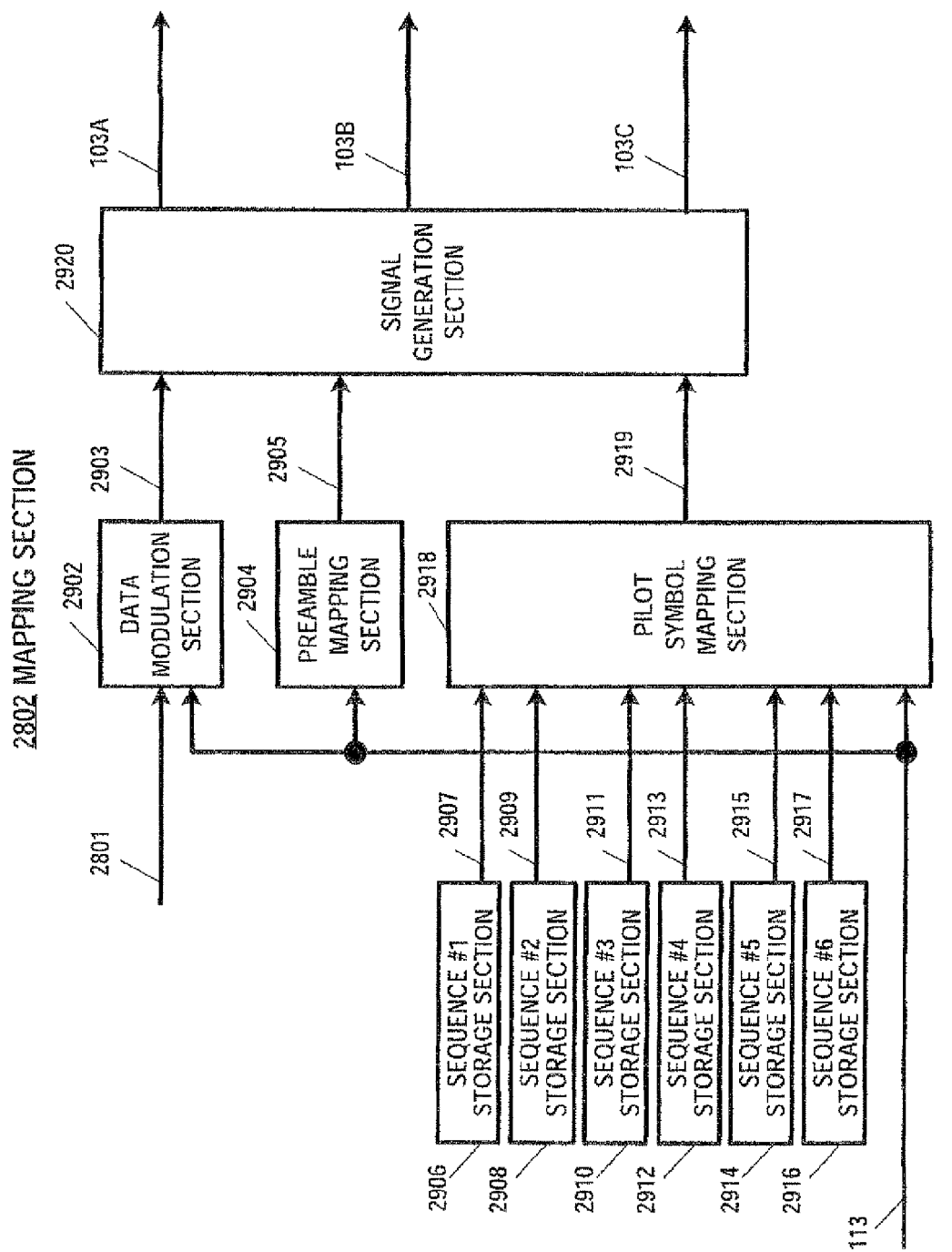
FIG. 30 is a block diagram showing the configuration of a mapping section according to Embodiment 5.

FIG. 30 shows an example of the detailed configuration of mapping section 2802 in FIG. 29. Data modulation section 2902 receives transmission data 2801 and frame configuration signal 113 as input, generates modulated signal 2903 of data symbols 303 according to frame configuration signal 113 and outputs this.

Preamble mapping section 2904 receives frame configuration signal 113 as input, generates modulated signal 2905 of preambles according to frame configuration signal 113 and outputs this.

Sequence #1 storage section 2906 outputs signal 2907 of sequence #1 in FIG. 28. Sequence #2 storage section 2908 outputs signal 2909 of sequence #2 in FIG. 28. Sequence #3 storage section 2910 outputs signal 2911 of sequence #3 in FIG. 28. Sequence #4 storage section 2912 outputs signal 2913 of sequence #4 in FIG. 28. Sequence #5 storage section 2914 outputs signal 2915 of sequence #5 in FIG. 28. Sequence #6 storage section 2916 outputs signal 2917 of sequence #6 in FIG. 28.

Pilot symbol mapping section 2918 receives signal 2907 of sequence #1, signal 2909 of sequence #2, signal 2911 of sequence #3, signal 2913 of sequence #4, signal 2915 of sequence #5, signal 2917 of sequence #6 and frame configuration signal 113 as input, generates modulated signal 2919 of pilot symbols 305 according to frame configuration signal 113 and outputs this.

Signal generation section 2920 receives modulated signal 2903 of data symbols 303, modulated signal 2905 of preambles and modulated signal 2919 of pilot symbols 305 as input and outputs modulated signal 103A of channel A, modulated signal 103B of channel B and modulated signal 103C of channel C.

The configuration in FIG. 30 requires only six sequence storage sections. This is because as shown in FIG. 28, the present invention uses a certain sequence in two or more subcarriers (used in two subcarriers in FIG. 28). This allows the circuit scale of the transmission apparatus to be reduced. On the other hand, unlike FIG. 28, using all different sequences would require 12 sequence storage sections, which would increase the circuit scale.

Figure 31:
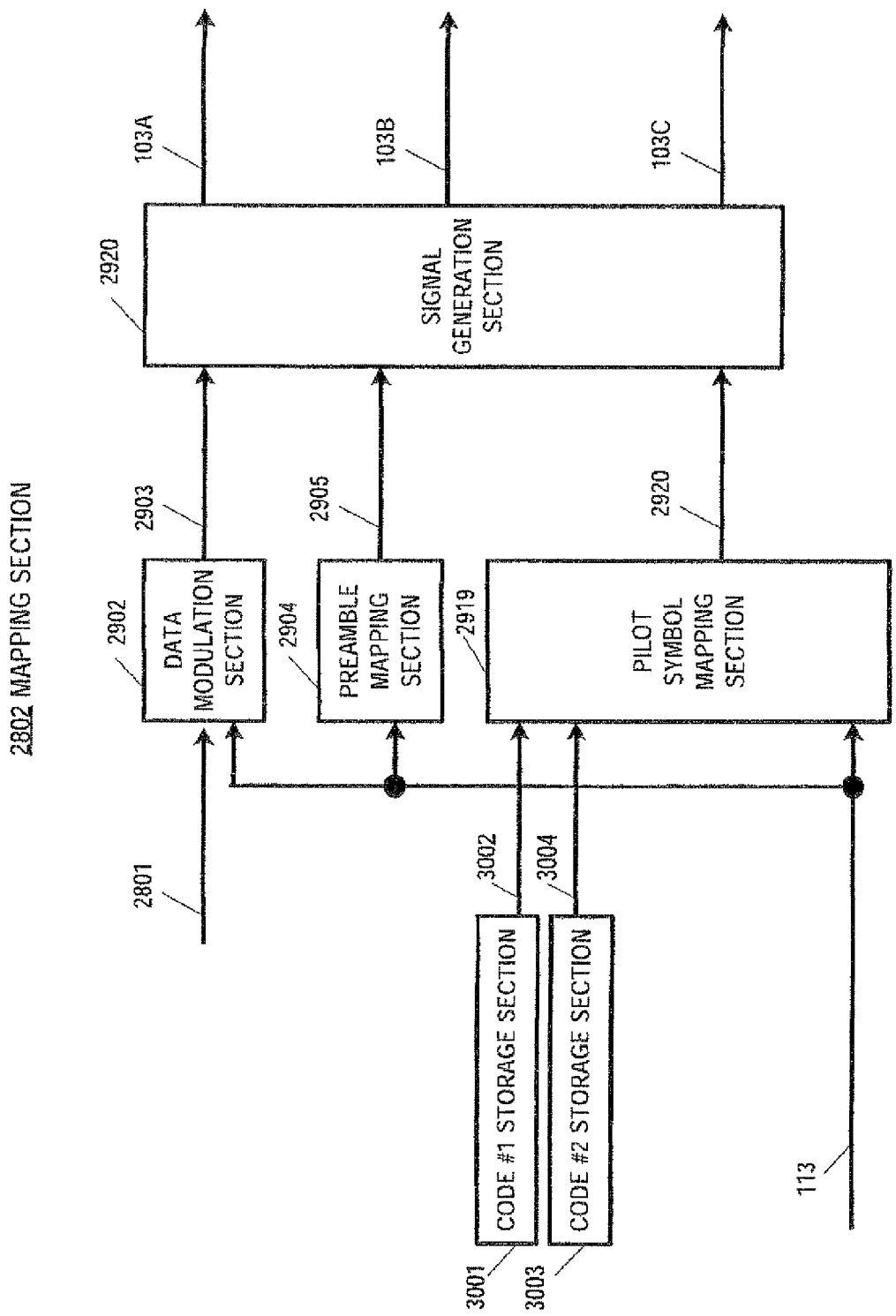
FIG. 31 is a block diagram showing another example of the configuration of a mapping section according to Embodiment 5.

Mapping section 2802 in FIG. 29 may also be composed, for example, as shown in FIG. 31. In FIG. 31, components which operate in the same way as those in FIG. 30 are assigned the same reference numerals as those in FIG. 30. Code #1 storage section 3001 stores "1, 1, −1, −1" and code #2 storage section 3003 stores "1, −1, 1, −1". Pilot symbol mapping section 2919 receives signal 3002 of pattern #1 and signal 3004 of pattern #2 output from code #1 storage section 3001 and code #2 storage section 3003, and frame configuration signal 113 as input and outputs modulated signal 2920 of pilot symbols 305.

At this time, as is clear from FIG. 28, there are only two types of basic signal pattern. Pilot symbol mapping section 2919 shifts codes using a shift register so as to generate six types of sequences #1 to #6 from the two basic patterns. Therefore, as shown in FIG. 31, the storage section can be composed of only two sections.

As described above, as is understandable from FIG. 29, FIG. 30 and FIG. 31, configuring pilot carriers as shown in FIG. 28 allows the configuration of the transmission apparatus to be simplified.

Next, the reception apparatus will be explained. FIG. 15 is an example of the configuration of the reception apparatus. Hereinafter, the configuration of frequency offset/phase noise estimation section 213 in FIG. 15 will be explained in detail using FIG. 32 and FIG. 33.

Figure 32:
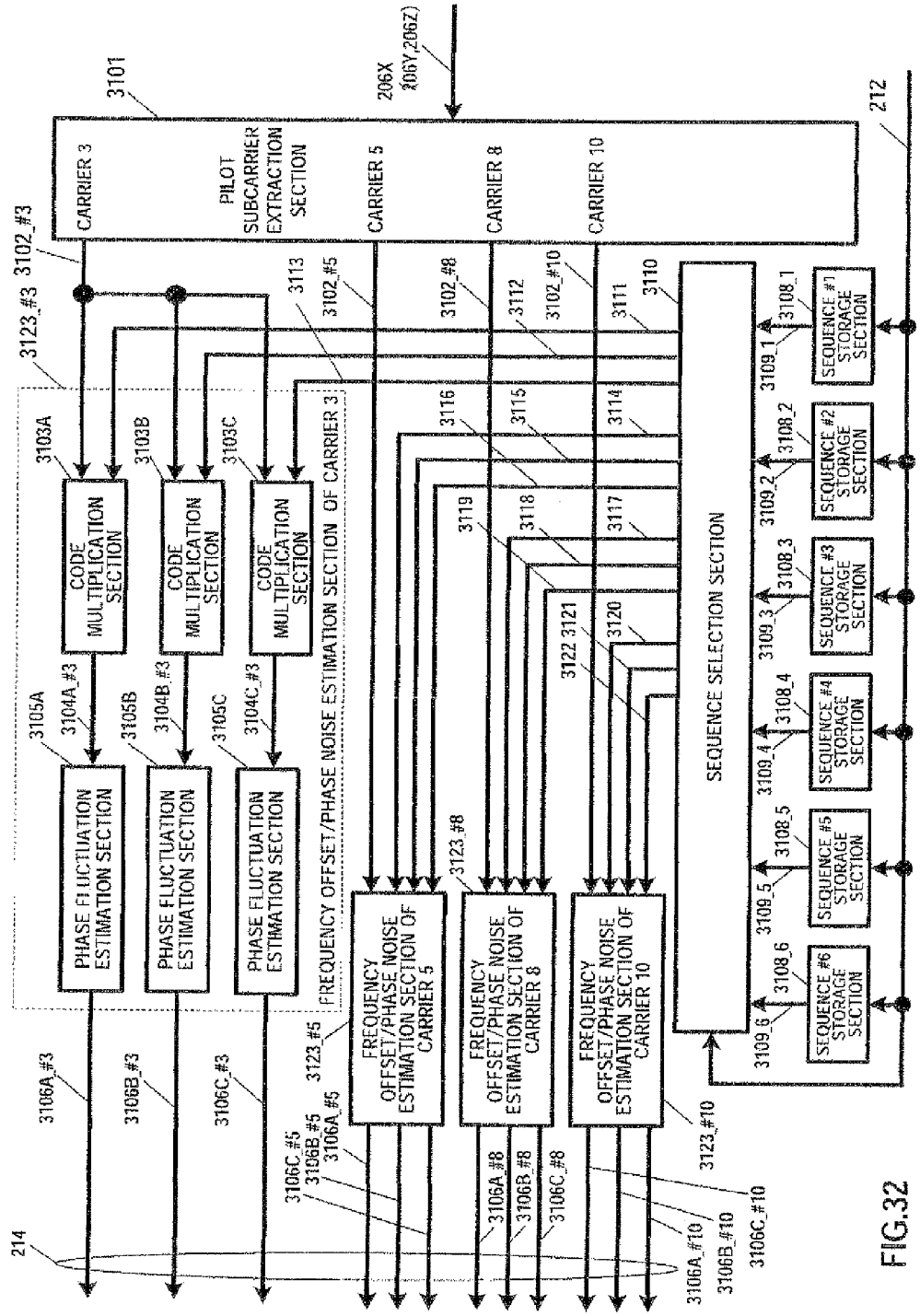
FIG. 32 is a block diagram showing the configuration of frequency offset/phase noise compensation section according to Embodiment 5.

FIG. 32 is an example of the configuration of frequency offset/phase noise estimation section 213 in FIG. 15 according to this embodiment. Frequency offset/phase noise estimation section 213 in FIG. 32 is provided with pilot carrier extraction section 3101, sequence storage sections 3108_1 to 3108_6, sequence selection section 3110, frequency offset/phase noise estimation section 3123_#3 of carrier 3, frequency offset/phase noise estimation section 3123_#5 of carrier 5, frequency offset/phase noise estimation section 3123_#8 of carrier 8 and frequency offset/phase noise estimation section 3123_#10 of carrier 10.

Pilot subcarrier extraction section 3101 receives signal 206X (or 206Y, 206Z) after a Fourier transform as input and extracts subcarriers which are pilot symbols 305. More specifically, signals of carriers 3, 5, 8, 10 are extracted. Therefore, pilot subcarrier extraction section 3101 outputs baseband signal 3102_#3 of carrier 3, baseband signal 3102_#5 of carrier 5, baseband signal 3102_#8 of carrier 8 and baseband signal 3102_#10 of carrier 10.

Sequence #1 storage section 3108_1 stores sequence #1 in FIG. 28 and outputs signal 3109_1 of sequence #1 according to timing signal 212. Sequence #2 storage section 3108_2 stores sequence #2 in FIG. 28 and outputs signal 3109_2 of sequence #2 according to timing signal 212. Sequence #3 storage section 3108_3 stores sequence #3 in FIG. 28 and outputs signal 3109_3 of sequence #3 according to timing signal 212. Sequence #4 storage section 3108_4 stores sequence #4 in FIG. 28 and outputs signal 3109_4 of sequence #4 according to timing signal 212. Sequence #5 storage section 3108_5 stores sequence #5 in FIG. 28 and outputs signal 3109_5 of sequence #5 according to timing signal 212. Sequence #6 storage section 3108_6 stores sequence #6 in FIG. 28 and outputs signal 3109_6 of sequence #6 according to timing signal 212.

Sequence selection section 3110 receives signal 3109_1 of sequence #1, signal 3109_2 of sequence #2, signal 3109_3 of sequence #3, signal 3109_4 of sequence #4, signal 3109_5 of sequence #5, signal 3109_6 of sequence #6 and timing signal 212 as input and assigns sequence #5 to signal 3111, sequence #1 to signal 3112, sequence #4 to signal 3113, sequence #3 to signal 3114, sequence #6 to signal 3115, sequence #5 to signal 3116, sequence #2 to signal 3117, sequence #1 to signal 3118, sequence #3 to signal 3119, sequence #4 to signal 3120, sequence #6 to signal 3121 and sequence #2 to signal 3122, and outputs them.

Frequency offset/phase noise estimation section 3123_#3 of carrier 3 is provided with code multiplication sections 3103A, 3103B and 3103C, phase fluctuation estimation sections 3105A, 3105B and 3105C and estimates frequency offset and/or phase noise of each channel of carrier 3.

Code multiplication section 3103A receives baseband signal 3102_#3 of carrier 3 and signal 3111 of sequence #5 as input and multiplies baseband signal 3102_#3 of carrier 3 by signal 3111 of sequence #5, thereby generating baseband signal 3104A_#3 of channel A of carrier 3 and outputting this. The reason is as follows.

Baseband signal 3102_#3 of carrier 3 is a signal in which the baseband signal of channel A, the baseband signal of channel B and the baseband signal of channel C are multiplexed. When this multiplexed signal is multiplied by signal 3111 of sequence #5, the components of the baseband signal of channel B and the baseband signal of channel C having a zero cross-correlation are removed and it is thereby possible to extract only a baseband signal component of channel A.

Phase fluctuation estimation section 3105A receives baseband signal 3104A_#3 of channel A of carrier 3 as input, estimates a phase fluctuation based on this signal and outputs phase fluctuation estimation signal 3106A_#3 of channel A.

In the same way, code multiplication section 3103B receives baseband signal 3102_#3 of carrier 3 and signal 3112 of sequence #1 as input and multiplies baseband signal 3102_#3 of carrier 3 by signal 3112 of sequence #1, thereby generating baseband signal 3104B_#3 of channel B of carrier 3 and outputting this. Furthermore, code multiplication section 3103C receives baseband signal 3102_#3 of carrier 3 and signal 3113 of sequence #4 as input and multiplies baseband signal 3102_#3 of carrier 3 by signal 3113 of sequence #4, thereby generating baseband signal 3104C_#3 of channel C of carrier 3 and outputting this.

Phase fluctuation estimation sections 3105B and 3105 C receive baseband signal 3104B_#3 of channel B of carrier 3 and baseband signal 3104C_#3 of channel C of carrier 3 as input respectively, estimate phase fluctuations based on these signals and output phase fluctuation estimation signal 3106B_#3 of channel B and phase fluctuation estimation signal 3106C_#3 of channel C respectively.

Frequency offset/phase noise estimation section 3123_#5 of carrier 5 only differs in the signal to be processed and operates in the same way as above described frequency offset/phase noise estimation section 3123_#3 of carrier 3 and outputs phase fluctuation estimation signal 3106A #5 of channel A, phase fluctuation estimation signal 3106B_#5 of channel B and phase fluctuation estimation, signal 3106C_#5 of channel C about carrier 5. Frequency offset/phase noise estimation section 3123_#8 of carrier 8 only differs in the signal to be processed and operates in the same way as above described frequency offset/phase noise estimation section 3123_#3 of carrier 3 and outputs phase fluctuation estimation signal 3106A_#8 of channel A, phase fluctuation estimation signal 3106B_#8 of channel B and phase fluctuation estimation signal 3106C_#8 of channel C about carrier 8. Moreover, frequency offset/phase noise estimation section 3123_#10 of carrier 10 also only differs in the signal to be processed and operates in the same way as above described frequency offset/phase noise estimation section 3123_#3 of carrier 3 and outputs phase fluctuation estimation signal 3106A_#10 of channel A, phase fluctuation estimation signal 3106B_#10 of channel B and phase fluctuation estimation signal 3106C_#10 of channel C about carrier 10.

As described above, causing signals of channel A, channel B and channel C of the same carrier to be orthogonal to each other, allows frequency offset/phase noise to be estimated with high accuracy even when pilot symbols 305 are multiplexed on channel A, channel B and channel C. Another important advantage is that since no channel estimation value (transmission path fluctuation estimation value) is required, the configuration of the part for compensating for the frequency offset/phase noise can be simplified. If the signal point constellations of pilot symbols 305 of channel A, channel B and channel C are not orthogonal to each other, signal processing of the MIMO demultiplexing, for example, ZF, MMSE, MLD are carried out and then frequency offset and/or phase noise are estimated. On the other hand, according to the present invention, it is, possible to compensate for the frequency offset/phase noise before demultiplexing a signal (signal processing section 223) as shown in FIG. 15. In addition, signal processing section 223 can remove the frequency offset/phase noise using pilot symbols 305 even after the signal is demultiplexed into the signal of channel A, signal of channel B and signal of channel C, and therefore it is possible to compensate for frequency offset and/or phase noise with higher accuracy.

On the other hand, when the signal point constellations of channel A, channel B and channel C on the same carriers are not orthogonal to each other, the estimation accuracy for frequency offset/phase noise estimation section 213 in FIG. 15 decreases (signals become components of interference with each other), and therefore it is difficult to add frequency offset/phase noise compensation section 215 in FIG. 15 and it is not possible to perform frequency offset/phase noise compensation with high accuracy.

Figure 33:
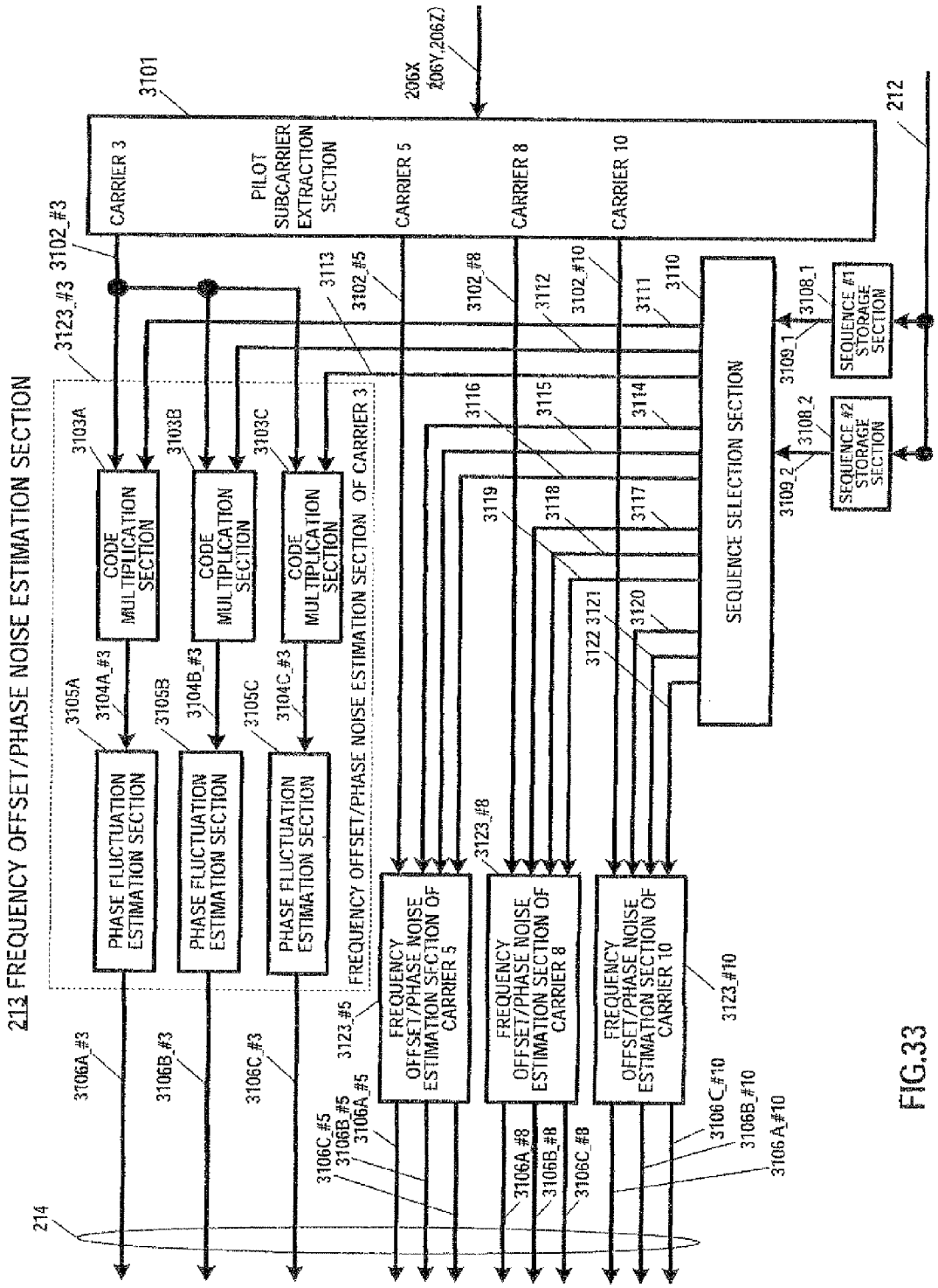
FIG. 33 is a block diagram showing another configuration of the frequency offset/phase noise compensation section according to Embodiment 5.

Furthermore, as a configuration different from the configuration in FIG. 32, the configuration in FIG. 33 may be considered. FIG. 33 is different from FIG. 32 in that sequence storage sections 3108_1 to 3108_6 are replaced by code storage sections 3201_1 and 3201_2. Code #1 storage section 3201_1 stores "1, 1, −1, −1" and code #2 storage section 3201_2 stores "1, −1, 1 −1". Code selection section 3203 shifts two types of basic codes input from code storage sections 3201_1 and 3201_2 using a shift register, thereby generating six types of sequences #1 to #6. This allows the storage section to be composed of only two sections and can thereby simplify the configuration compared to the configuration in FIG. 32. This is possible because pilot symbols 305 of the same sequence are assigned to a plurality of channels or a plurality of carriers.

As described above, a plurality of channels or a plurality of carriers use pilot symbols 305 of the same sequence, and therefore it is possible to standardize sequence storage sections 3108_1 to 3108_6 in FIG. 32 or standardize code storage sections 3201_1 and 3201_2 in FIG. 33 among a plurality of channels or a plurality of carriers, which leads to simplification of the reception apparatus.

As shown in FIG. 27, the case where pilot symbols (pilot carriers) 305 for estimating distortion due to frequency offset or phase noise or the like are arranged on specific subcarriers has been explained so far, but the frame configuration of pilot symbols 305 different from FIG. 27 will be explained hereinafter.

Figure 36:
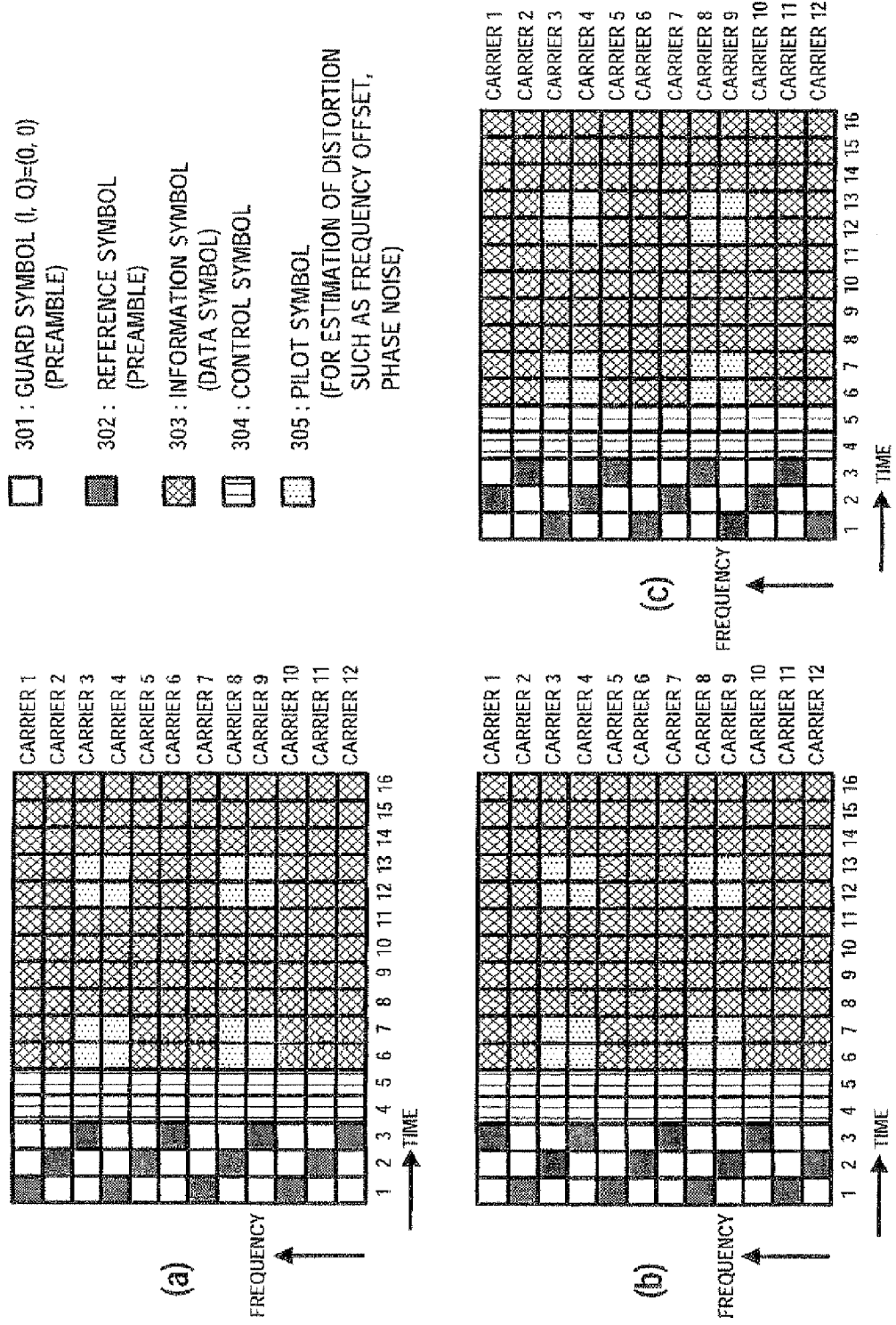
FIG. 36 provides diagrams showing still further examples of the frame configuration according to Embodiment 5, where (a) shows the frame configuration of channel A, (b) shows the frame configuration of channel B and (c) shows the frame configuration of channel C.

FIG. 34, FIG. 35 and FIG. 36 show examples of the frame configuration of transmission signals different from that in FIG. 27.

In FIG. 34, pilot symbols 305 are arranged at specific times on specific carriers. FIG. 34(*a*) shows the frame configuration of channel A, FIG. 34(*b*) shows the frame configuration of channel B and FIG. 34(*c*) shows the frame configuration of channel C. In the example in FIG. 34, pilot symbol sequences which are orthogonal to each other are used among channels of the same carriers and at the same time pilot symbol sequences of the same sequences are repeatedly used where pilot symbols 305 are multiplexed on channel A, channel B and channel C. On channel A, pilot symbols 305 of different sequences are used for different subcarriers. That is, from time 6 to time 9 in the example of FIG. 34, mapping similar to that for pilots from time 11 to time 14 in FIG. 28 is performed, and next from time 12 to time 15 in FIG. 34, mapping is performed according to a rule similar to that from time 11 to time 14 in FIG. 28. Thus, using the frame configuration in FIG. 34 under a condition equivalent to the above described one can obtain effects similar to those described above.

In FIG. 35, pilot symbols 305 are arranged in a plurality of consecutive subcarriers at a specific time. At this time, for example, a pilot symbol sequence on channel A at time 6 on carrier 2 to carrier 5, a pilot symbol sequence on channel B at time 6 on carrier 2 to carrier 5 and a pilot symbol sequence on channel C at time 6 on carrier 2 to carrier 5 are orthogonal to each other. In the same way, pilot signals (pilot symbols) 305 on channel A at time 6 on carrier 8 to carrier 11, pilot signals on channel B at time 6 on carrier 8 to carrier 11 and pilot signals on channel C at time 6 on carrier 8 to carrier 11 are orthogonal to each other.

Furthermore, pilot signals on channel A at time 12 on carrier 2 to carrier 5, pilot signals on channel B at time 12 on carrier 2 to carrier 5 and pilot signals on channel C at time 12 on carrier 2 to carrier 5 are orthogonal to each other. In the same way, pilot signals on channel A at time 12 on carrier 8 to carrier 11, pilot signals on channel B at time 12 on carrier 8 to carrier 11 and pilot signals on channel C at time 12 on carrier 8 to carrier 11 are orthogonal to each other.

Furthermore, using, for example, the same sequence for pilot signals on channel A at time 6 on carrier 2 to carrier 5 and for pilot signals on channel C at time 6 on carrier 8 to carrier 11 and also using the same sequence for other pilot signals can reduce a circuit scale and obtain effects similar to those in the case in FIG. 27. Here, a plurality of consecutive subcarriers have been explained as an example, but this example is not exclusive and similar effects can be obtained even if pilot symbols 305 are assigned to subcarriers discretely to an extent that orthogonality is not lost. Furthermore, as shown in FIG. 36, even when pilot symbols are assigned on both the time axis and the frequency axis, similar effects can be obtained. In any case, effects similar to those described above can be obtained by assigning pilot symbols 305 in the frequency axis or the time domain in such a way that orthogonality is not lost.

This embodiment has been explained using an example where pilot symbols 305, which are orthogonal to each other in four-symbol units, but the present invention is not limited to four-symbol units. However, considering the influence of a fading fluctuation in the time direction or the frequency direction on the orthogonality, forming an orthogonal pattern with about 2 to 8 symbols may allow the estimation accuracy of frequency offset/phase noise to be secured. When the period of an orthogonal pattern is too long, the possibility that the orthogonality may not be secured increases and the estimation accuracy of frequency offset/phase noise degrades.

The important points in the method of configuration of pilot symbols 305 of this embodiment are as follows:
(a) Pilot signals on the same carriers of channel A, channel B and channel C are orthogonal to each other.
(b) In different carriers on which pilot signals are arranged, channels using different sequences exist.
(c) Two or more channels using the same sequence exist (for example, one certain sequence is used for both antenna A and antenna B, that is, one certain sequence is shared by a plurality of different antennas).

In this way, when performing MIMO-OFDM transmission using three transmission antennas, it is possible to minimize an increase of transmission peak power without degrading the estimation accuracy of frequency offset/phase noise and realize a transmission apparatus in a simple configuration. It is an optimum condition to select pilot signals so as to meet all of the three conditions above and form pilot carriers, but when, for example, only some of the above described effects are preferably obtained, it is also possible to select pilot signals so at to meet, for example, only two out of the three conditions above and form pilot carriers.

This embodiment has been explained with an example using an OFDM scheme but the present invention is not limited to this and can also be implemented in the same way when using a single-carrier scheme, other multicarrier schemes or a spread spectrum communication scheme. Furthermore, this embodiment has been explained with an example where three antennas are used for transmission and reception respectively, but the present invention is not limited to this. Embodiments with other numbers of antennas or using other transmission methods will be explained in detail later. In addition, this embodiment has been explained using naming such as "pilot symbol", "reference symbol", "guard symbol", "preamble" here, but using other names will by no means influence this embodiment. This will be the same in other embodiments. Furthermore, this embodiment has been explained using naming such as "channel A", "channel B", "channel C", but these are used to facilitate the explanations and using other names will by no means influence this embodiment.

Embodiment 6

Embodiment 1 used the term "pattern" to explain the pilot symbol configuration, but this embodiment will use a term "sequence" as in the case of Embodiment 5 to explain Embodiment 1. That is, this embodiment is similar to Embodiment 1 in the basic concept and the basic configuration.

FIG. 2 shows the configuration of MIMO-OFDM transmission apparatus 100 according to this embodiment. However, FIG. 2 shows a case where the number of transmission antennas m=2 as an example.

Frame configuration signal generation section 112 receives control information 111 on a modulation scheme or the like as input, generates frame configuration signal 113 which includes information on the frame configuration and outputs this.

Mapping section 102A receives transmission digital signal 101A of channel A, frame configuration signal 113 as input, generates baseband signal 103A based on the frame configuration and outputs this.

Serial/parallel conversion section 104A receives baseband signal 103A and frame configuration signal 113 as input, applies a serial/parallel conversion thereto based on frame configuration signal 113 and outputs parallel signal 105A.

Inverse Fourier transform section 106A receives parallel signal 105A as input, applies an inverse Fourier transform thereto and outputs signal 107A after the inverse Fourier transform.

Radio section 108A receives signal 107A after the inverse Fourier transform as input, applies processing such as a frequency conversion and outputs transmission signal 109A. Transmission signal 109A is output as a radio wave from antenna 110A.

MIMO-OFDM transmission apparatus 100 also generates transmission signal 109B of channel B by applying processing similar to that on channel A to channel B. The element indicated with "B" appended at the end of the reference numeral is the part related to channel B, which simply means that the target signal is not channel A but channel B and is basically subjected to processing similar to that on the above described part related to channel A indicated with "A" appended at the end of the reference numeral.

FIG. 3A shows an example of the configuration of a reception apparatus according to this embodiment. However, FIG. 3A shows a case where the number of reception antennas is n=2 as an example.

In reception apparatus 200, radio section 203X receives signal 202X received at reception antenna 201X as input, applies processing such as a frequency conversion thereto and outputs baseband signal 204X.

Fourier transform section 205X receives baseband signal 204X as input, applies a Fourier transform and outputs signal 206X after the Fourier transform.

A similar operation is carried out on the reception antenna 201Y side and synchronization section 211 receives baseband signals 204X and 204Y as input, establishes time synchronization with a transmitter by detecting, for example, reference symbols and outputs timing signal 212. The configuration or the like of reference symbols will be explained in detail using FIG. 4 or the like.

Frequency offset/phase noise estimation section 213 receives signals 206X and 206Y after the Fourier transform as input, extracts pilot symbols and estimates frequency offset and/or phase noise from the pilot symbols and outputs phase distortion estimation signal 214 (phase distortion including frequency offset). The configuration or the like of pilot symbols will be explained in detail using FIG. 4 or the like.

Transmission path fluctuation estimation section 207A of channel A receives signal 206X after the Fourier transform as input, extracts reference symbols of channel A, estimates a transmission path fluctuation of channel A based on the reference symbols, for example, and outputs transmission path estimation signal 208A of channel A.

Transmission path fluctuation estimation section 207B of channel B receives signal 206X after the Fourier transform as input, extracts reference symbols of channel B, estimates a transmission path fluctuation of channel B based on the reference symbols, for example, and outputs transmission path estimation signal 208B of channel B.

Transmission path fluctuation estimation section 209A of channel A and transmission path fluctuation estimation section 209B of channel B receive a signal received at antenna 201Y as the target signal instead of a signal received at antenna 201X and basically carry out processing similar to that described above on transmission path fluctuation estimation section 207A of channel A and transmission path fluctuation estimation section 207B of channel B.

Frequency offset/phase noise compensation section 215 receives transmission path estimation signals 208A and 210A of channel A, and transmission path estimation signals 208B and 210E of channel B, signals 206X and 206Y after the Fourier transform and phase distortion estimation signal 214 as input, removes the phase the distortion of each signal and outputs transmission path estimation signals 220A and 222A of channel A after phase compensation, transmission path estimation signals 220B and 222B of channel B after phase compensation and signals 221X and 221Y after the Fourier transform and after the phase compensation.

Figure 38:
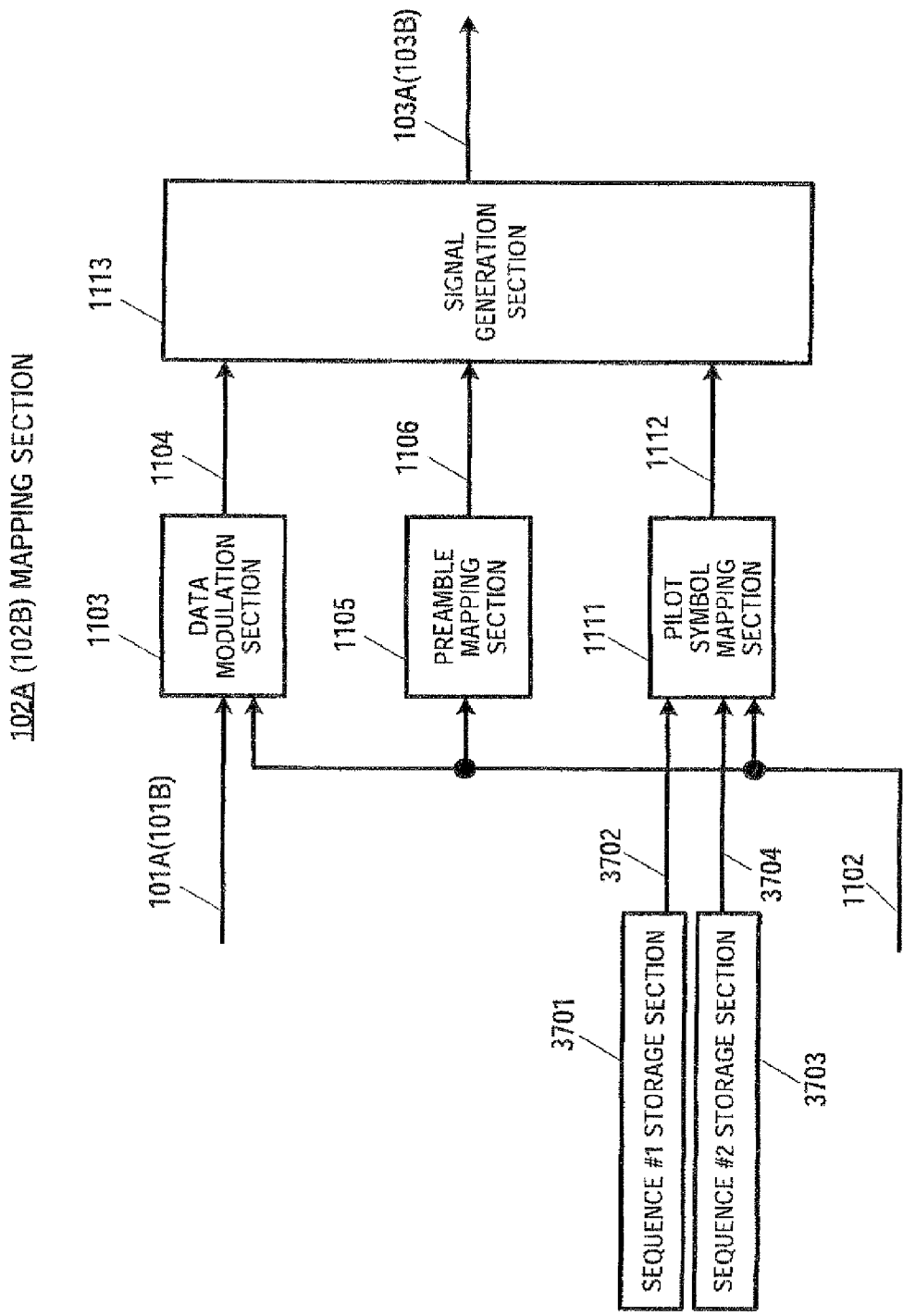
FIG. 38 is a block diagram showing the configuration of a mapping section according to Embodiment 6.

Signal processing section 223 carries out, for example, an inverse matrix calculation and outputs baseband signal 224A of channel A and baseband signal 224B of channel B. More specifically, as shown in FIG. 38, for example, assuming that for a certain subcarrier, a transmission signal from antenna AN1 is Txa(t), a transmission signal from antenna AN2 is Txb(t), a received signal of antenna AN3 is $R1(t)$, a received signal of antenna AN4 is $R2(t)$ and transmission path fluctuations are $h11(t)$, $h12(t)$, $h21(t)$ and $h22(t)$ respectively, the relationship equation of Expression (1) holds.

Here, t is time, and $n1(t)$ and $n2(t)$ are noise. Signal processing section 223 obtains a signal of channel A and a signal of channel B by carrying out, for example, an operation of an inverse matrix using Equation (1). Signal processing section 223 executes this operation on all subcarriers. $h11(t)$, $h12(t)$, $h21(t)$ and $h22(t)$ are estimated by transmission path fluctuation estimation sections 207A, 209A, 207B and 209B.

Frequency offset estimation/compensation section 225A receives baseband signal 224A of channel A as input, extracts pilot symbols, estimates and compensates for frequency offset of baseband signal 224A based on the pilot symbols and outputs baseband signal 226A after frequency offset compensation.

Channel A demodulation section 227A receives baseband signal 226A after the frequency offset compensation as input, demodulates data symbols and outputs received data 228A.

MIMO-OFDM reception apparatus 200 also applies similar processing to baseband signal 224B of channel B and obtains received data 228B.

FIG. 4 shows a time—frequency frame configuration of channel A (FIG. 4($a$)) and channel B (FIG. 4 ($b$)) of this embodiment. Signals at the same time on the same carriers in FIG. 4($a$) and FIG. 4 ($b$) are spatially multiplexed.

From time 1 to time 8, symbols for estimating transmission path fluctuations corresponding to $h11(t)$, $h12(t)$, $h21(t)$ and $h22(t)$ in Equation (1), for example, symbols called "preambles" are transmitted. This preamble is composed of guard symbol 301 and reference symbol 302. Guard symbol 301 is assumed to be (0, 0) on the in-phase I—quadrature Q plane. Reference symbol 302 is, for example, a symbol at known coordinates other than (0, 0) on the in-phase I—quadrature Q plane. Channel A and channel B are configured such that no interference occurs with each other. That is, when, for example, guard symbol 301 is placed on channel A on carrier 1 at time 1, reference symbol 302 is placed on channel B and when reference symbol 302 is placed on channel A on carrier 2 at time 1, guard symbol 301 is placed on channel B, and in this way different symbols are placed on channel A and channel B. By adopting such an arrangement, when, for example, attention is focused on channel A at time 1, it is possible to estimate a transmission path fluctuation of carrier 3 using reference symbols 302 of carrier 2 and carrier 4. Since carrier 2 and carrier 4 are reference symbols 302, the transmission path fluctuation can be estimated. Therefore, transmission path fluctuations of all carriers of channel A can be accurately estimated at time 1. In the same way, transmission path fluctuations of all carriers can be accurately estimated for channel B, too. From time 2 to time 8, transmission path fluctuations of all carriers of channel A and channel B can be estimated in the same way. Thus, since the frame configuration in FIG. 4 allows transmission path fluctuations of all carriers to be estimated at all times from time 1 to time 8, this can be said to be a preamble configuration capable of realizing quite high accuracy estimation of transmission path fluctuations.

In FIG. 4, information symbol (data symbol) 303 is a symbol for transmitting data. Here, suppose the modulation scheme is BPSK, QPSK, 16QAM or 64QAM. A signal point constellation on the in-phase I—quadrature Q plane or the like in this case will be explained in detail using FIG. 5.

Control symbol 304 is a symbol for transmitting control information on a modulation scheme, error correcting coding scheme, coding rate or the like.

Pilot symbol 305 is a symbol for estimating a phase fluctuation by frequency offset and/or phase noise. For example, a symbol having known coordinates on the in-phase I—quadrature Q plane is used. As pilot symbol 305. Pilot symbols 305 are placed on carrier 4 and carrier 9 on both channel A and channel B. When a wireless LAN builds a system at the same frequency and in the same frequency band according to IEEE802.11a, IEEE802.11g and spatial multiplexing MIMO system, this allows the frame configuration to be shared, and therefore it is possible to simplify the reception apparatus.

FIG. 5 shows signal point constellations of BPSK, QPSK, 16QAM and 64QAM which are modulation schemes of information symbols 303 in FIG. 4 on the in-phase I—quadrature Q plane and normalization factors thereof.

FIG. 5A shows a signal point constellation of BPSK on the in-phase I—quadrature Q plane and their coordinates are as shown in FIG. 5A. FIG. 5B is a signal point constellation of QPSK on the in-phase I—quadrature Q plane and their coordinates are as shown in FIG. 5B. FIG. 5C is a signal point constellation of 16QAM on the in-phase I—quadrature Q plane and their coordinates are as shown in FIG. 5C. FIG. 5D is a signal point constellation of 64QAM on the in-phase I—quadrature Q plane and their coordinates are as shown in FIG. 5D. FIG. 5E shows a relationship between a modulation scheme and a multiplication factor (i.e., normalization factor) for correcting signal point constellations in FIG. 5A to FIG. 5D so that average transmit power is kept constant among different modulation schemes. For example, when transmission is carried out under the modulation scheme of QPSK in FIG. 5B, as is clear from FIG. 5E, it is necessary to multiply the coordinates in FIG. 5B by a value of 1/sqrt(2). Here, sqrt(x) refers to the square root of x.

FIG. 6 shows an arrangement of pilot symbold 305 of FIG. 4 on the in-phase I—quadrature Q plane according to this embodiment. FIG. 6(*a*) shows an example of signal point constellation of pilot symbols 305 from time 11 to time 18 of carrier 4 of channel A shown in FIG. 4(*a*). FIG. 6(*b*) shows an example of signal point constellation of pilot symbols 305 from time 11 to time 18 on carrier 4 of channel B shown in FIG. 4(*b*). FIG. 6(*c*) shows an example of signal point constellation of pilot symbols 305 from time 11 to time 18 of carrier 9 of channel A shown in FIG. 4(*a*). FIG. 6(*d*) shows an example of signal point constellation of pilot symbols 305 from time 11 to time 18 on carrier 9 of channel B shown in FIG. 4(*b*). Here, BPSK modulation is used for these arrangements but the modulation is not limited to this.

A feature of the signal point constellations of pilot symbols 305 in FIG. 6 is that the signal point constellations on the same carriers of channel A and channel B are orthogonal to each other (cross-correlation is zero).

For example, the signal point constellation from time 11 to time 14 of channel A on carrier 4 is orthogonal to the signal point constellation from time 11 to time 14 of channel B on carrier 4. Furthermore, the same applies to time 15 to time 18. The signal point constellation from time 11 to time 14 of channel A on carrier 9 is also orthogonal to the signal point constellation from time 11 to time 14 of channel B on carrier 9. Furthermore, the same applies to time 15 to time 18. At this time, using a Walsh-Hadamard conversion, orthogonal codes or the like is suitable because of the orthogonality of signals. FIG. 6 shows the case of BPSK, but if signals are orthogonal, QPSK modulation may also be used or it may not be necessary to follow the rule of the modulation scheme.

Furthermore, in the case of this embodiment, for simplicity of the receiver, suppose the signal point constellations are the same (same pattern) between carrier 4 of channel A and carrier 9 of channel B and between carrier 9 of channel A and carrier 4 of channel B. However, the same pattern does not mean do adopt completely the same signal point constellation. For example, a case where only the phase relationship is different on the in-phase I—quadrature Q plane can also be regarded as the same pattern.

Here, as defined in Embodiment 5, if it is assumed that "the same sequence" means completely the same signal point constellation, for simplicity of the receiver, the signal point constellations may be assumed to be same between carrier 4 of channel A and carrier 9 of channel B and between carrier 9 of channel A and carrier 4 of channel B, that is, the same sequence.

Furthermore, the signal point constellation of pilot symbols 305 is made to differ between carriers 4 and 9 of channel A (or channel B), that is, different sequences, and this is because using the same signal point constellation may lead to an increase of transmission peak power.

Here, the advantage of orthogonality will be explained in detail using FIG. 3A and FIG. 37 first.

Figure 37:
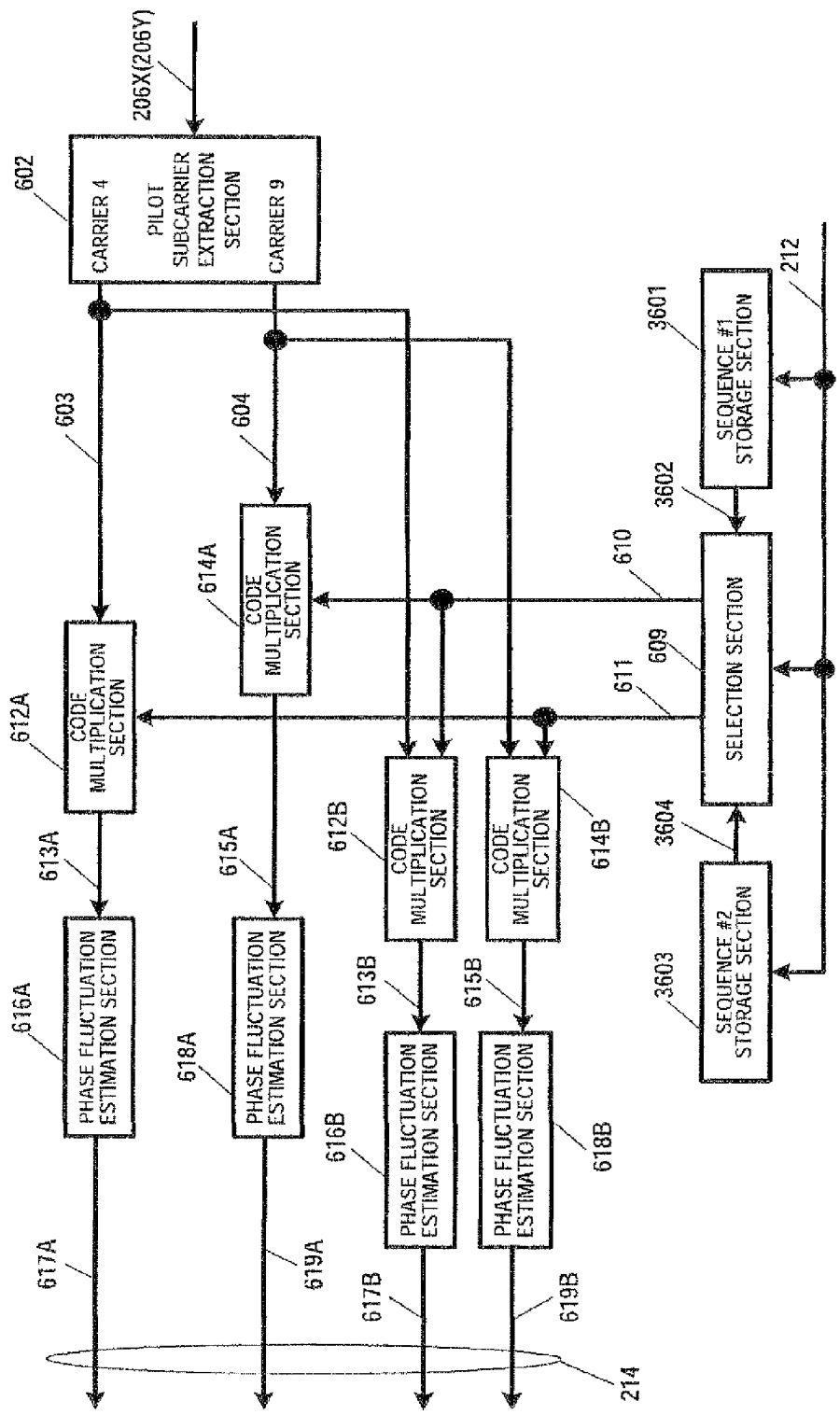
FIG. 37 is a block diagram showing the configuration of frequency offset/phase noise estimation section according to Embodiment 6.

FIG. 37 is an example of the configuration of frequency offset/phase noise estimation section 213 in FIG. 3A. Pilot carrier extraction section 602 receives signal 206X (or 206Y) after a Fourier transform as input and extracts subcarrier which are pilot symbols 305. More specifically, it extracts signals of carrier 4 and carrier 9. Therefore, pilot carrier extraction section 602 outputs baseband signal 603 of carrier 4 and baseband signal 604 of carrier 9.

Sequence #1 storage section 3601 stores, for example, sequence #1 of "1, −1, 1, −1" in FIG. 6 and outputs signal 3602 of sequence #1 according to timing signal 212.

Sequence #2 storage section 3603 stores, for example, sequence #2 of "1, 1, −1, −1" in FIG. 6 and outputs signal 3604 of sequence #2 according to timing signal 212.

Selection section 609 receives timing signal 212, signal 3602 of sequence #1 and signal 3604 of sequence #2 as input, outputs the signal of sequence #2 as selection signal 610 and outputs the signal of sequence #1 as selection signal 611.

Code multiplication section 612A receives baseband signal 603 of carrier 4 and selection signal 611 as input, multiplies baseband signal 603 of carrier 4 by selection signal 611, generates baseband signal 613A of channel A of carrier 4 and outputs this. The reason is as follows.

Baseband signal 603 of carrier 4 is a signal in which the baseband signal of channel A and the baseband signal of channel B are multiplexe. On the other hand, when selection signal 611, that is, the signal of sequence #1 is multiplied, the component of the baseband signal of channel B whose cross-correlation is zero is removed and only the component of the baseband signal of channel A can thereby be extracted.

In the same way, code multiplication section 614A receives baseband signal 604 of carrier 9 and selection signal 610 as input, multiplies baseband signal 604 of carrier 9 by selection signal 610, generates baseband signal 615A of channel A of carrier 9 and outputs this.

Code multiplication section 612B receives baseband signal 603 of carrier 4 and selection signal 610 as input, multiplies baseband signal 603 of carrier 4 by selection signal 610, generates baseband signal 613B of channel B of carrier 4 and outputs this.

Code multiplication section 614B receives baseband signal 604 of carrier 9 and selection signal 611 as input, multiplies baseband signal 604 of carrier 9 by selection signal 611, generates baseband signal 615B of channel B of carrier 9 and outputs this.

As described above, by making signal point constellations of channel A and channel B on the same carriers orthogonal to each other, even when pilot symbols 305 are multiplexed on channel A and channel B, it is possible to estimate frequency offset and/or phase noise with high accuracy. Another important advantage is that since no channel estimation value (transmission path fluctuation estimation value) is required, it is possible to simplify the configuration of the part for compensating for the frequency offset and/or phase noise. If signal point constellations of pilot symbols 305 of channel A and channel B are not orthogonal to each other, signal processing of MIMO demultiplexing (for example, ZF, MMSE or MLD) is carried out, frequency offset and/or phase noise are then estimated. On the other hand, according to the configuration of this embodiment, it is possible to compensate for frequency offset and/or phase noise before demultiplexing a signal (signal processing section 223) as shown in FIG. 3A. In addition, the frequency offset and/or phase noise can be removed using pilot symbols 305 even after demultiplexing the signal of channel A from the signal of channel B by signal processing section 223, thereby making it possible to compensate for frequency offset and/or phase noise with higher accuracy.

By the way, when the signal point constellations of channel A and channel B of the same carriers are not orthogonal to each other, the estimation accuracy for frequency offset and/or phase noise by frequency offset/phase noise estimation section 213 in FIG. 3A decreases (signals become components of interference with each other), and therefore it is difficult to add the frequency offset/phase noise compensation section 215 in FIG. 3A and it is not possible to realize high accuracy frequency offset/phase noise compensation.

Furthermore, this embodiment assumes the same signal point constellation (same sequence) for carrier 4 of channel A and carrier 9 of channel B, and carrier 9 of channel A and carrier 4 of channel B, thereby providing commonality between sequence storage sections 3601 and 3603 in FIG. 37 and this leads to simplification of the reception apparatus.

However, while it is essential in this embodiment that signal point constellations of channel A and channel B on the same carriers be orthogonal to each other, it is not necessarily essential that they have the same sequence.

This embodiment has been explained using an example where pilot symbols 305, which are orthogonal to each other in four-symbol units, from time 11 to time 14, but the present invention is not limited to four-symbol units. However, when considering an influence on the orthogonality due to a fluctuation of fading in the time direction, if an orthogonal pattern is formed in 2 to 8-symbol units, it may be possible to secure the estimation accuracy for frequency offset/phase noise. When the period of an orthogonal pattern is too long, the possibility that the orthogonality may not be secured increases and the estimation accuracy for frequency offset/phase noise degrades.

FIG. 38 shows an example of the configuration of mapping section 102A (102B) of the transmission apparatus of this embodiment in FIG. 2. Data modulation section 1103 receives transmission digital signal 101A (101B) and frame configuration signal 1102 as input, applies modulation to transmission digital signal 101A (101B) based on the information on the modulation scheme and timing included in frame configuration signal 1102 and outputs modulated signal 1104 of data symbols 303.

Preamble mapping section 1105 receives frame configuration signal 1102 as input and outputs modulated signal 1106 of preambles based on the frame configuration.

Sequence #1 storage section 3701 outputs signal 3702 of sequence #1. In the same way, sequence #2 storage section 3703 outputs signal 3704 of sequence #2.

Pilot symbol mapping section 1111 receives signal 3702 of sequence #1, signal 3704 of sequence #2 and frame configuration signal 1102 as input, generates modulated signal 1112 of pilot symbol 305 and outputs this.

Signal generation section 1113 receives modulated signal 1104 of data symbol 303, modulated signal 1106 of preambles and modulated signal 1112 of pilot symbols 305 as input, generates baseband signal 103A (103B) in accordance with the frame configuration and outputs this.

The above described explanation shows that adopting the configuration of pilot symbols 305 as shown in FIG. 4 and FIG. 6 can simplify the reception apparatus. Similarly, adopting the pilot symbol configuration as shown in FIG. 4 and FIG. 6 also allows the transmission apparatus to standardize sequence storage sections 3701 and 3703 as shown in FIG. 38 and also leads to the simplification of the transmission apparatus.

As shown above, the method of generating preambles and pilot signals of this embodiment, the detailed configuration and operation of the transmission apparatus which generates them and the reception apparatus which receives the modulated signal of this embodiment have been explained. According to this embodiment, it is possible to improve the estimation accuracy of frequency offset, transmission path fluctuation and synchronization, thereby improving the probability of detection of signals and simplifying the transmission apparatus and the reception apparatus.

As in the case of Embodiment 1, the important points of the method of configuration of pilot symbols 305 of this embodiment are as follows:

(a) Pilot signals of channel A and channel B on the same carriers are orthogonal to each other.

(b) Within the same channel, different sequences are used for different carriers on which pilot signals are arranged.

(c) The same sequence is used on each channel (channel A and channel B).

In this way, when performing MIMO-OFDM transmission using two transmission antennas, it is possible to minimize an increase of transmission peak power without degrading the estimation accuracy of frequency offset/phase noise and realize a transmission apparatus in a simple configuration. It is an optimum condition to select pilot signals so as to meet all of the three conditions above and form pilot carriers. However, when, for example, only some of the above described effects are preferably obtained, it is also possible to select pilot signals so at to meet, for example, only two out of the three conditions above and form pilot carriers.

This embodiment has been explained with an example using an OFDM scheme but the present invention is not limited to this and can also be implemented in the same way when using single-carrier schemes, other multicarrier schemes or spread spectrum communication schemes. Furthermore, this embodiment has been explained with an example where two antennas are used for transmission and reception respectively, but the present invention is not limited to this and can also be implemented even when the number of reception antennas is three or more, in the same way without being influenced. Furthermore, the frame configuration is not limited to this embodiment and especially pilot symbols 305 for estimating distortion such as frequency offset, phase noise or the like may only be required to be arranged on specific subcarriers, and transmitted from a plurality of antennas, and the number of the subcarriers for transmitting pilot symbols 305 is not limited to two of this embodiment. Embodiments with other numbers of antennas or using other transmission methods will be explained in detail later. In addition, this embodiment has been explained using naming such as "pilot symbol 305", "reference symbol 302", "guard symbol 301", "preamble", but using other names will by no means influence this embodiment. This will be the same in other embodiments. Furthermore, this embodiment has been explained using naming such as "channel A", "channel B", "channel C", but these are used to facilitate the explanations and using other names will by no means influence this embodiment.

Furthermore, the frame configuration has been explained using the frame configuration in FIG. 4 as an example but this example is not exclusive. Especially, pilot symbols 305 have been explained with an example where they are arranged on specific subcarriers, but this example is not exclusive and the present invention can also be implemented in the same way even when they are arranged as shown in FIG. 34, FIG. 35 and FIG. 36 explained in Embodiment 5. However, it is important that they be arranged so as to secure orthogonality of pilot signals.

Embodiment 7

Embodiment 1 and Embodiment 6 have explained the method of arranging pilot symbols 305 on two subcarriers in the case where the number of transmission signals is two and the number of antennas is two, but this embodiment will more specifically explain a method of arranging pilot symbols 305 on four subcarriers and transmitting them.

Figure 39:
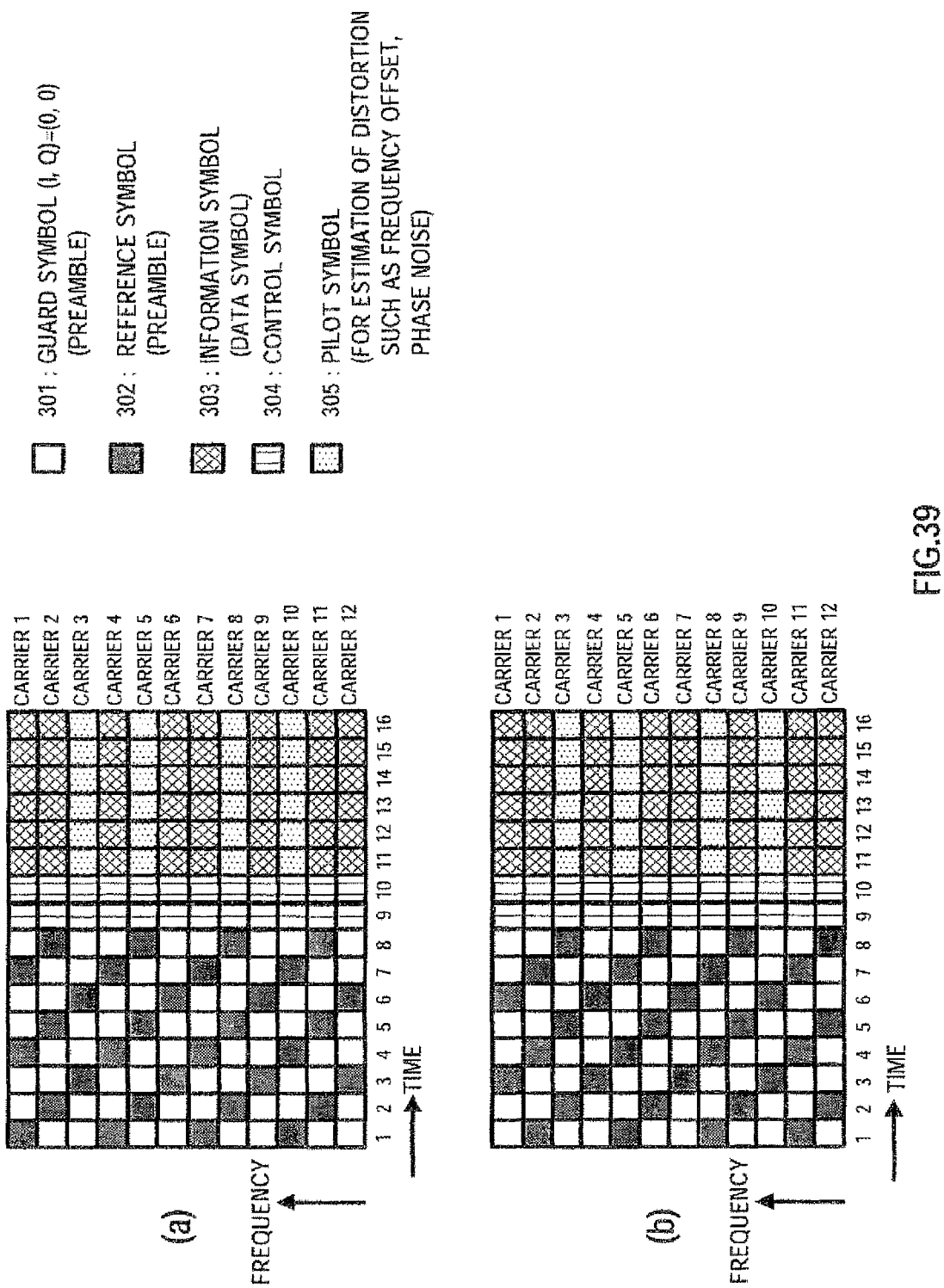
FIG. 39 provides diagrams showing the frame configuration according to Embodiment 7, where (a) shows the frame configuration of channel A and (b) shows the frame configuration of channel B.

FIG. 39 shows an example of the frame configuration of a transmission signal according to this embodiment and parts which correspond to those in FIG. 4 are assigned the same reference numerals. FIG. 39(*a*) shows the frame configuration of channel A and FIG. 39(*b*) shows the frame configuration of channel B. As is clear from FIG. 39, pilot symbols (pilot carriers) 305 are arranged on carrier 3, carrier 5, carrier 8 and carrier 10 except times at which reference symbols 302 and control symbols are transmitted.

Figure 40:
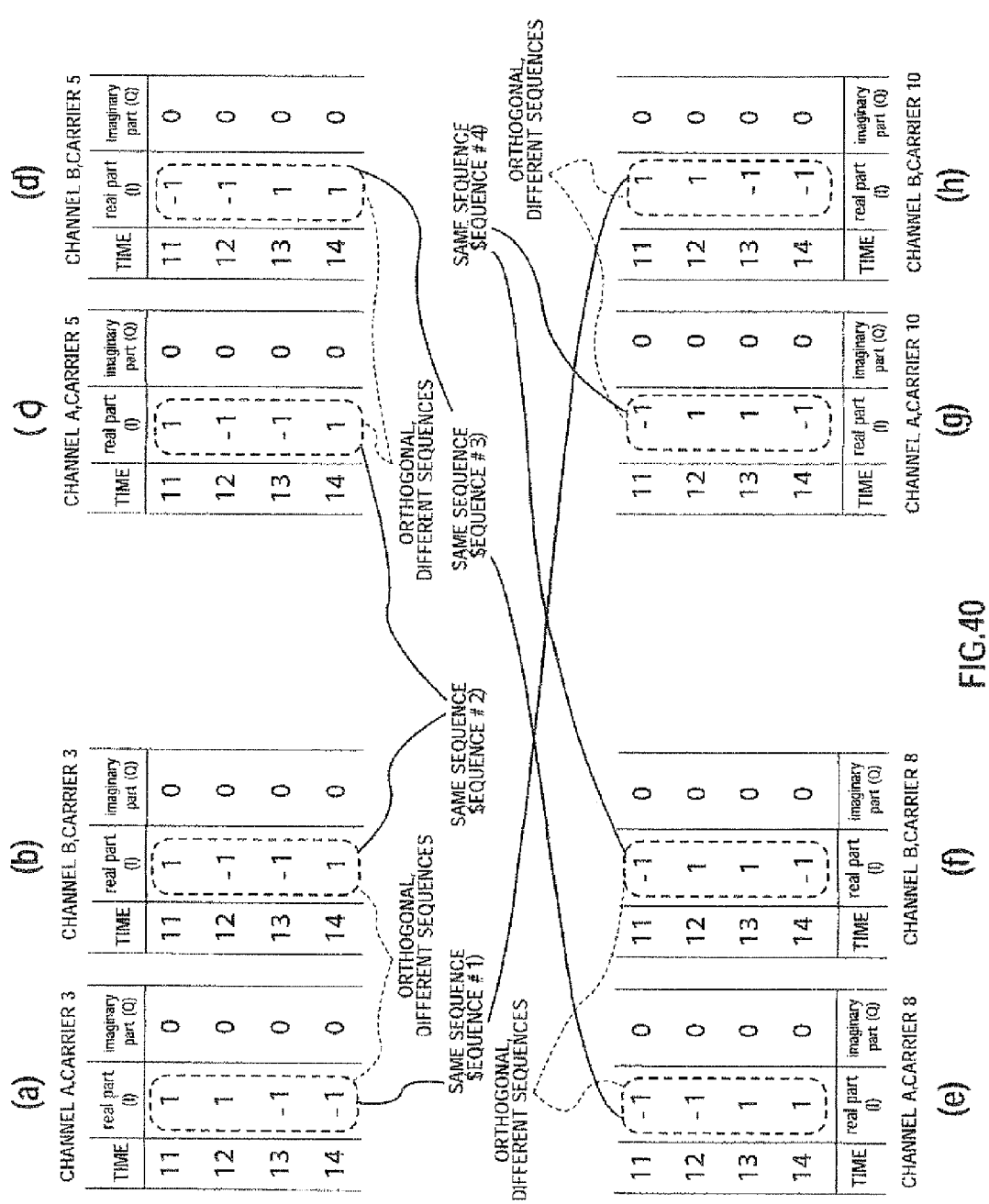
FIG. 40 illustrates signal point constellations of pilot symbols according to Embodiment 7.

FIG. 40 shows signal point constellations of pilot symbols 305 of channel A, channel B and a feature thereof. The feature at this time is that the signal point constellations of channel A and channel B of the same carriers are orthogonal to each other (cross-correlation is zero) as in the case of Embodiment 1.

For example, the signal point constellation (FIG. 40(*a*)) of channel A, carrier 3 from time 11 to time 14 and the signal point constellation (FIG. 40(*b*)) of channel B, carrier 3 from time 11 to time 14 are orthogonal to each other. Signal point constellations are designed in such a way that orthogonality is also maintained from time 15 onward. At this time, using a Walsh-Hadamard conversion, orthogonal codes or the like is suitable because of the orthogonality of signals. FIG. 40 shows a case of BPSK, but if signals are orthogonal, QPSK modulation may also be used or it may not be necessary to follow the rule of the modulation scheme.

Furthermore, for simplicity of the transmission apparatus and the reception apparatus, the same signal point constellation (same sequence) is used for carrier 3 of channel A (FIG. 40(*a*)) and carrier 10 of channel B (FIG. 40(*h*)), carrier 3 of channel B (FIG. 40(*b*)) and carrier 5 of channel A (FIG. 40(*c*)), carrier 5 of channel B (FIG. 40(*d*)) and carrier 8 of channel A (FIG. 40(*e*)), carrier 8 of channel B (FIG. 40(*f*)) and carrier 10 of channel A (FIG. 40(*g*)). Here, the same sequence means completely the same signal point constellation. Here, the respective sequences are named sequence #1, sequence #2, sequence #3 and sequence #4 as shown in FIG. 40.

Furthermore, different signal point constellations (different sequences) of pilot symbols 305 are used for carriers 3, 5, 8, 10 of channel A and channel B and this is because there is a possibility that using the same signal point constellation (same sequence) may lead to an increase of transmission peak power.

Here, the simplification of the transmission apparatus and the reception apparatus and the necessity for orthogonality will be explained in detail using FIG. 41, FIG. 42 and FIG. 43.

Figure 41:
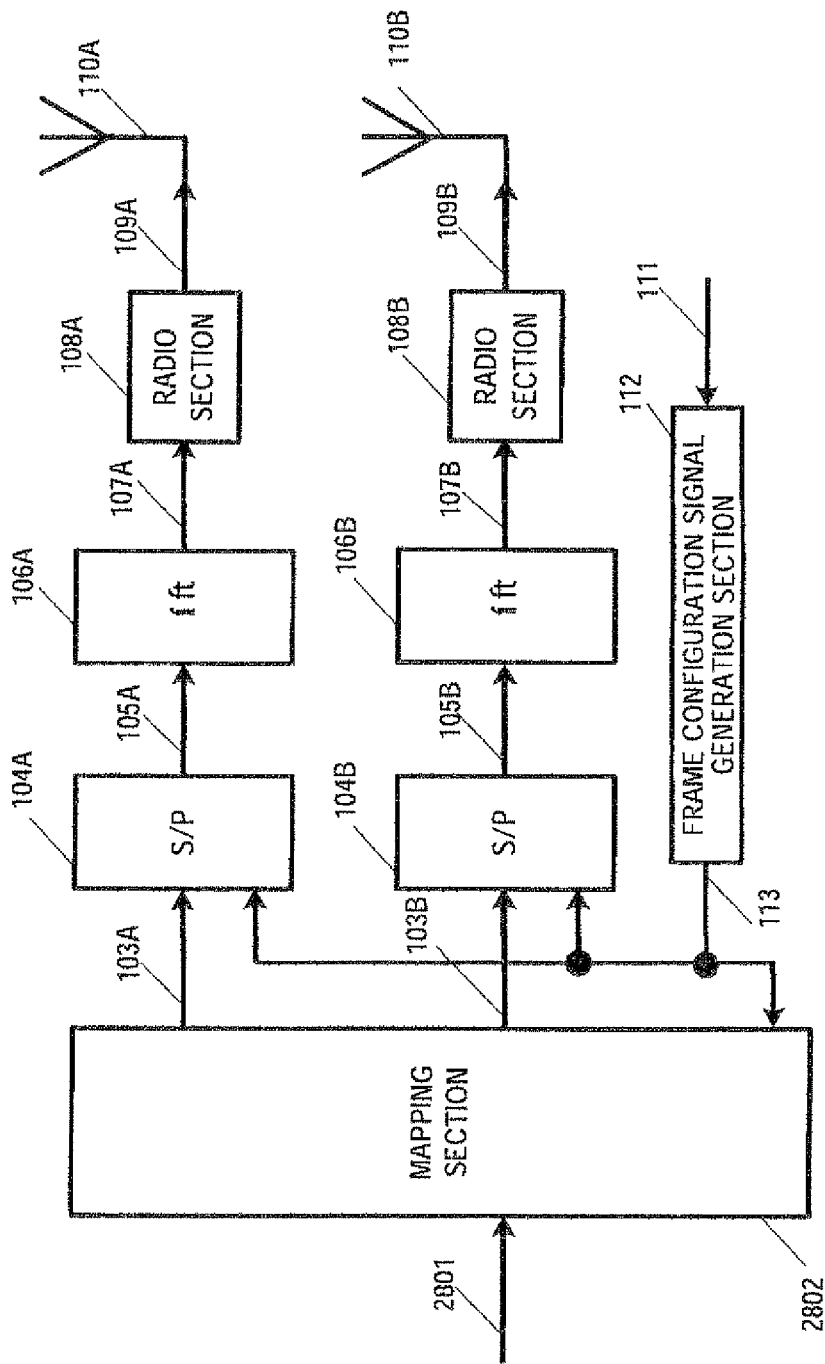
FIG. 41 is a block diagram showing the configuration of a MIMO-OFDM transmission apparatus according to Embodiment 7.

FIG. 41 shows a configuration example of the MIMO-OFDM transmission apparatus according to this embodiment. In FIG. 41, parts that operate in the same way as those in FIG. 2 and FIG. 29 are assigned the same reference numerals. MIMO-OFDM transmission apparatus 400 in FIG. 41 is different from that in FIG. 29 in that there is no transmission section for channel C but it operates in the same way as in FIG. 29 in other aspects.

Figure 42:
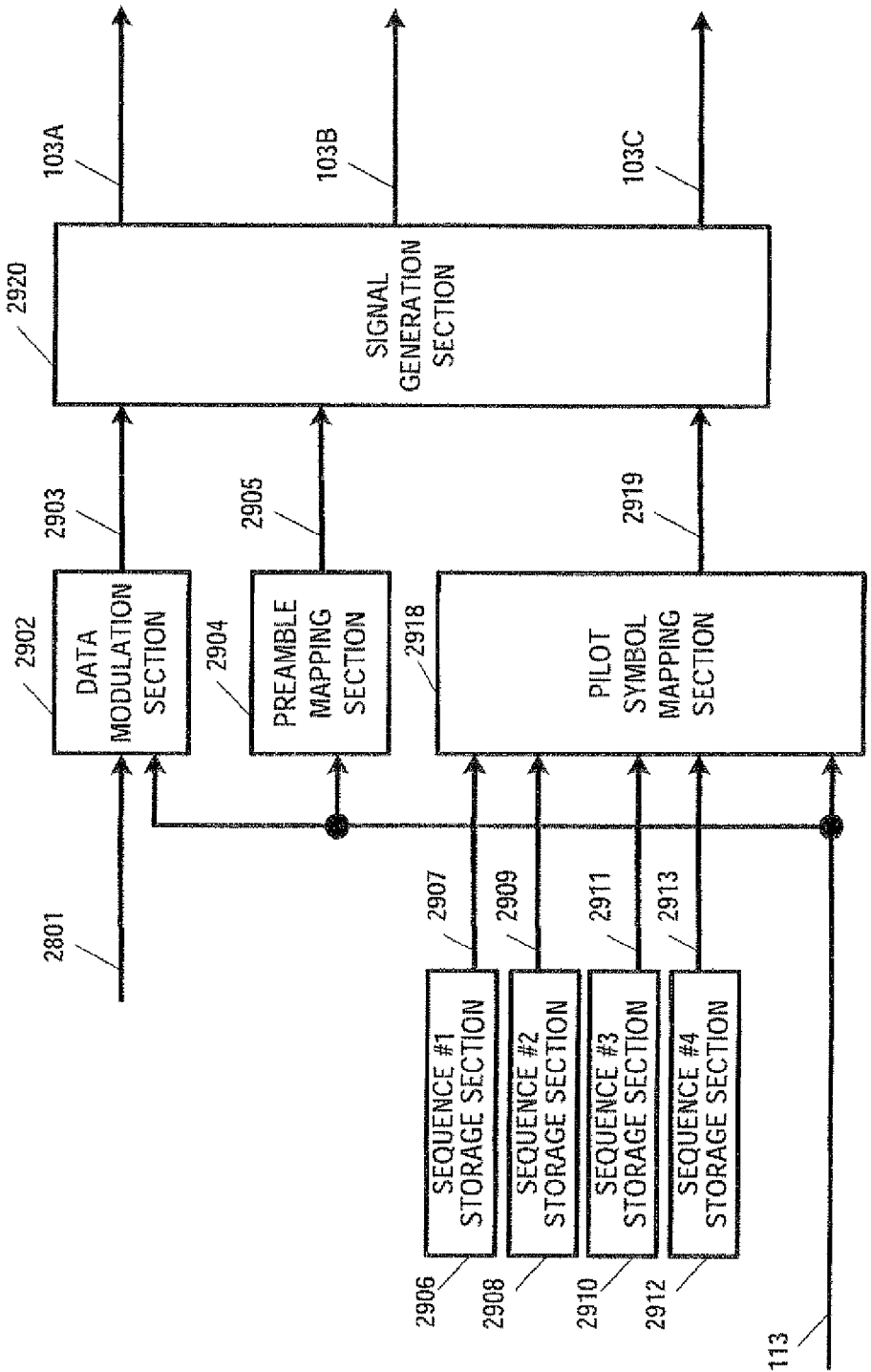
FIG. 42 is a block diagram showing the configuration of a mapping section according to Embodiment 7.

FIG. 42 shows an example of the detailed configuration of mapping section 2802 in FIG. 41.

Data modulation section 2902 receives transmission data 2801 and frame configuration signal 113 as input, generates modulated signal 2903 of data symbol 303 according to frame configuration signal 113 and outputs this.

Preamble mapping section 2904 receives frame configuration signal 113 as input, generates modulated signal 2905 of preambles according to frame configuration signal 113 and outputs this.

Sequence #1 storage section 2906 outputs signal 2907 of sequence #1 in FIG. 40. Sequence #2 storage section 2908 outputs signal 2909 of sequence #2 in FIG. 40. Sequence #3 storage section 2910 outputs signal 2911 of sequence #3 in FIG. 40. Sequence #4 storage section 2912 outputs signal 2913 of sequence #4 in FIG. 40.

Pilot symbol mapping section 2918 receives signal 2907 of sequence #1, signal 2909 of sequence #2, signal 2911 of sequence #3, signal 2913 of sequence #4 and frame configuration signal 113 as input, generates modulated signal 2919 of pilot symbol 305 according to frame configuration signal 113 and outputs this.

Signal generation section 2920 receives modulated signal 2903 of data symbol 303, modulated signal 2905 of a preamble and modulated signal 2919 of pilot symbol 305 as input and outputs modulated signal 103A of channel A and modulated signal 103B of channel B.

The configuration in FIG. 42 requires only four sequence storage sections. This is because as shown in FIG. 42, the present invention uses a certain sequence for two or more subcarriers (used for two subcarriers in FIG. 42). This allows the circuit scale of the transmission apparatus to be reduced. On the other hand, unlike FIG. 42, when all different sequences are used, eight sequence storage sections are required and the circuit scale increases.

Next, the reception apparatus will be explained. FIG. 3 is an example of the configuration of the reception apparatus. Hereinafter, the configuration of frequency offset/phase noise estimation section 213 in FIG. 3 will be explained in detail using FIG. 43.

Figure 43:
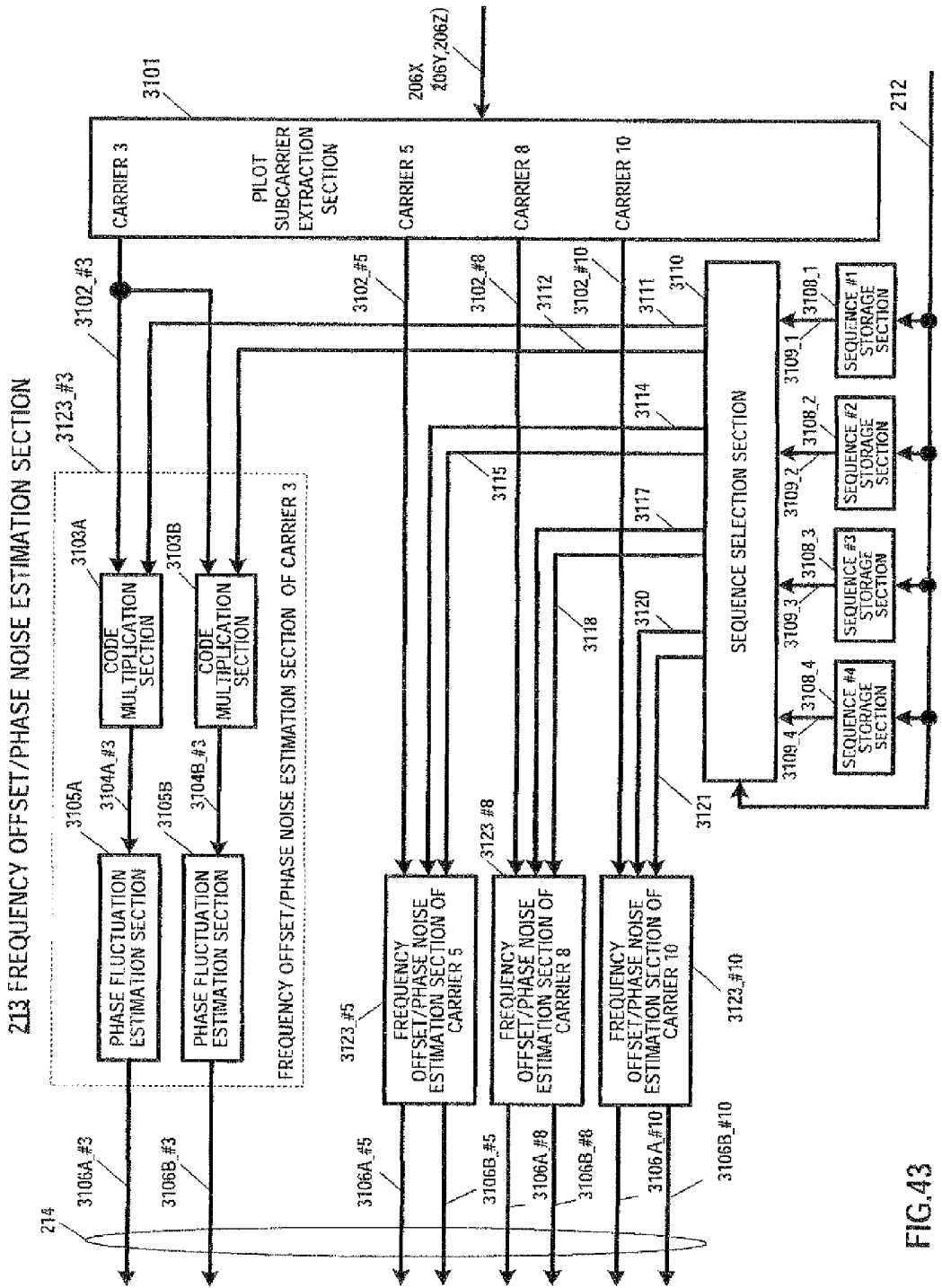
FIG. 43 is a block diagram showing the configuration of frequency offset/phase noise estimation section according to Embodiment 7.

FIG. 43 is an example of the configuration of the frequency offset/phase noise estimation section 213 in FIG. 3A according to this embodiment. Frequency offset/phase noise estimation section 213 in FIG. 43 is provided with pilot carrier extraction section 3101, sequence storage sections 3108_1 to 3108_4, sequence selection section 3110, frequency offset/phase noise estimation section 3123_#3 of carrier 3, frequency offset/phase noise estimation section 3123_#5 of carrier 5, frequency offset/phase noise estimation section 3123_#8 of carrier 8 and frequency offset/phase noise estimation section 3123_#10 of carrier 10.

Pilot subcarrier extraction section 3101 receives signal 206X (or 206Y) after a Fourier transform as input and extracts subcarriers which are pilot symbols 305. More specifically, it extracts signals of carriers 3, 5, 8 and 10. Therefore, pilot subcarrier extraction section 3101 outputs baseband signal 3102_#3 of carrier 3, baseband signal 3102_#5 of carrier 5, baseband signal 3102_#8 of carrier 8 and baseband signal 3102_#10 of carrier 10.

Sequence #1 storage section 3108_1 stores sequence #1 in FIG. 40 and outputs signal 3109_1 of sequence #1 according to timing signal 212. Sequence #2 storage section 3108_2 stores sequence #2 in FIG. 40 and outputs signal 3109_2 of sequence #2 according to timing signal 212. Sequence #3 storage section 3108_3 stores sequence #3 in FIG. 40 and outputs signal 3109_3 of sequence #3 according to timing signal 212. Sequence #4 storage section 3108_4 stores sequence #4 in FIG. 40 and outputs signal 3109_4 of sequence #4 according to timing signal 212.

Sequence selection section 3110 receives signal 3109_1 of sequence #1, signal 3109_2 of sequence #2, signal 3109_3 of sequence #3, signal 3109_4 of sequence #4 and timing signal 212 as input and assigns sequence #1 to signal 3111, sequence #2 to signal 3112, sequence #2 to signal 3114, sequence #3 to signal 3115, sequence #3 to signal 3117, sequence #4 to signal 3118, sequence #4 to signal 3120, sequence #1 to signal 3121 and outputs them.

Frequency offset/phase noise estimation section 3123_#3 of carrier 3 is provided with code multiplication sections 3103A and 3103B, phase fluctuation estimation sections 3105A and 3105B and estimates frequency offset and/or phase noise of each channel of carrier 3.

Code multiplication section 3103A receives baseband signal 3102_#3 of carrier 3 and signal 3111 of sequence #1 as input and multiplies baseband signal 3102_#3 of carrier 3 by signal 3111 of sequence #1, thereby generating baseband signal 3104A_#3 of channel A of carrier 3 and outputting this. The reason is as follows.

Baseband signal 3102_#3 of carrier 3 is a signal in which the baseband signal of channel A and the baseband signal of channel B are multiplexed. When this multiplexed signal is multiplied by signal 3111 of sequence #1, the component of the baseband signal of channel B having a zero cross-correlation is removed, thereby making it possible to extract only a baseband signal component of channel A.

Phase fluctuation estimation section 3105A receives baseband signal 3104A_#3 of channel A of carrier 3 as input, estimates a phase fluctuation based on this signal and outputs phase fluctuation estimation signal 3106A_#3 of channel A.

In the same way, code multiplication section 3103B receives baseband signal 3102_#3 of carrier 3 and signal 3112 of sequence #2 as input and multiplies baseband signal 3102_#3 of carrier 3 by signal 3112 of sequence #2, thereby generating baseband signal 3104B_#3 of channel B of carrier 3 and outputting this.

Phase fluctuation estimation section 3105B receives baseband signal 3104B_#3 of channel B of carrier 3 as input, estimates a phase fluctuation based on this signal and outputs phase fluctuation estimation signal 3106B_#3 of channel B.

Frequency offset/phase noise estimation section 3123_#5 of carrier 5 only differs in the signal to be processed and operates in the same way as above described frequency offset/phase noise estimation section 3123_#3 of carrier 3 and outputs phase fluctuation estimation signal 3106A_#5 of channel A about carrier 5 and phase fluctuation estimation signal 3106B_#5 of channel B. Frequency offset/phase noise estimation section 3123_#8 of carrier 8 also only differs in the signal to be processed and operates in the same way as above described frequency offset/phase noise estimation section 3123_#3 of carrier 3 and outputs phase fluctuation estimation signal 3106A_#8 of channel A about carrier 8 and phase fluctuation estimation signal 3106B_#8 of channel B. Moreover, frequency offset/phase noise estimation section 3123_#10 of carrier 10 also only differs in the signal to be processed and operates in the same way as above described frequency offset/phase noise estimation section 3123_#3 of carrier 3 and outputs phase fluctuation estimation signal 3106A_#10 of channel A about carrier 10 and phase fluctuation estimation signal 3106B_#10 of channel B.

As described above, making signals of channel A and channel B of the same carriers orthogonal to each other, allows frequency offset/phase noise to be estimated with high accuracy even when pilot symbols 305 are multiplexed on channel A and channel B. Another important advantage is that since no channel estimation value (transmission path fluctuation estimation value) is required, the configuration of the part for compensating for frequency offset and/or phase noise can be simplified. If the signal point constellations of channel A and channel B are not orthogonal to each other, signal processing of MIMO demultiplexing, for example, ZF, MMSE, MLD is carried out and then frequency offset and/or phase noise are estimated. On the other hand, according to the present invention, it is possible to compensate for frequency offset and/or phase noise before demultiplexing a signal (signal processing section 223) as shown in FIG. 3. In addition, signal processing section 223 can remove the frequency offset and/or phase noise using pilot symbols 305 even after the signal is demultiplexed into the signal of channel A and signal of channel B, and therefore it is possible to compensate for the frequency offset and/or phase noise with higher accuracy.

On the other hand, when the signal point constellations of channel A and channel B of the same carriers are not orthogonal to each other, the estimation accuracy for frequency offset/phase noise estimation section 213 in FIG. 3A decreases (signals become components of interference with each other), and therefore it is difficult to add frequency offset/phase noise compensation section 215 in FIG. 3 and it is not possible to perform frequency offset/phase noise compensation with high accuracy.

As described above, a plurality of channels or a plurality of carriers are made to use pilot symbols 305 of the same sequence, and therefore it is possible to standardize sequence storage sections 3108_1 to 3108_4 in FIG. 43 among a plurality of channels or a plurality of carriers, which leads to the simplification of the reception apparatus.

This embodiment has been explained using pilot symbols 305, which are orthogonal to each other in four-symbol units, as an example, but the present invention is not limited to four-symbol units. However, considering an influence of a fluctuation of fading in the time direction on the orthogonality, it may be possible to secure the estimation accuracy of frequency offset and/or phase noise if an orthogonal pattern is formed with about 2 to 8 symbols. When the period of the orthogonal pattern is too long, the possibility that the orthogonality may not be secured increases and the estimation accuracy of frequency offset and/or phase noise degrades.

The important points of the method of configuration of pilot symbols 305 of this embodiment are as follows.

(a) Pilot signals on the same carriers of channel A and channel B are orthogonal to each other.
(b) For different carriers on which pilot signals are arranged within the same channel, different sequences are used.
(c) The same sequence is used for respective channels (channel A and channel B).

In this way, when performing MIMO-OFDM transmission using two transmission antennas, it is possible to minimize an increase of transmission peak power without degrading the estimation accuracy of frequency offset and/or phase noise and realize a transmission apparatus in a simple configuration. It is an optimum condition to select pilot signals so as to meet all of the three conditions above and form pilot carriers, but when, for example, it is preferable to obtain only some of the above described effects, it is possible to select pilot signals so at to meet, for example, only two out of the above three conditions and form pilot carriers.

This embodiment has been explained with an example using an OFDM scheme but the present invention is not limited to this and can also be implemented in the same way when using a single-carrier scheme, other multicarrier schemes or a spread spectrum communication scheme. Furthermore, this embodiment has been explained with an example where two antennas are used for transmission and reception respectively, but the present invention is not limited to this and can also be implemented even when the number of reception antennas is three or more in the same way without being influenced. Furthermore, the frame configuration is not limited to this embodiment and especially pilot symbols 305 for estimating distortion such as frequency offset, phase noise or the like may only be required to be arranged on specific subcarriers, and transmitted from a plurality of antennas, and the number of the subcarriers for transmitting pilot symbols 305 is not limited to four in this embodiment. Embodiments with other numbers of antennas or using other transmission methods will be explained in detail later. In addition, this embodiment has been explained using naming such as "pilot symbol 305", "reference symbol 302", "guard symbol 301", "preamble", but using other names will by no means influence this embodiment. This will be the same in other embodiments. Furthermore, this embodiment has been explained using naming such as "channel A" and "channel B", but these are used to facilitate the explanations and using other names will by no means influence this embodiment.

Furthermore, the frame configuration has been explained using the frame configuration in FIG. 39 as an example but is by no means limited to this. Especially, pilot symbols 305 have been explained with the example where they are arranged on specific subcarriers, but this example is not exclusive and the present invention can also be implemented in the same way even when they are arranged as shown in FIG. 34, FIG. 35 and FIG. 36 explained in Embodiment 5. However, it is important that they be arranged so as to secure orthogonality of pilot signals.

Embodiment 8

This embodiment will explain the method of configuration of preambles in a spatial multiplexing MIMO system in which the number of transmission antennas is four and the number of transmission modulated signals is four in detail.

Figure 44:
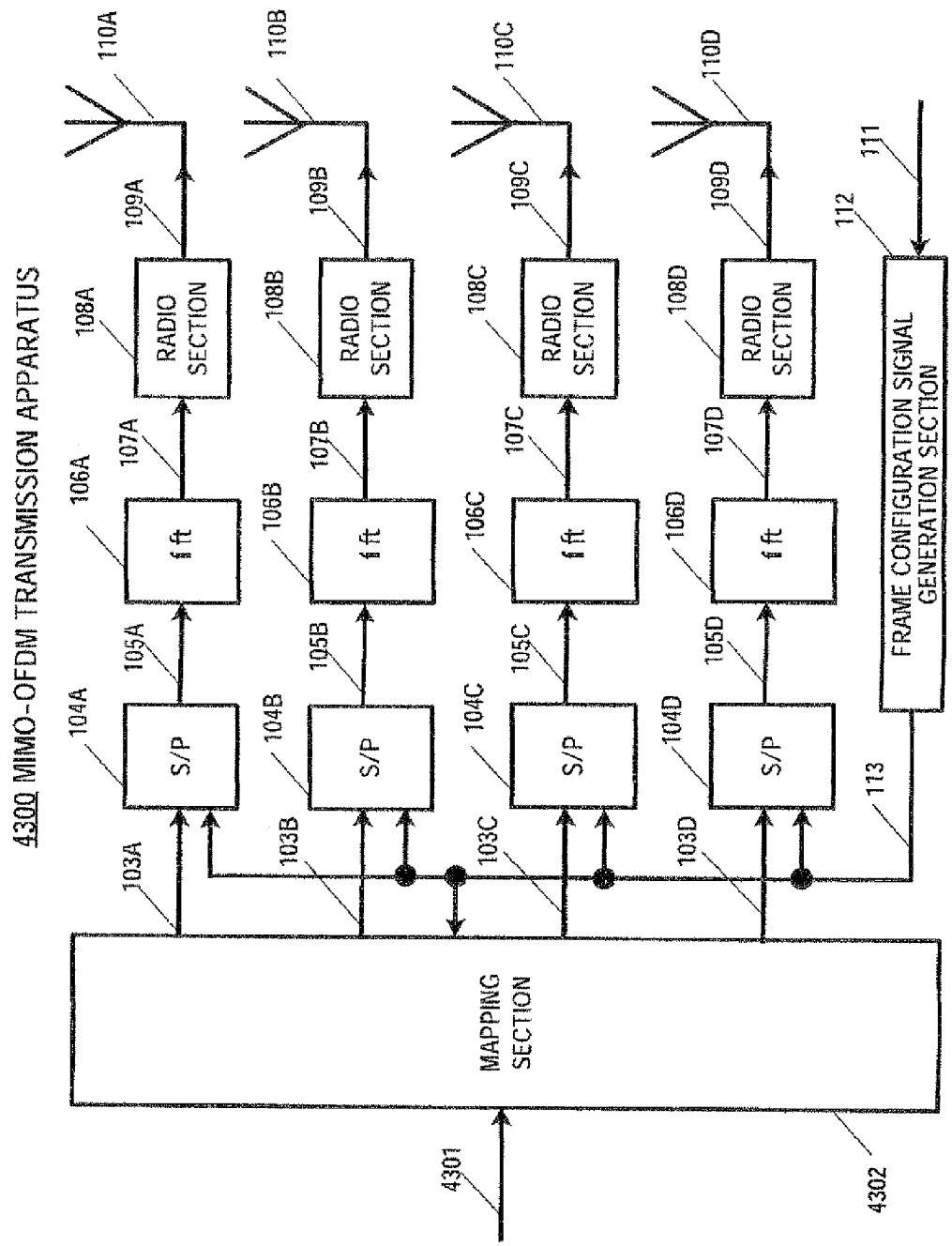
FIG. 44 is a block diagram showing the configuration of a MIMO-OFDM transmission apparatus according to Embodiment 8.

FIG. 44 shows a configuration example of a MIMO-OFDM transmission apparatus according to this embodiment. In FIG. 44, parts which operate in the same way as those in FIG. 2 are assigned the same reference numerals as those in FIG. 2. In MIMO-OFDM transmission apparatus 4300, mapping section 4302 receives transmission digital signal 4301 and frame configuration signal 113 as input and outputs digital signal 103A of channel A, digital signal 103B of channel B, digital signal 103C of channel C and digital signal 103D of channel D.

The element indicated with "A" appended at the end of the reference numeral is the part related to channel A, the element indicated with "B" appended is a part related to channel B, the element indicated with "C" appended is a part related to channel C and the element indicated with "D" appended is a part related to channel D, and they only differ in signals to be handled and are basically subjected to processing similar to processing on the part about channel A indicated with "A" appended at the end of the reference numerals explained in Embodiment 1.

Figure 45:
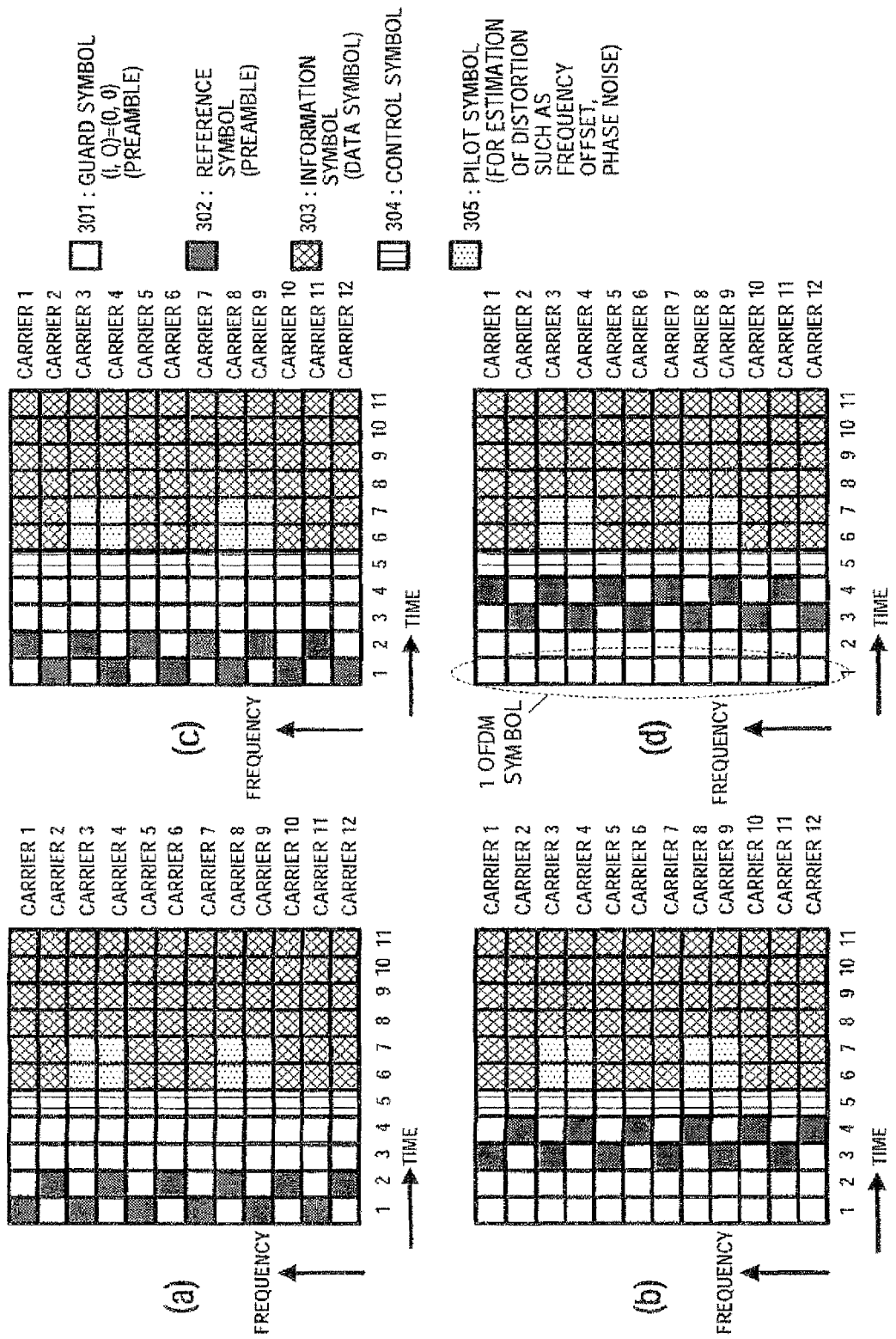

FIG. 45 shows an example of the frame configuration of a transmission signal formed by the transmission apparatus of this embodiment and parts which correspond to those in FIG. 4 are assigned the same reference numerals. FIG. 45(*a*) shows the frame configuration of channel A, FIG. 45(*b*) shows the frame configuration of channel B, FIG. 45(*c*) shows the frame configuration of channel C and FIG. 45(*d*) shows the frame configuration of channel D.

In FIG. 45, the most characteristic aspect is the configuration of preambles and at a certain time on two channels, reference symbols 302 and guard (null) symbols 301 are alternately arranged on the frequency axis (for example, channel A and channel C at time 1 and time 2 in FIG. 45, and channel B and channel D at time 3 and time 4), while reference symbols 302 are not arranged on the remaining two channels and only guard (null) symbols 301 are arranged (for example, channel B and channel D at time 1 and time 2, and channel A and channel C at time 3 and time 4 in FIG. 45).

When transmitting modulated signals of four channels, a method of inserting reference symbol 302 for every 3 symbols may be thought of as the simplest configuration, but it is also possible to think of a radio communication system in which a correlation of a transmission path fluctuation on the frequency axis decreases due to the influence of multipaths as the distance on the frequency axis increases. In such a radio communication system, it is not preferable to insert reference symbol 302 for every 3 symbols. But it is not always undesirable. Depending on a radio communication system, inserting reference symbol 302 for every 3 symbols may not influence reception quality, either.

Therefore, this embodiment inserts reference symbols 302 and guard (null) symbols 301 alternately for OFDM symbols (generic name of symbols of all subcarriers within a certain time, see FIG. 45(*d*)) at a certain time. However, it is not possible to adopt the configuration in which reference symbols 302 and guard (null) symbols 301 are arranged alternately for OFDM symbols on all channels. This is because adopting such a configuration would cause reference symbols 302 to collide with each other among different channels. Even when the number of channels increases, adopting the frame configuration as shown in FIG. 45 can avoid reference symbols 302 from colliding with each other among different channels without reference symbols 302 being demultiplexed from each other too much on the frequency axis.

FIG. 46 shows a relationship between a modulation scheme of reference symbols 302 and a normalization factor when four modulated signals are transmitted.

FIG. 47 and FIG. 48 show examples of mapping when four modulated signals are transmitted on the in-phase I—quadrature Q plane in OFDM symbol units when the relationship between a modulation scheme of reference symbols 302 and a normalization factor is as shown in FIG. 46. However, the examples in FIG. 47 and FIG. 48 apply to a case where the normalization factor is 1. At this time, if the rule in Embodiment 3 is observed, it is preferable to set the power of reference symbols 302 to 2×2+0×0=4 as shown in FIG. 47 and FIG. 48. This allows the receiver to reduce the influence of quantization errors and thereby suppress a reduction of reception quality.

Here, the case where the same average reception power is set for data symbols 303 and preambles has been explained as an example, but there are often cases where reception quality can be secured when the average reception power of preambles is made to be greater than the average reception power of data symbols 303. The above described concept can also be applied to this case, too.

Furthermore, this embodiment has been explained using FIG. 45 as an example of the transmission frame configuration in which it is possible to prevent reference symbols 302 from colliding with each other among different channels without reference symbols 302 being demultiplexed too much from each other on the frequency axis even if the number of channels increases, but this example is not exclusive and it is also possible to obtain similar effects using a frame configuration as shown in FIG. 49.

Other Embodiments

The above described embodiments arrange symbols (preambles) for estimating a channel fluctuation at the head of a frame, but the present invention is not limited to this and symbols can be arranged at any positions if it is possible to at least demultiplexe data symbols 303. For example, it may be possible to use a method of inserting symbols between data symbols 303 to improve the estimation accuracy or the like.

Furthermore, preambles are arranged on all carriers, that is, from carrier 1 to carrier 12 in FIG. 4 and FIG. 17 but preambles may also be arranged partially, for example, from carrier 3 to carrier 10. Furthermore, the above described embodiments use the term "preambles," but this term itself does not have a specific meaning. The name is by no means a limiting one to this and may be reworded to, for example, "pilot symbol control symbols."

Furthermore, the present invention can be likewise applied to a case where one antenna illustrated in the above described embodiments is made up of a plurality of antennas and a signal of the above described one channel is transmitted using a plurality of antennas.

Moreover, the above described embodiments have used the term "channel" and this is one equation used to distinguish between signals transmitted from the respective antennas and replacing the term "channel" by a term like a "stream" or "modulated signal" or "transmission antenna" or the like will by no means influence the above described embodiments.

The present application is based on Japanese Patent Application No. 2005-243494, filed on Aug. 24, 2005, and Japanese Patent Application No. 2006-228337, filed on Aug. 24, 2006, the entire content of which is expressly incorporated by reference herein.

INDUSTRIAL APPLICABILITY

The MIMO-OFDM transmission apparatus and the MIMO-OFDM transmission method according to the present invention are widely applicable to radio communication systems including, for example, LANs and cellular systems.

The invention claimed is:

1. An OFDM transmission signal generation apparatus comprising:
a mapping section configured to fonn a plurality of transmission signals, each of the plurality of transmission signals comprising several pilot carriers, the several pilot carriers being located in identical carrier positions among the plurality of transmission signals, such that orthogonal pilot sequences are assigned to identical time slots of pilot carriers in identical carrier positions among the plurality of transmission signals, and identical pilot sequences are assigned to at least two of the plurality of transmission signals; and
an Inverse Fourier transform section configured to convert the plurality of transmission signals to a plurality of OFDM signals to be transmitted over an identical frequency band at an identical time period.

2. The OFDM transmission signal generation apparatus according to claim 1, wherein when the number of the plurality of transmission signals is two, the mapping section is configured to assign different pilot sequences to different pilot carriers for each of a first transmission signal and a second transmission signal, such that orthogonal pilot sequences are assigned to identical time slots of pilot carriers in identical carrier positions between the first transmission signal and the second transmission signal, and identical pilot sequences are assigned to the first transmission signal and the second transmission signal.

3. The OFDM transmission signal generation apparatus according to claim 1, wherein when the number of the plurality of transmission signals is three, the mapping section is configured to assign different pilot sequences to different pilot carriers for each of a first transmission signal, a second transmission signal and a third transmission signal, such that orthogonal pilot sequences are assigned to identical time slots of pilot carriers in identical carrier positions among the first transmission signal, the second transmission signal and the third transmission signal, and identical pilot sequences are assigned to at least two of the first transmission signal, the second transmission signal and the third transmission signal.

4. The OFDM transmission signal generation apparatus according to claim 1, wherein each pilot sequence comprises several pilot symbols and the orthogonal pilot sequences are sequences orthogonal to each other in several-symbol units.

5. The OFDM transmission signal generation apparatus according to claim 1, wherein each pilot sequence comprises several pilot symbols and cross-correlation of signal point constellations of the several pilot symbols on an IQ plane is zero among the orthogonal pilot sequences.

6. The OFDM transmission signal generation apparatus according to claim 1, wherein each of the plurality of transmission signals comprises a transmit frame including a preamble period and a data transmission period, and the several pilot carriers are allocated in the data transmission period.

7. An OFDM transmission signal generation method comprising:
mapping a plurality of transmission signals, each of the plurality of transmission signals comprising several pilot carriers, the several pilot carriers being located in identical carrier positions among the plurality of transmission signals, such that orthogonal pilot sequences are assigned to identical time slots of pilot carriers in identical carrier positions among the plurality of transmission signals and identical pilot sequences are assigned to at least two of the plurality of transmission signals; and
converting the plurality of transmission signals to a plurality of OFDM signals to be transmitted over an identical frequency band at an identical time period.

8. The OFDM transmission signal generation method according to claim 7, wherein when the number of the plurality of transmission signals is two:
orthogonal pilot sequences are assigned to pilot carriers in identical carrier positions between a first transmission signal and a second transmission signal;

an identical pilot sequence is assigned to the first transmission signal and the second transmission signal; and different pilot sequences are assigned to different pilot carriers for each of the first transmission signal and the second transmission signal.

9. The OFDM transmission signal generation method according to claim 7, wherein when the number of the plurality of transmission signals is three:

orthogonal pilot sequences are assigned to pilot carriers in identical carrier positions among a first transmission signal, a second transmission signal and a third transmission signal;

an identical pilot sequence is assigned to at least two of the first transmission signal, the second transmission signal and the third transmission signal; and different pilot sequences are assigned to different pilot carriers for each of the first transmission signal, the second transmission signal and the third transmission signal.

10. The OFDM transmission signal generation method according to claim 7, wherein each pilot sequence comprises several pilot symbols and the orthogonal pilot sequences are sequences orthogonal to each other in several-symbol units.

11. The OFDM transmission signal generation method according to claim 7, wherein each pilot sequence comprises several pilot symbols and cross-correlation of signal point constellations of the several pilot symbols on an IQ plane is zero among the orthogonal pilot sequences.

12. The OFDM transmission signal generation method according to claim 7, wherein each of the plurality of transmission signals comprises a transmit frame including a preamble period and a data transmission period, and the several pilot carriers are allocated in the data transmission period.

13. An OFDM reception data generation apparatus which receives a plurality of OFDM signals that were sent over an identical frequency band at an identical time period, said OFDM reception data generation apparatus comprising:

a Fourier transform section configured to convert the plurality of OFDM signals to a plurality of reception signals, each of the plurality of reception signals including a preamble period and a data period, and comprising several pilot carriers in the data period, the several pilot carriers being located in identical carrier positions among the plurality of reception signals, such that orthogonal pilot sequences are assigned to identical time slots of pilot carriers in identical carrier positions among the plurality of reception signals, and identical pilot sequences are assigned to at least two of the plurality of reception signals; and a demodulator configured to estimate transmission path fluctuation using the preamble period of the plurality of reception signals to generate a transmission path fluctuation signal;

estimate at least one of phase fluctuation and frequency offset by using pilot symbols arranged in the several pilot carriers to generate at least one of a phase fluctuation signal and a frequency offset signal; and demodulate the data period of the plurality of reception signals by using the transmission path fluctuation signal and at least one of the phase fluctuation signal and the frequency offset signal to generate reception data.

14. The OFDM reception data generation apparatus according to claim 13, wherein, when the number of the plurality of reception signals is two, different pilot sequences are assigned to different pilot carriers for each of a first reception signal and a second reception signal, such that orthogonal pilot sequences are assigned to identical time slots of pilot carriers in identical carrier positions between the first reception signal and the second reception signal, and identical pilot sequences are assigned to the first reception signal and the second reception signal.

15. The OFDM reception data generation apparatus according to claim 13, wherein, when the number of the plurality of reception signals is three, different pilot sequences are assigned to different pilot carriers for each of a first reception signal, a second reception signal and a third reception signal, such that orthogonal pilot sequences are assigned to identical time slots of pilot carriers in identical carrier positions among the first reception signal, the second reception signal and the third reception signal, and identical pilot sequences are assigned to at least two of the first reception signal, the second reception signal and the third reception signal.

16. The OFDM reception data generation apparatus according to claim 13, wherein each pilot sequence comprises several pilot symbols and the orthogonal pilot sequences are sequences orthogonal to each other in several-symbol units.

17. An OFDM reception data generation method for receiving a plurality of OFDM signals that were sent over an identical frequency band at an identical time period, said OFDM reception data generation method comprising:

converting the plurality of OFDM signals to plurality of reception signals, each of the plurality of reception signals including a preamble period and a data period, and comprising several pilot carriers in the data period, the several pilot carriers being located in identical carrier positions among the plurality of reception signals, such that orthogonal pilot sequences are assigned to identical time slots of pilot carriers in identical carrier positions among the plurality of reception signals, and identical pilot sequences are assigned to at least two of the plurality of reception signals;

estimating transmission path fluctuation using the preamble period of the plurality of reception signals to generate a transmission path fluctuation signal;

estimating at least one of phase fluctuation and frequency offset by using pilot symbols arranged in the several pilot carriers to generate at least one of a phase fluctuation signal and a frequency offset signal; and demodulating the data period of the plurality of reception signals by using the transmission path fluctuation signal and at least one of the phase fluctuation signal and the frequency offset signal to generate reception data.

18. The OFDM reception data generation method according to claim 17, wherein, when the number of the plurality of reception signals is two, different pilot sequences are assigned to different pilot carriers for each of a first reception signal and a second reception signal, such that orthogonal pilot sequences are assigned to identical time slots of pilot carriers in identical carrier positions between the first reception signal and the second reception signal, and identical pilot sequences are assigned to the first reception signal and the second reception signal.

19. The OFDM reception data generation method according to claim 17, wherein, when the number of the plurality of reception signals is three, different pilot sequences are assigned to different pilot carriers for each of a first reception signal, a second reception signal and a third reception signal, such that orthogonal pilot sequences are assigned to identical time slots of pilot carriers in identical carrier positions among the first reception signal, the second reception signal and the third reception signal, and identical pilot sequences are assigned to at least two of the first reception signal, the second reception signal and the third reception signal.

20. The OFDM reception data generation method according to claim 17, wherein each pilot sequence comprises several pilot symbols and the orthogonal pilot sequences are sequences orthogonal to each other in several-symbol units.

* * * * *

UNITED STATES PATENT AND TRADEMARK OFFICE
CERTIFICATE OF CORRECTION

| | | |
|---|---|---|
| PATENT NO. | : 8,284,866 B2 | |
| APPLICATION NO. | : 13/171121 | |
| DATED | : October 9, 2012 | |
| INVENTOR(S) | : Yutaka Murakami et al. | |

It is certified that error appears in the above-identified patent and that said Letters Patent is hereby corrected as shown below:

In the Claims

Claim 1, Column 41, line 64, incorrectly reads:

"a mapping section configured to fonn a plurality of trans-"

and should read:

"a mapping section configured to form a plurality of trans-"

Signed and Sealed this
Fifteenth Day of April, 2014

Michelle K. Lee
*Deputy Director of the United States Patent and Trademark Office*